(12) United States Patent
Wu

(10) Patent No.: US 12,464,464 B2
(45) Date of Patent: Nov. 4, 2025

(54) MANAGING A UE PREFERRED CONFIGURATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 449 days.

(21) Appl. No.: 17/919,796

(22) PCT Filed: Apr. 20, 2021

(86) PCT No.: PCT/US2021/028061
§ 371 (c)(1),
(2) Date: Oct. 19, 2022

(87) PCT Pub. No.: WO2021/216485
PCT Pub. Date: Oct. 28, 2021

(65) Prior Publication Data
US 2023/0143942 A1 May 11, 2023

Related U.S. Application Data

(60) Provisional application No. 63/028,442, filed on May 21, 2020, provisional application No. 63/013,465, filed on Apr. 21, 2020.

(51) Int. Cl.
H04W 52/02 (2009.01)
H04W 36/00 (2009.01)

(52) U.S. Cl.
CPC ... *H04W 52/0258* (2013.01); *H04W 36/0055* (2013.01); *H04W 36/0069* (2018.08)

(58) Field of Classification Search
CPC ......... H04W 52/0258; H04W 36/0055; H04W 36/0069; H04W 88/06; H04W 76/15; H04W 76/27; H04W 8/22; Y02D 30/70
See application file for complete search history.

(56) References Cited

U.S. PATENT DOCUMENTS

2015/0195800 A1* 7/2015 Zhu ...................... H04L 1/1867 370/311
2019/0029062 A1 1/2019 Wu
(Continued)

FOREIGN PATENT DOCUMENTS

CN 107005957 A 8/2017
CN 110612730 A 12/2019
(Continued)

OTHER PUBLICATIONS

3GPP Specification 38.331 V15.9.0 (Mar. 2020) p. 1-473.*
(Continued)

*Primary Examiner* — Sharmin Chowdhury
(74) *Attorney, Agent, or Firm* — MARSHALL, GERSTEIN & BORUN LLP

(57) ABSTRACT

To manage a preferred configuration indicative of a maximum allocation preferred by the UE for at least one resource, a UE transmits (802A) the preferred configuration to a RAN, transitions (804A) to a state in which a radio
(Continued)

connection between the UE and the RAN is suspended, and releases (806A) the preferred configuration, prior to communicating data over the radio connection.

20 Claims, 29 Drawing Sheets

(56) References Cited

U.S. PATENT DOCUMENTS

| | | | | |
|---|---|---|---|---|
| 2019/0182732 | A1* | 6/2019 | Wei | H04W 36/0066 |
| 2020/0053716 | A1* | 2/2020 | Xu | H04W 76/27 |
| 2021/0185753 | A1* | 6/2021 | Mattam | H04W 8/22 |
| 2021/0385897 | A1* | 12/2021 | Purkayastha | H04W 36/087 |
| 2023/0042702 | A1* | 2/2023 | Kim | H04W 76/15 |
| 2023/0099609 | A1* | 3/2023 | Xu | H04W 36/0069 370/331 |

FOREIGN PATENT DOCUMENTS

| | | |
|---|---|---|
| CN | 110741726 A | 1/2020 |
| WO | WO-2018/228451 A1 | 12/2018 |
| WO | WO-2020/027616 A1 | 2/2020 |

OTHER PUBLICATIONS

International Search Report and Written Opinion for Application No. PCT/US2021/028061, dated Jul. 1, 2021.
"3rd Generation Partnership Project; Technical Specification Group Radio Access Network; Evolved Universal Terrestrial Radio Access (E-UTRA) and NR; Multi-Connectivity; Stage 2 (Release 16)," 3GPP Standard, 3GPP TS 37.340 v16.1.0 (Mar. 2020).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP Standard, 3GPP TS 36.300 V16.0.0 (Dec. 2019).
Catt, "Reporting UE Assistance Info to NR SN," 3GPP TSG-RAN WG2 Draft, R2-2000255 (2020).
Catt, "36.331 CR for addressing overheating issue in (NG)EN-DC," 3GPP TSG-RAN2 Change Request, R2-2003467 (2020).
Catt, "38.331 CR for addressing overheating issue in (NG)EN-DC," 3GPP TSG-RAN2 Change Request, R2-2003468 (2020).
First Chinese Office Action for Application No. 202180030462.6, dated Dec. 12, 2024.

* cited by examiner

MANAGING A UE PREFERRED CONFIGURATION

This disclosure relates generally to wireless communications and, more particularly, to managing a UE preferred configuration.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user device (or user equipment, commonly denoted by acronym "UE") in some cases can concurrently utilize resources of multiple network nodes, e.g., base stations, interconnected by a backhaul. These network nodes may support the same RAT or different RATs, and this type of connectivity is generally referred to as DC and specifically MR-DC when different RATs are supported. When a UE operates in DC, one base station operates as a master node (MN), and the other base station operates as a secondary node (SN). The backhaul can support an X2 or Xn interface, for example.

The MN can provide a control-plane connection and a user-plane connection to a core network (CN), whereas the SN generally provides a user-plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages.

There are several types of SRBs that a UE can use when operating in DC. SRB1 and SRB2 resources allow the UE and the MN to exchange RRC messages related to the MN and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both of the MN and SN. Further, the UE and the base stations (e.g., MN and SN) use data radio bearers (DRBs) to transport data on a user plane. DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of both the MN and the SN can be referred to as split DRBs.

A base station (e.g., MN, SN) and/or the CN in some cases causes the UE to transition from one state of the Radio Resource Control (RRC) protocol to another state. More particularly, the UE can operate in an idle state (e.g., EUTRA-RRC_IDLE, NR-RRC IDLE), in which the UE either does not have a radio connection with a base station or has a suspended RRC connection with the base station; a connected state (e.g., EUTRA-RRC_CONNECTED, NR-RRC CONNECTED), in which the UE has a radio connection with the base station; or an inactive state (e.g., EUTRA-RRC INACTIVE, NR-RRC INACTIVE), in which the UE has a suspended radio connection with the base station.

In some implementations and scenarios, a UE can operate in the connected state and subsequently transition to the inactive state or the idle state. In response to a network-triggering event, such as when a base station pages the UE (e.g., for an incoming phone call), or when the UE is otherwise triggered to send data (e.g., outgoing phone call, browser launch), the UE can then transition back to the connected state. To carry out the transition, the UE can request that the base station resume the suspended radio connection (e.g., by sending an RRC Resume Request message), so that the base station can configure the UE to again operate in the connected state.

3GPP TS 36.331 and 38.331 describe procedures for handling UE preferred configurations. These procedures involve a UE sending a preferred configuration in a UEAssistanceInformation message to an MN while in connected state. In transmitting the preferred configuration, the UE is able to suggest to the MN to temporarily adjust the number of SCells, the number of MIMO layers and/or the aggregated bandwidth in use during the connected state when the UE experiences an overheating situation (e.g., due to heavy application processing or high ambient temperature). For example, if the UE and MN are configured to communicate over a maximum number of SCells, a maximum number of MIMO layers, and/or a maximum aggregated bandwidth, the UE can suggest to the MN to reduce the maximum number of SCells, the maximum number of MIMO layers, and/or the maximum aggregated bandwidth, by sending a preferred configuration to the MN that indicates a preferred maximum number of SCells, a preferred maximum number of MIMO layers, and/or a preferred maximum aggregated bandwidth. Thus, a preferred configuration is indicative of a maximum allocation preferred by the UE for one or more resources.

However, it is not clear how to handle UE preferred configurations when the UE transitions from the connected state to an inactive state. Further, in scenarios in which the UE is in DC with an MN and an SN, the UE may indicate a preferred maximum number of SCells, a preferred maximum number of MIMO layers, and/or a preferred maximum aggregated bandwidth in a UE preferred configuration for the SN specifically. However, if the SN is a distributed base station that includes a CU and a DU, it is not clear how the CU and the DU handle the UE preferred configuration. Moreover, if the SN does not support the UEAssistanceInformation message, the SN may fail to acknowledge the UE preferred configuration, causing the MN to undesirably revert the UE back to Single Connectivity (SC) with the MN.

SUMMARY

Base stations and UEs of this disclosure implement techniques that enable a base station and a UE to release or retain, at least temporarily, UE preferred configurations when the UE transitions from the connected state to an inactive state. Further, if the base station is a distributed SN that includes a CU and a DU, the DU can receive the UE preferred configuration via an interface message from the CU. Moreover, in a scenario in which the UE is in DC connectivity with an MN and a legacy SN that does not support the UEAssistanceInformation message to interpret a UE preferred configuration contained in the UEAssistanceInformation message, the MN can translate the UEAssistanceInformation message into a format readable by the SN so that the SN can properly interpret the UE preferred configuration.

An example embodiment of these techniques is a method in a UE for managing a preferred configuration indicative of a maximum allocation preferred by the UE for at least one resource. The method is implemented using processing hardware and includes transmitting the preferred configuration to a RAN; transitioning to an inactive state in which a radio connection between the UE and the RAN is suspended; and releasing the preferred configuration, prior to communicating data over the radio connection.

Another example embodiment of these techniques is a method in a DU of a disaggregated base station that includes the DU and a central unit CU. The method is implemented using processing hardware and includes receiving, from the CU, a preferred configuration indicative of a maximum allocation preferred by a UE for at least one resource; generating, using the preferred configuration, a DU configuration for the UE; and transmitting, the CU, the DU configuration.

Another example embodiment of these techniques is a method in a CU of a disaggregated base station that includes the CU and a DU. The method is implemented using processing hardware and includes receiving a preferred configuration indicative of a maximum allocation preferred by a UE for at least one resource; and transmitting, to the DU, an indication of the maximum allocation preferred by the UE.

Yet another example embodiment of these techniques is a method in an MN for managing configuration of an SN when the UE operates in DC with the MN and the SN. The method can be implemented using processing hardware and includes determining, using a capability of at least one of the UE or the SN, whether the SN is to receive an indication of a maximum allocation preferred by the UE for at least one resource; and in response to determining that the SN is to receive the indication, causing the indication to be provided to the SN.

Still another example embodiment of these techniques is a method in a UE for managing a preferred configuration indicative of a maximum allocation preferred by the UE for at least one resource, the UE operating in DC with an MN and an SN. The method can be implemented by processing hardware and includes transmitting the preferred configuration to the MN or the SN; receiving an indication that the SN is to be released; disconnecting from the SN in response to the indication; and releasing the preferred configuration.

Still another example embodiment of these techniques is a method in a UE for managing a preferred configuration indicative of a maximum allocation preferred by the UE for at least one resource, the UE operating in DC with an MN and a first SN. The method can be implemented by processing hardware and includes transmitting a first preferred configuration to the first SN; receiving, from the MN, mobility information for a secondary cell group (SCG) of a second SN before the first SN successfully receives the first preferred configuration; and determining whether to transmit a second preferred configuration to the first SN or the second SN based on the mobility information.

Still another embodiment of these techniques is a base station including processing hardware and configured to implement one of methods above.

Another embodiment of these techniques is a UE including processing hardware and configured to implement one of methods above.

DETAILED DESCRIPTION OF THE DRAWINGS

Figure 1A:
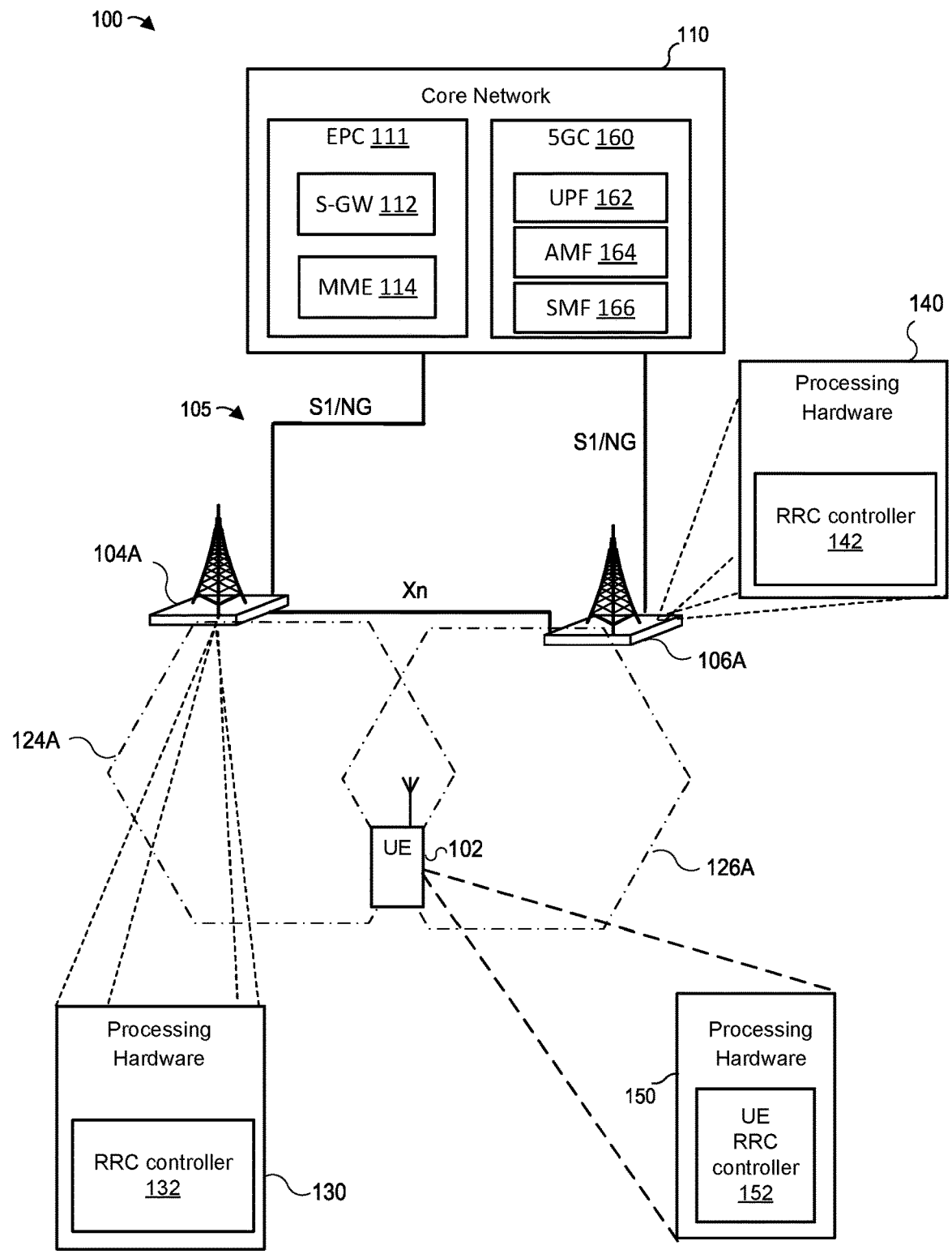
FIGS. 1A and 1B are block diagrams of example systems in which a RAN and a UE can implement the techniques of this disclosure for managing UE preferred configurations.

FIG. 1A depicts an example wireless communication system 100 that includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an RRC controller 132 configured to manage RRC configurations, such as UE preferred configurations, when the base station 104A operates as an MN, for example.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes an RRC controller 142 configured to manage RRC configurations, such as UE preferred configurations, when the base station 106A operates as an SN, for example.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE RRC controller 152 configured to manage RRC configurations, such as UE preferred configurations.

More particularly, the RRC controllers 132, 142, and 152 can implement at least some of the techniques discussed with reference to the messaging and flow diagrams below to manage RRC configurations. Although FIG. 1A illustrates the RRC controllers 132 and 142 as separate components, in at least some of the scenarios the base stations 104A and 106A can have similar implementations and in different scenarios operate as MN or SN nodes. In these implementations, the base stations 104A and 106A can implement the RRC controller 132 and the RRC controller 142 to support MN and SN functionality, respectively.

In operation, the UE 102 can use a radio bearer (e.g., a DRB or an SRB) that at different times terminates at the MN 104A or the SN 106A. The UE 102 can receive a radio bearer configuration configuring the radio bearer from the MN 104A or the SN 106A. The UE 102 can apply one or more security keys when communicating on the radio bearer, in the uplink (from the UE 102 to a base station) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

Figure 1B:
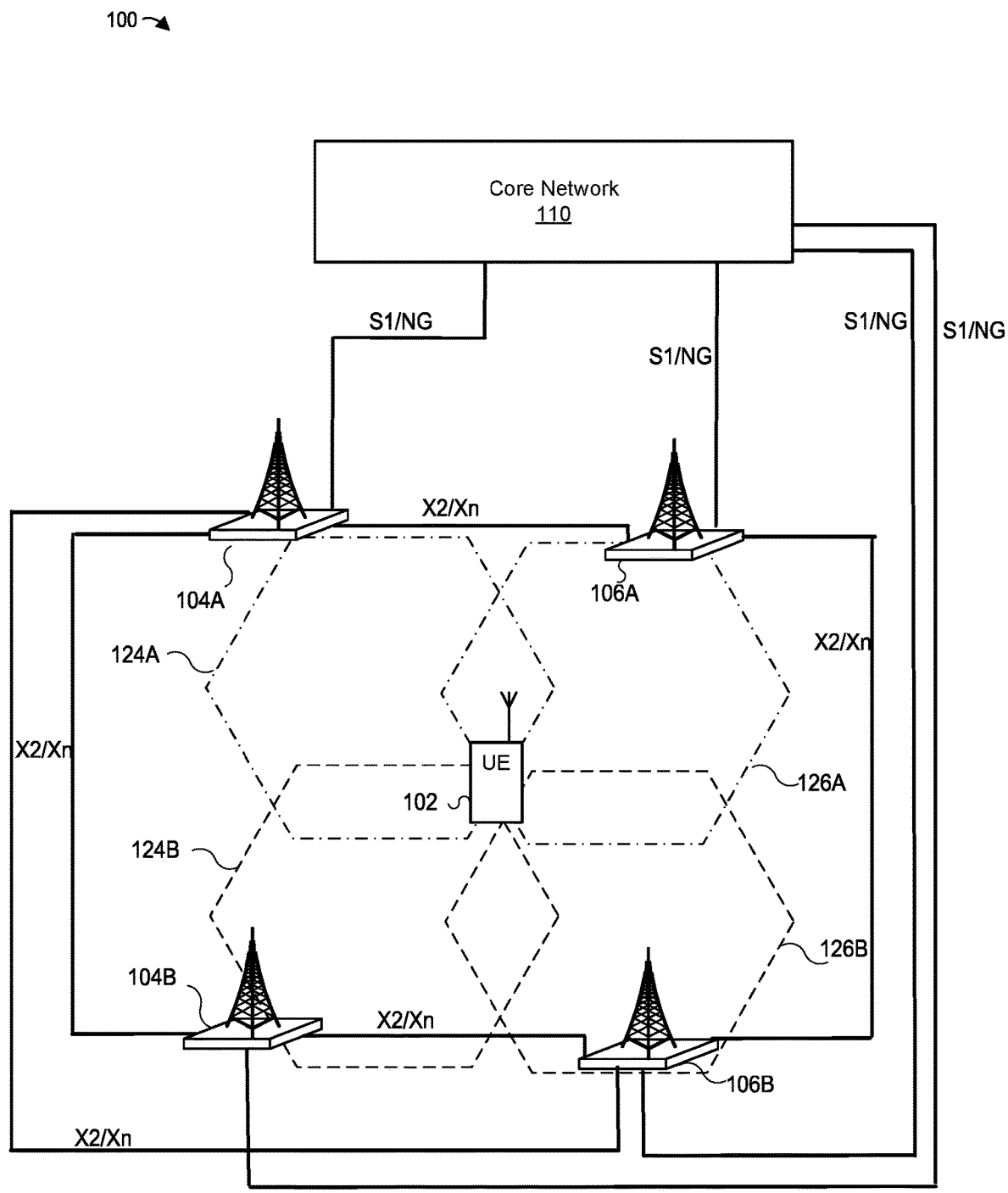

FIG. 1B depicts another implementation of the example wireless communication system 100 in which communication devices can implement the techniques discussed with reference to the messaging and flow diagrams below to manage RRC configurations. As shown, CN 110 connects to base stations 104B and 106B in addition to the base stations 104A and 106A. Although not shown to avoid clutter, each of the base stations 104B and 106B is equipped with processing hardware that includes an RRC controller similar to the RRC controller 132A or 142A.

In some implementations and scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A can perform an immediate SN change to change the SN of the UE 102 from the base station 106A (source SN, or "S-SN") to the base station 104B (target SN, or "T-SN") while the UE 102 is communicating in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration to the UE 102 via the MN 104A for the immediate PSCell change to the cell 126A. The MN 104A may transmit the configuration immediately changing the PSCell to the cell 126A to the UE 102 via SRB1.

In other scenarios, the base station 104A can perform a conditional SN Addition procedure to first configure the base station 106B as a C-SN for the UE 102, i.e., conditional SN addition or change (CSAC). At this time, the UE 102 can be in SC with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In case of via the MN 104A, the MN 104A receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some implementations and scenarios, the condition associated with CSAC or CPAC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. After the UE 102 successfully completes the random access procedure on the C-PSCell 126A, the C-PSCell 126A becomes a PSCell 126A for the UE 102. The SN 106A then can start communicating data (user-plane data and/or control-plane data) with the UE 102 via the PSCell 126A. In another example, when the one or more measurement results the UE 102 obtains on the C-PSCell 126B are above a threshold configured by the MN 104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. After the UE 102 successfully completes the random access procedure on the C-PSCell 126B, the C-PSCell 126B becomes a PSCell 126B for the UE 102 and the C-SN 106B becomes an SN 106B. The SN 106B then can start communicating data (user-plane data and/or control-plane data) with the UE 102 via the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. In this scenario, the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 104B, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 104B, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 104B. More particularly, when the UE 102 operates in DC with the base station 104A and the base station 106A, the base station 104A operates as an MeNB, an Mng-eNB or an MgNB, and the base station 106A operates as an SgNB or an Sng-eNB. The cells 124A and 126B can partially overlap. When the UE 102 is in SC with the base station 104A, the base station 104A operates as an MeNB, an Mng-eNB or an MgNB, and the base station 106B operates as a C-SgNB or a C-Sng-eNB. When the UE 102 operates in DC with the base station 104A and the base station 106A, the base station 104A operates as an MeNB, an Mng-eNB or an MgNB, the base station 106A operates as an SgNB or an Sng-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

In other configurations or scenarios of the wireless communication system 100, the base station 104A, 104B can operate as an MeNB, an Mng-eNB, or an MgNB and the base station 106A, 106B can operate as an SgNB or an Sng-eNB. The UE 102 can communicate with the base station 104A or 104B and the base station 106A or 106B via the same radio access technology (RAT), such as EUTRA or NR, or via different RATs.

When the base station 104A is an MeNB and the base station 106A is an SgNB, the UE 102 can be in EN-DC with the MeNB 104A and the SgNB 106A. When the base station 104A is an Mng-eNB and the base station 106A is an SgNB, the UE 102 can be in NGEN-DC with the Mng-eNB 104A and the SgNB 106A. When the base station 104A is an MgNB and the base station 106A is an SgNB, the UE 102 can be in NR-DC with the MgNB 104A and the SgNB 106A. When the base station 104A is an MgNB and the base station 106A is an Sng-eNB, the UE 102 can be in NE-DC with the MgNB 104A and the Sng-eNB 106A.

Figure 1C:
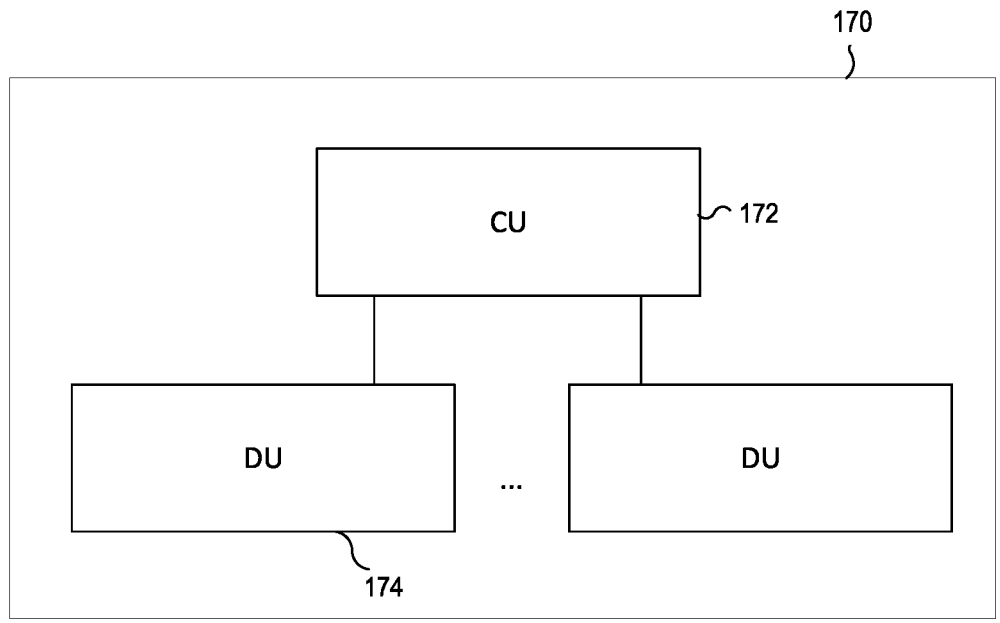
FIG. 1C is a block diagram of an example base station that can operate in the system of FIG. 1A or 1B.

FIG. 1C depicts an example distributed implementation of a base station 170 such as the base station 104A, 104B, 106A, or 106B. The base station 170 in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174F is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as an MN, an SN or a candidate SN (C-SN). The process hardware may include further a physical layer controller configured to manage or control one or more physical layer operations or procedures.

Figure 2:
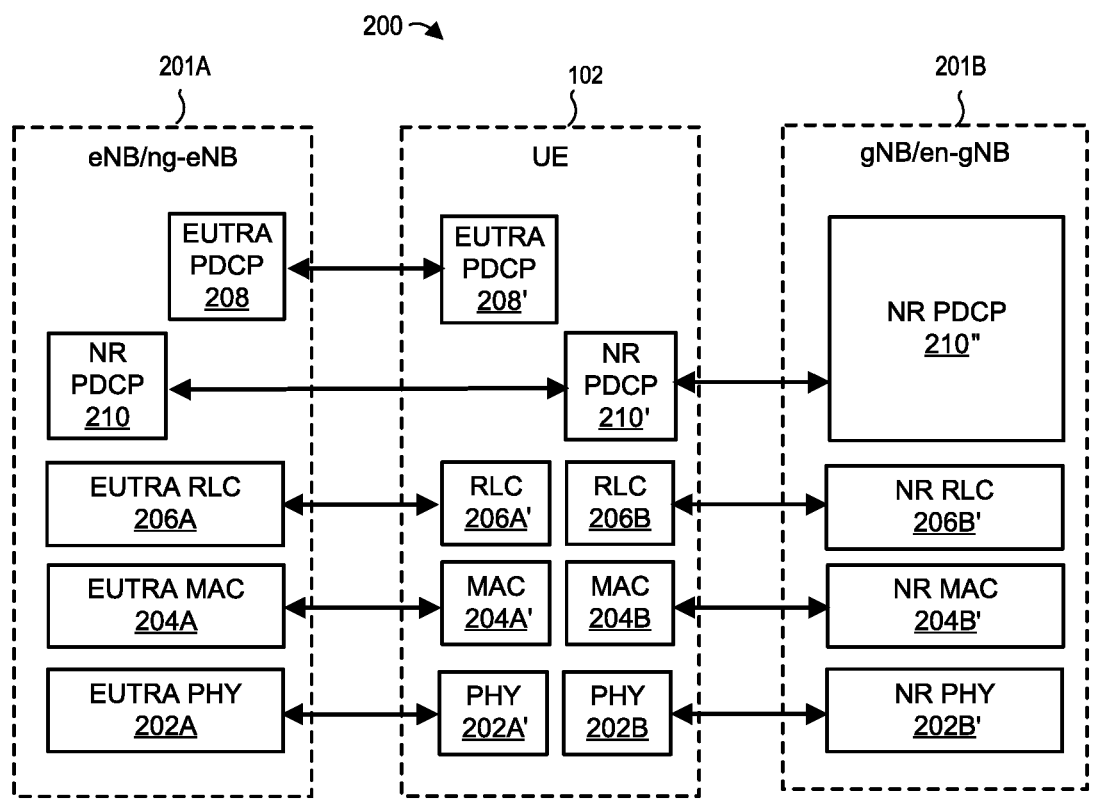
FIG. 2 is a block diagram of an example protocol stack, according to which the UE of FIG. 1A or 1B may communicate with the base station(s) of FIG. 1A or 1B.

FIG. 2 illustrates, in a simplified manner, an example radio protocol stack 200 according to which the UE 102 may communicate with an eNB/ng-eNB 201A or a gNB 201B (e.g., one or more of the base stations 104A, 104B, 106A, 106B). In the example stack 200, a physical layer (PHY) 202A, 202A' of EUTRA provides transport channels to the EUTRA MAC sublayer 204A, 204A', which in turn provides logical channels to the EUTRA RLC sublayer 206A, 206A'. The EUTRA RLC sublayer 206A, 206A' in turn provides RLC channels to the EUTRA PDCP sublayer 208, 208' and, in some cases, to the NR PDCP sublayer 210, 210', 210". Similarly, the NR PHY 202B, 202B' provides transport channels to the NR MAC sublayer 204B, 204B', which in turn provides logical channels to the NR RLC sublayer 206B, 206B'. The NR RLC sublayer 206B, 206B' in turn provides RLC channels to the NR PDCP sublayer 210, 210', 210". The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210, 210', 210" over the EUTRA RLC sublayer 206A, 206A'.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer, a SCG bearer, or a split bearer. The SN-terminated bearer can be, an MCG bearer, an SCG bearer or a split bearer. The MN-terminated bearer can be an SRB (e.g., SRB1 or SRB2) or a DRB. The SN-terminated bearer can an SRB or a DRB.

Next, several example scenarios in which a UE 102 and/or a RAN 105 manage a UE preferred configuration (or interchangeably referred herein as simply "preferred configuration") are discussed with reference to FIGS. 3A-14B. Generally, in these scenarios, the UE 102 can transmit one or more preferred configurations (i.e., a first preferred configuration, a second preferred configuration, as will be further described below) in a UEAssistanceInformation message to a base station (e.g., base station 104A, base station 104B, base station 106A) of the RAN 105 to suggest temporarily adjusting the number of SCells, the number of MIMO layers, the aggregated bandwidth for UL and/or DL, and/or other suitable configuration parameters that are in use when communicating with the UE 102. As such, in some implementations, the preferred configuration indicates a maximum number of SCells, a maximum number of MIMO layers, and/or a maximum aggregated bandwidth for uplink and downlink communications that are preferred by the UE 102. As used herein, the "number of SCells" may include a PSCell, or alternatively exclude the PSCell. In some implementations, the preferred configuration includes a discontinuous reception (DRX) configuration. The DRX configuration can include a DRX cycle and an on duration (or off duration). In yet other implementations, the preferred configuration includes indications for enabling/disabling 5G, enabling/disabling DC, or enabling/disabling power saving. In other implementations, the preferred configuration includes configured grant assistance information for V2X sidelink communication (e.g., sl-UE-AssistanceInformationNR), minimum scheduling offset for cross-slot scheduling (e.g., minSchedulingOffsetPreference), and/or an indication of interest in reference time information (e.g., reference TimeInfoInterest). In some implementations, the UE assistance information message can be an existing RRC message such as a UEAssistanceInformation message or a newly defined RRC message. In other implementations, the UE assistance information message can be an RRC response message in response to the RRC message enabling the UE 102 to transmit a preferred configuration. In yet other implementations, the UE 102 can indicate to release a first preferred configuration in a second preferred configuration or a UE assistance information message. In yet other implementations, the UE 102 can indicate to release some parameters contained within a first preferred configuration in a second preferred configuration or a UE assistance information message.

Now referring to FIGS. 3A-3C, in various scenarios, the UE 102 can release a preferred configuration prior to suspending a radio connection with a base station, or retain a preferred configuration after suspending a radio connection with a base station (and later override the preferred configuration with new preferred configuration upon resuming the radio connection). The UE 102 can be in SC with the base station, or in DC with the base station and another base station. The base station can be an aggregated base station or a distributed base station that includes a central unit (CU) and a distributed unit (DU).

Figure 3A:
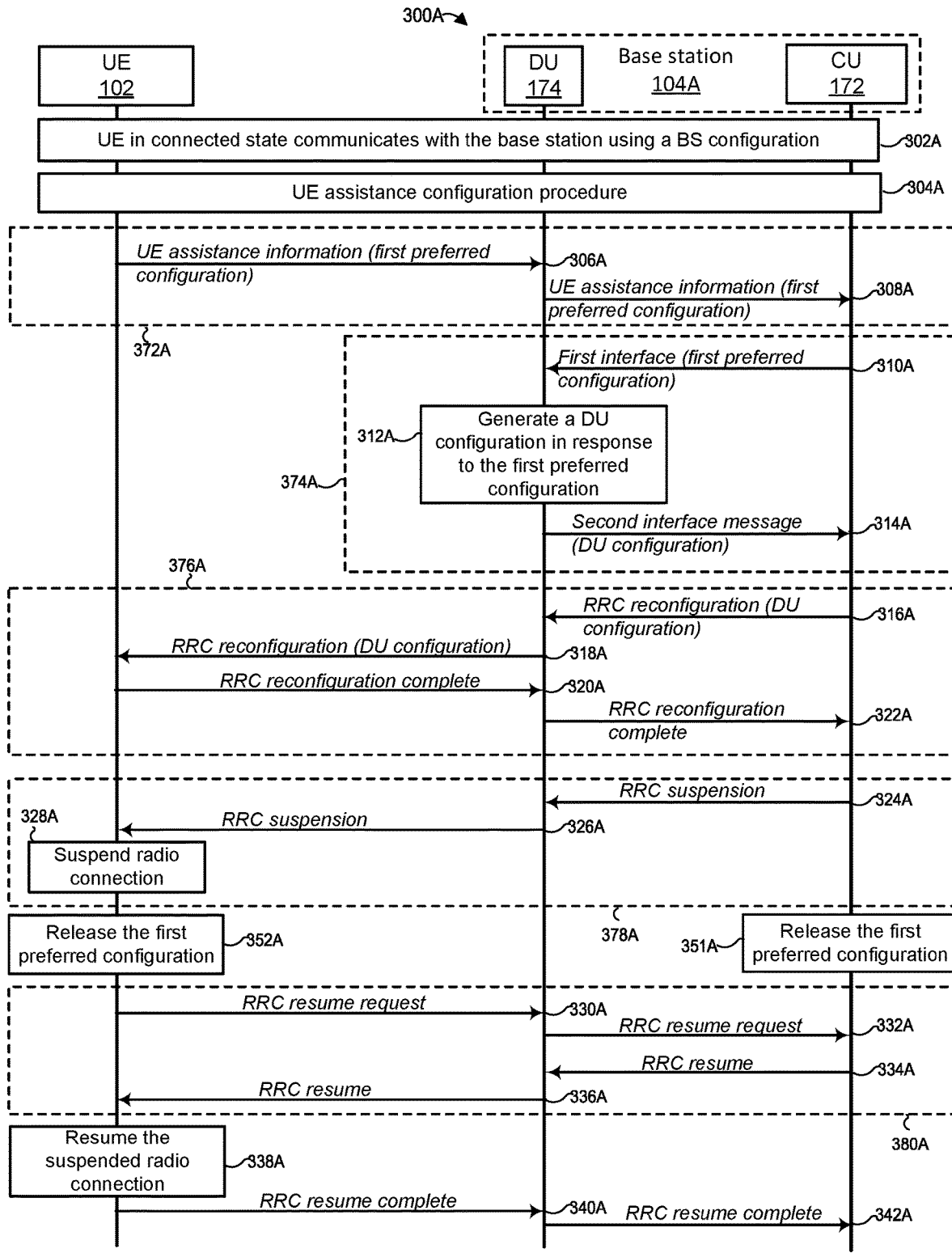
FIG. 3A is a messaging diagram of an example scenario in which the UE releases a preferred configuration after suspending a radio connection with a base station.

Referring first to FIG. 3A, in a scenario 300A, the base station 104A operates as a serving base station for UE 102. In some implementations, the base station 104A is a distributed base station that includes a central unit (CU) 172 and a distributed unit (DU) 174, as shown in FIG. 3A. In other implementations, the base station 104A is an aggregated base station (i.e., not split into a CU and a DU).

Initially, the UE 102 operates in a connected state (e.g., RRC_CONNECTED) and communicates 302A data (e.g., uplink (UL) PDUs and/or downlink (DL) PDUs) in SC with the CU 172 and the DU 174 via cell 124A by using a BS configuration which includes multiple configurations, each corresponding to a respective configuration parameter. The configuration parameters specify the SCell(s), MIMO layers, aggregated bandwidth, discontinuous reception (DRX) configuration, etc. configured to the UE 102 in the BS configuration. In other implementations and scenarios, although not shown in FIG. 3A, the UE 102 can communicate 302A data in DC with the base station 104A operating as an MN and an SN (e.g., the base station 106A), or in DC with the CU 172, the DU 174, and a secondary DU. In some implementations, during event 302A, the CU 172 can receive UE capabilities of the UE 102 from the UE 102, the CN 110 (e.g., an MME 114 or AMF 164), or another base station (e.g., base station 104B), and forward the UE capabilities to the DU 174. In turn, the DU 174 can establish the multiple configuration parameters according to the UE capabilities. In some implementations, the CU 172 can receive the UE capabilities in an information element (IE) (e.g., a UE-EUTRA-Capability IE, a UE-NR-Capability IE, a UE-MRDC-Capability IE) or in a UE capability information message that includes the IE, and forward the IE or UE capability information message to the DU 174.

Later in time, the CU 172 performs 304A a UE assistance configuration procedure with the UE 102 via the DU 174 to enable (i.e., permit or allow) the UE 102 to transmit a preferred configuration to the base station 104A. During the UE assistance configuration procedure, the CU 172 can transmit an RRC message (e.g., an RRC reconfiguration message or a newly defined RRC message) to the UE 102 via the DU 174 to enable the UE 102 to transmit a preferred configuration, and in turn, the UE 102 can transmit an RRC response message (e.g., an RRC reconfiguration complete message or a newly defined RRC response message) to the CU 172 via the DU 174, in some implementations. The CU 172 can include a field or IE (e.g., a newly defined field/IE or an existing field/IE in 3GPP specification 36.331 or 38.331) in the RRC message to enable the UE 102 to transmit a preferred configuration. For example, the CU 172 can include an OtherConfig IE, an overheating configuration (e.g., OverheatingAssistance IE or overheatingAssistanceConfig field), a power saving configuration (e.g., PowerPrefIndicationConfig IE), or the OtherConfig IE that includes the OverheatingAssistanceConfig IE, the overheatingAssistanceConfig field, and/or the PowerPrefIndicationConfig IE in the RRC message to enable the UE 102 to provide the preferred configuration. In another example, the CU 172 can include a reference time interest reporting (e.g., reference TimeInterestReporting-r16), a sidelink configuration (e.g., sl-AssistanceConfigNR-r16), an in-device coexistence (IDC) configuration (e.g., idc-AssistanceConfig), a Bluetooth configuration (e.g., btNameList-r16), a wireless local area network (WLAN) configuration (e.g., wlanNameList-r16), a sensor configuration (e.g., sensorNameList-r16), a location configuration (e.g., obtainCommonLocationConfig-r16), and/or at least one power saving configuration (e.g., drx-PreferenceConfig-r16, maxBW-PreferenceConfig-r16, maxCC-PreferenceConfig-r16, maxMIMO-LayerPreferenceConfig-r16, minSchedulingOffsetPreferenceConfig-r16, releasePreferenceConfig-r16) in the RRC message to enable the UE 102 to provide the preferred configuration. In other implementations, during the UE assistance configuration procedure, the CU 172 can broadcast an RRC message (e.g., system information block) via PCell 124A to enable the UE 102 to transmit the preferred configuration.

After the UE 102 is enabled to transmit a preferred configuration, the UE 102 transmits 306A a UE assistance information message including the preferred configuration (i.e., a first preferred configuration) to the DU 174. The DU 174 in turn sends 308A the UE assistance information message to the CU 172. The events 306A and 308A are collectively referred to in FIG. 3A as a UE assistance information procedure 372A.

The UE 102 can transmit 306A the first preferred configuration for different reasons in various scenarios and implementations. In one implementation, the UE 102 can transmit the first preferred configuration if the UE 102 is not satisfied with configuration parameters in the BS configuration that are used by the UE 102 to communicate with the base station 104A, as described in event 302A (i.e., the configuration parameters do not satisfy the preferences of the UE 102 as defined in the first preferred configuration). In another implementation, the UE 102 can transmit the first preferred configuration even if the UE 102 is satisfied with the configuration parameters, to prevent the base station 104A from changing the configuration parameters to ones that the UE 102 may not prefer. In another implementation, the UE 102 can transmit the first preferred configuration if the UE 102 experiences an overheating situation (e.g., due to heavy application processing), detects low battery power, or otherwise determines to conserve power, e.g., in response to the overheating configuration received in the RRC message from the base station 104A. In this way, the UE 102 can transmit the first preferred configuration for power saving purposes (even if the UE 102 does not experience an overheating situation), overheating purposes, or both.

In response to receiving 308A the UE assistance information message from the DU 174, the CU 172 sends 310A a first interface message (e.g., UE Context Modification Request message, UE Context Setup Request message) including the first preferred configuration to the DU 174. In some implementations, the DU 174 generates 312A a DU configuration for the UE 102 in response to the first preferred configuration if the configuration parameters in the BS configuration do not satisfy the first preferred configuration, or if the DU 174 determines to modify the configuration parameters despite the configuration parameters satisfying the first preferred configuration. The DU 174 generates the DU configuration in a manner that would not exceed the capabilities of the UE 102, e.g., by considering the UE capabilities included in the first interface message received from the CU 172 at event 310A.

In some scenarios and implementations, the UE 102 can send the first preferred configuration to the base station 104A to request that the base station 104A generate a DU configuration that would not maximize capabilities of the UE 102 as defined in the UE capabilities. For example, in response to receiving the first preferred configuration from the UE 102 that indicates a preferred maximum number of SCell(s), a preferred maximum number of MIMO layer(s), and/or maximum aggregated bandwidth that is less than the corresponding maximum number of SCell(s), MIMO layer(s), and/or aggregated bandwidth supported by the UE capabilities, the base station 104A can generate a DU configuration that indicates no more than the preferred maximum number of SCell(s), MIMO layer(s), and/or aggregated bandwidth indicated in the first preferred configuration. Effectively, the DU configuration can be generated by the base station 104A (e.g., the DU 174 of the base station 104A) for the UE 102 to release some of the SCell(s), MIMO layer(s), and/or aggregated bandwidth that were indicated in the BS configuration mentioned above with respect to event 302A, to ensure that the UE 102 communicates with the DU 174 via the preferred maximum number of SCell(s), MIMO layer(s), and/or aggregated bandwidth or less as indicated in the first preferred configuration.

After the DU 174 generates the DU configuration at event 312A, the DU 174 can then send 314A a second interface message (e.g., UE Context Modification Response message, UE Context Modification Required message, UE Context Setup Response message) including the DU configuration to the CU 172. In other implementations, in response to receiving 310A the first preferred configuration, the DU 174 need not generate the DU configuration if the configuration parameters in the BS configuration satisfy the first preferred configuration. In this case, the DU 174 may omit the DU configuration in the second interface message, or may include a DU configuration irrelevant to the first preferred configuration in the second interface message. In response to receiving the second interface message from the DU 174, the CU 172 can send a UE Context Modification Confirm message to the DU 174. The events 310A, 312A, and 314A are collectively referred to in FIG. 3A as a DU reconfiguration procedure 374A.

In some implementations, after receiving the DU configuration from the DU 174, the CU 172 sends 316A an RRC reconfiguration message including the DU configuration to the DU 174, which in turn transmits 318A the RRC reconfiguration message to the UE 102. In response, the UE 102 can transmit 320A an RRC reconfiguration complete message to the DU 174, which in turn sends 322A the RRC reconfiguration complete message to the CU 172. By receiving the DU configuration, the UE 102 can update the multiple configuration parameters previously provided by the base station 104A at event 302A with the DU configuration, and communicate with the DU 174 by using the updated configuration parameters. In some implementations, the CU 172 can send 316A a DL RRC Message Transfer message including the RRC reconfiguration message to the DU 174, which in turn can send 322A a UL RRC Message Transfer message including the RRC reconfiguration complete message to the CU 172. The events 316A, 318A, 320A, and 322A are collectively referred to in FIG. 3A as an RRC reconfiguration procedure 376A.

Although the DU 174 is described as generating one DU configuration at step 312A, the DU 174 may generate multiple DU configurations. If the DU 174 generates multiple DU configurations, the CU 172 and the UE 102 can perform the RRC reconfiguration procedure 376A multiple times so that the UE 102 can obtain the multiple DU configurations.

In some scenarios and implementations, after receiving the first preferred configuration at event 372A, the CU 172 may perform a DU reconfiguration procedure with a candidate DU (C-DU) which can be e.g., the DU 174 or a DU not shown in FIG. 3A, similar to the DU reconfiguration procedure 374A, to prepare a conditional configuration for conditional handover (CHO) for the UE 102. In the DU reconfiguration procedure, the CU 172 can send a first interface message, similar to event 310A, to the C-DU to obtain a C-DU configuration generated by the C-DU that satisfies the first preferred configuration. In other scenarios and implementations, either before or after event 372A, the CU 172 may perform a DU reconfiguration procedure with a C-DU which can be e.g., the DU 174 or a DU not shown in FIG. 3A, similar to the DU reconfiguration procedure 374A, to prepare a conditional configuration for CHO for the UE 102. In the DU reconfiguration procedure, the CU 172 can send a first interface message, similar to event 310A, but exclude the first preferred configuration, to the C-DU to obtain a C-DU configuration generated by the C-DU according to the UE capabilities stored in the C-DU or included in the first interface message.

In any event, after the CU 172 obtains the C-DU configuration, the CU 172 generates an RRC message including the C-DU configuration, a conditional configuration including the RRC message, and an RRC reconfiguration message including the conditional configuration. Then the CU 172 transmits the RRC reconfiguration message to the UE 102 via the DU 174. The UE 102 can transmit an RRC reconfiguration complete message to the CU 172 via the DU 174 in response. Later, if the UE 102 detects that a condition for connecting to a candidate cell is satisfied, the UE 102 connects to the C-DU via the candidate cell. The CU 172 can perform a DU reconfiguration procedure and an RRC reconfiguration procedure with the UE 102 and C-DU to transmit another DU configuration satisfying the first preferred configuration to the UE 102, similar to the DU reconfiguration procedure 374A and RRC reconfiguration procedure 376A.

If the CU 172 transmits a conditional configuration (i.e., a first conditional configuration) to the UE 102 before receiving the first preferred configuration from the UE 102, the CU 172 may not update the conditional configuration even though the conditional configuration does not satisfy the first preferred configuration, in one implementation. In another implementation, if the conditional configuration does not satisfy the first preferred configuration, the CU 172 can transmit an RRC reconfiguration message releasing the conditional configuration to the UE 102. In yet another implementation, the CU 172 can transmit an RRC reconfiguration message to the UE 102 for releasing the conditional configuration in response to receiving the first preferred configuration from the UE 102. In yet another implementation, if the conditional configuration does not satisfy the first preferred configuration received from the UE 102, the CU 172 can transmit an RRC reconfiguration message including another conditional configuration (i.e., a second conditional configuration) to the UE 102 to replace the first conditional configuration. The CU 172 can perform a DU reconfiguration procedure with the C-DU to obtain a new C-DU configuration satisfying the first preferred configuration and transmit the second conditional configuration including the new C-DU configuration to the UE 102 in a similar manner as described above.

In some scenarios and implementations, after receiving the first preferred configuration at event 372A, the CU 172 may perform a handover preparation procedure with a candidate base station (C-BS) (e.g., base station 106B not shown in FIG. 3A), to prepare a conditional configuration for CHO for the UE 102. In the handover preparation reconfiguration procedure, the CU 172 can send a Handover Request message (i.e., a CHO command) to the C-BS to obtain a C-BS configuration. The C-BS can generate a C-BS configuration satisfying the first preferred configuration and send a Handover Request Acknowledge message including the C-BS configuration to the CU 172 in response to the Handover Request message. In other scenarios and implementations, either before or after event 372A, the CU 172 may perform a handover preparation procedure with a C-BS (e.g., base station 106B not shown in FIG. 3A), to prepare a conditional configuration for CHO for the UE 102. In the handover preparation reconfiguration procedure, the CU 172 can send a Handover Request message excluding the first preferred configuration to the C-BS to obtain a C-BS configuration. The C-BS can generate a C-BS configuration according to the UE capabilities included in the Handover Request message and send a Handover Request Acknowledge message including the C-BS configuration to the CU 172 in response to the Handover Request message.

In any event, after the CU 172 obtains the C-BS configuration, the CU 172 generates a conditional configuration including the C-BS configuration and an RRC reconfiguration message including the conditional configuration. Then the CU 172 transmits the RRC reconfiguration message to the UE 102 via the DU 174. The UE 102 can transmit an RRC reconfiguration complete message to the CU 172 via the DU 174 in response. Later, if the UE 102 detects that a condition for connecting to a candidate cell is satisfied, the UE 102 connects to the C-BS via the candidate cell. If the C-BS receives the first preferred configuration from the UE 102 or the CU 172, the C-BS can perform a DU reconfiguration procedure and an RRC reconfiguration procedure with the UE 102 and C-DU to transmit another DU configuration satisfying the first preferred configuration to the UE 102, similar to the DU reconfiguration procedure 374A and RRC reconfiguration procedure 376A.

If the CU 172 transmits a conditional configuration (i.e., a first conditional configuration) to the UE 102 before receiving the first preferred configuration from the UE 102, the CU 172 may not update the conditional configuration even though the conditional configuration does not satisfy the first preferred configuration, in one implementation. In another implementation, if the conditional configuration does not satisfy the first preferred configuration, the CU 172 can transmit to the UE 102 an RRC reconfiguration message for releasing the conditional configuration. In yet another implementation, the CU 172 can transmit an RRC reconfiguration message to the UE 102 for releasing the conditional configuration in response to receiving the first preferred configuration from the UE 102. In yet another implementation, if the conditional configuration does not satisfy the first preferred configuration received from the UE 102, the CU 172 can transmit an RRC reconfiguration message including another conditional configuration (i.e., a second conditional configuration) to the UE 102 to replace the first conditional configuration. The CU 172 can perform a DU reconfiguration procedure with the C-DU to obtain a new C-DU configuration satisfying the first preferred configuration and transmit the second conditional configuration including the new C-DU configuration to the UE 102 in a similar manner as described above.

Later in time (e.g., after the CU 172 detects that traffic of the UE 102 is inactive on the BS-terminated radio bearer(s)), the CU 172 determines to suspend a radio connection (e.g., including an RRC connection) with the UE 102. The CU 172 then sends 324A an RRC suspension message (e.g., an RRCRelease message, an RRCConnectionRelease message) to the DU 174, which in turn transmits 326A the RRC suspension message to the UE 102. As a result, the UE 102 suspends 328A the radio connection, and can transition to an inactive state or an idle state. In some implementations, the CU 172 can send 324A a UE Context Release Command message including the RRC suspension message to the DU 174, which in turn can send a UE Context Release Complete message to the CU 172 in response. The RRC suspension message can include a SuspendConfig IE, an RRC-Inactive-Config-r15 IE, or a ResumeIdentity-r13 IE. The events 324A, 326A, and 328A are collectively referred to in FIG. 3A as an RRC suspension procedure 378A.

As discussed above, in some implementations, in response to receiving 310A the first preferred configuration, the DU 174 need not generate the DU configuration if the configuration parameters in the BS configuration satisfy the first preferred configuration. In these implementations, the base station 104A need not perform the DU reconfiguration procedure 374A and the RRC reconfiguration procedure 376A before the RRC suspension procedure 378A. The base station 104A may not perform the DU reconfiguration procedure 374A and the RRC reconfiguration procedure 376A for other reasons, such as when the CU 172 is transmitting a high volume of data to the UE 102, or is otherwise busy, for example.

Later in time after suspending 328A the radio connection, the UE 102 can perform an RRC resume procedure 380A to transition from the inactive or idle state to the connected state, e.g., in response to determining to initiate a data transmission with the base station 104A, or in response to a Paging message received from the base station 104A. In the RRC resume procedure 380A, the UE 102 transmits 330A an RRC resume request message to the DU 174, which in turn sends 332A the RRC resume request message to the CU 172. In response, the CU 172 sends 334A an RRC resume message to the DU 174, which in turn transmits 336A the RRC resume message to the UE 102. As a result, the UE 102 resumes 338A the suspended radio connection in response to the RRC resume message and transitions to the connected state. The UE 102 can transmit 340A an RRC resume complete message to the DU 174, which in turn can send 342A the RRC resume complete message to the CU 172. Although the UE 102 is described as performing the RRC resume procedure 380A with the DU 174, in other implementations, the UE 102 can perform the RRC resume procedure 380A with another DU (i.e., different than DU 174) connected to the CU 172.

In some implementations, after the base station 104A performs the RRC suspension procedure 378A with the UE 102, the UE 102 can release 352A the first preferred configuration (e.g., in response to receiving 326A the RRC suspension message). Similarly, in some implementations, the CU 172 can release 351A the first preferred configuration in response to determining to suspend the radio connection with the UE 102. In other implementations, the UE 102 can release 352A the first preferred configuration in response to initiating the RRC resume procedure 380A (e.g., transmitting 330A the RRC resume request message), during the RRC resume procedure 380A (e.g., in response to receiving 336A the RRC resume message), or after transmitting 340A the RRC resume complete message. Similarly, in some implementations, the CU 172 can release 351A the first preferred configuration during the RRC resume procedure 380A (e.g., in response to receiving 332A the RRC resume request message, transmitting 334A the RRC resume message), or after receiving 342A the RRC resume complete message.

By releasing the first preferred configuration at the UE 102 and the CU 172, the UE 102 and the CU 172 need not be limited to communicating with each other according to the first preferred configuration upon resuming the suspended radio connection. For example, the UE 102 may have recovered from an overheating situation or increased battery power since the inactive state or an idle state, such that the UE 102 is able to utilize more SCell(s), MIMO layer(s), and/or aggregated bandwidth than those indicated in the first preferred configuration after transitioning back to the connected state. Because the UE 102 and the CU 172 are still aware of the BS configuration (including the updated configuration parameters configured by the RRC reconfiguration procedure 376A), the UE 102 and the CU 172 may proceed to communicate using the BS configuration again, for example.

In some implementations, in addition to releasing the first preferred configuration, the UE 102 can either release or retain some or all configurations in the BS configuration in response to receiving 326A the RRC suspension message (i.e., while the UE 102 is in inactive state or idle state). Similarly, in addition to releasing the first preferred configuration, the CU 172 can also either release or retain some or all configurations in the BS configuration while the UE 102 is in inactive state or idle state. In some implementations, the UE 102 can release or update the retained configuration(s) in the BS configuration if the UE 102 receives configuration(s) in the RRC resume message from the base station 104A at event 336A. In one such implementation, the CU 172 can obtain another DU configuration (i.e., second DU configuration) from the DU 174, e.g., by using a UE Context Setup procedure (e.g., as will be described in FIG. 4A below), and include the second DU configuration in the RRC resume message. In another such implementation, the CU 172 can generate configuration(s) and include the generated configuration(s) in the RRC resume message. In other implementations, after receiving the RRC resume complete message, the CU 172 can obtain another DU configuration (i.e., second DU configuration) from the DU 174, e.g., by using a DU reconfiguration procedure similar to the DU reconfiguration procedure 374A and perform an RRC reconfiguration procedure with the UE 102, similar to the RRC reconfiguration procedure 376A. The CU 172 can include the second DU configuration in an RRC reconfiguration message in the RRC reconfiguration procedure. Because the CU 172 releases the first preferred configuration at event 351A, the CU 172 does not send the first preferred configuration to the DU 174 during the DU reconfiguration procedure or the UE Context Setup procedure (see FIG. 4A). Therefore, the DU 174 generates the second DU configuration in a manner that would not underestimate the capabilities of the UE 102, e.g., by considering the UE capabilities rather than the first preferred configuration.

In some implementations, while the UE 102 is in inactive state or idle state, the UE 102 can retain the current security keys (e.g., $K_{gNB}$ and $K_{RRCint}$ keys), a Robust Header Compression (ROHC) state if ROHC is configured at the UE 102, QoS flow to DRB mapping rules, a Cell Radio Network Temporary Identifier (C-RNTI) used in a source PCell (e.g., PCell 124A), a cell identity (cellIdentity) and a physical cell identity of the source PCell, and other configuration parameters in a radio link control (RLC) configuration (e.g., RLCBearerConfig IE(s)), a medium access control (MAC) configuration (e.g., MAC-CellGroupConfig IE(s)) and/or a physical layer configuration (e.g., PhysicalCellGroupConfig IE(s)). In some implementations, while the UE 102 is in inactive state or idle state, the UE 102 can retain the field or IE that enables the UE 102 to transmit the first preferred configuration. In other implementations, the UE 102 can release configurations within ReconfigurationWithSync IE and/or ServingCellConfigCommonSIB IE and/or the field or IE that enables the UE 102 to transmit the first preferred configuration in response to the RRC suspension message in the RRC suspension procedure 378A or during the RRC resume procedure 380A.

In some implementations, after the base station 104A performs the RRC suspension procedure 378A with the UE 102, the UE 102 can release the OtherConfig IE, the overheating configuration, and/or the power saving configuration (e.g., in response to receiving 326A the RRC suspension message). Similarly, in some implementations, the CU 172 can release the OtherConfig IE, the overheating configuration, and/or the power saving configuration in response to determining to suspend the radio connection with the UE 102. In other implementations, the UE 102 can release the OtherConfig IE, the overheating configuration, and/or the power saving configuration in response to initiating the RRC resume procedure 380A (e.g., transmitting 330A the RRC resume request message), during the RRC resume procedure 380A (e.g., in response to receiving 336A the RRC resume message), or after transmitting 340A the RRC resume complete message. Similarly, in some implementations, the CU 172 can release the OtherConfig IE, the overheating configuration, and/or the power saving configuration during the RRC resume procedure 380A (e.g., in response to receiving 332A the RRC resume request message, transmitting 334A the RRC resume message), or after receiving 342A the RRC resume complete message. The UE 102 can disable transmission of a UE assistance information message in response to releasing the OtherConfig IE, the overheating configuration, and/or the power saving configuration.

In the first preferred configuration or UE assistance information message, the UE 102 can include reducedCCsDL field to indicate a preferred maximum number of SCell(s). The UE 102 may or may not include the reducedCCsUL field in the first preferred configuration or UE assistance information message. If the CU 172 or the DU 174 receives the reducedCCsDL field with value X and the reducedCCsUL field with value Y, and X is smaller than Y, the CU 172 or the DU 174 can ignore the reducedCCsUL field.

In some implementations, the DU configuration described above includes at least one of physical configuration(s), medium access control (MAC) configuration(s), and radio link configuration(s). The DU configuration may not include a radio bearer configuration. For example, the DU configuration can be a CellGroupConfig IE, a RadioResourceConfigDedicated IE, a RRCConnectionReconfiguration-r8-IEs IE or a RRCReconfiguration-IEs IE.

In some implementations, the BS configuration described above can be an RRCReconfiguration message, RRCReconfiguration-IEs, or the CellGroupConfig IE conforming to 3GPP TS 38.331, or an RRCConnectionReconfiguration message or RRCConnectionReconfiguration-IEs conforming to 3GPP TS 36.331. In other implementations, the BS configuration can include configurations in the CellGroupConfig IE, RRCReconfiguration-IEs, or RRCConnectionReconfiguration-IEs. In yet other implementations, the BS configuration can include configurations in a ServingCellConfigCommonSIB IE. In further implementations, the BS configuration can also include radio bearer configuration(s) (RadioBearerConfig IE, DRB-ToAddMod IEs and/or SRB-ToAddMod IEs) and/or a measurement configuration (MeasConfig IE).

In some implementations, if the base station 104A is a gNB, the RRC reconfiguration message and the RRC reconfiguration complete message can be an RRCReconfiguration message and an RRCReconfigurationComplete message, respectively. In other implementations, if the base station 104A is an eNB or an ng-eNB, the RRC reconfiguration message and the RRC reconfiguration complete message can be an RRCConnectionReconfiguration message and an RRCConnectionReconfigurationComplete message, respectively.

In some implementations, if the base station 104A is a gNB, the RRC resume request message, the RRC resume message, and the RRC resume complete message can be an RRCResumeRequest message, an RRCResume message, and an RRCResumeComplete message, respectively. In other implementations, if the base station 104A is an eNB or an ng-eNB, the RRC resume request message, the RRC resume message, and the RRC resume complete message can be an RRCConnectionResumeReuquest message, an RRCConnectionResume message, and an RRCConnectionResumeComplete message, respectively.

Figure 3B:
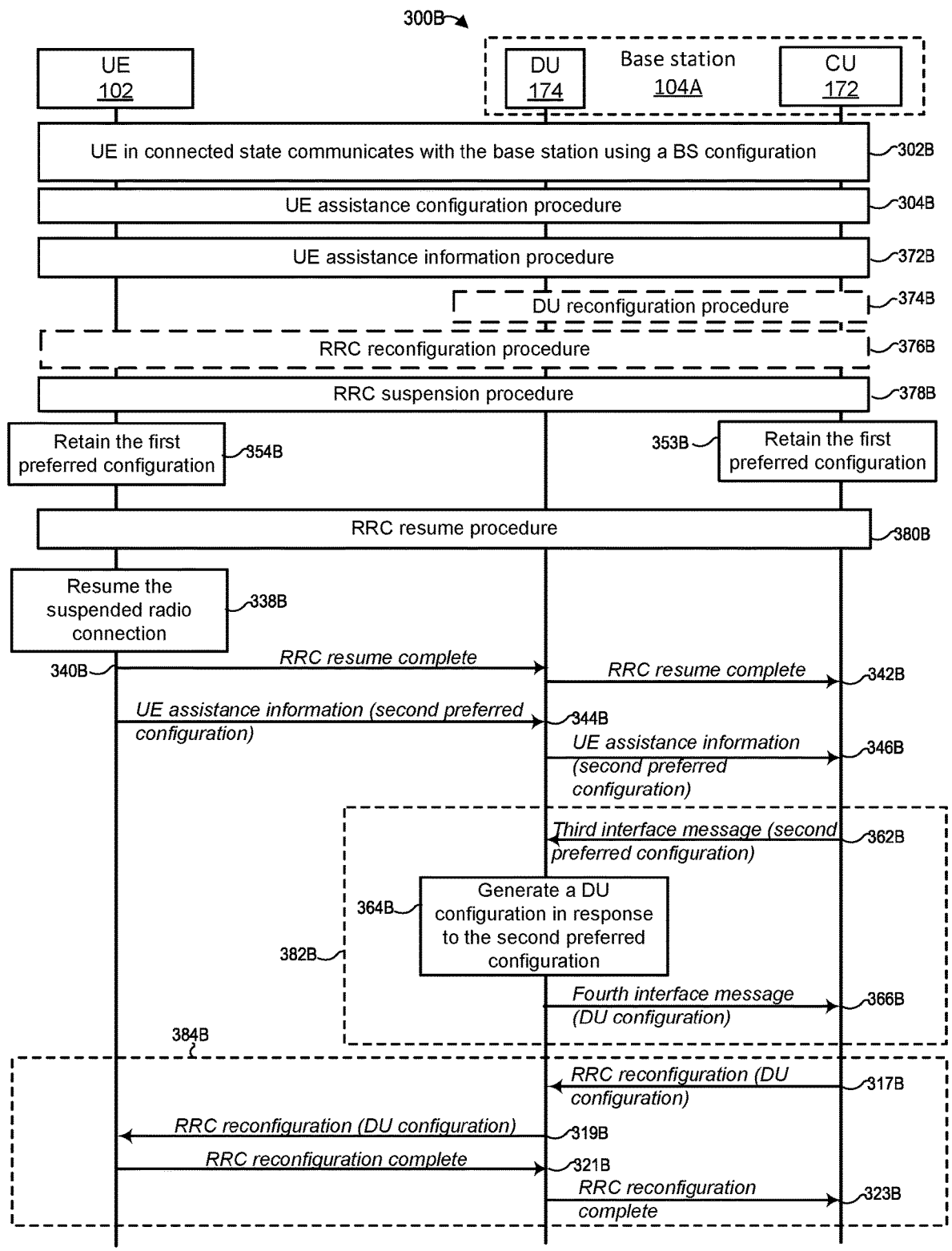
FIG. 3B is a messaging diagram of an example scenario in which the UE retains a preferred configuration after suspending a radio connection with a base station and later overrides the preferred configuration with new preferred configuration upon resuming the radio connection.

Referring now to FIG. 3B, in a scenario 300B, the base station 104A again operates as a serving base station for UE 102, similar to scenario 300A. Whereas in FIG. 3A the UE 102 and the CU 172 releases the first preferred configuration to revert back to using the BS configuration upon resuming communication with each other, in FIG. 3B the UE 102 and the base station 104A retain the first preferred configuration, and later the UE 102 provides a second preferred configuration to override the retained first preferred configuration upon resuming connectivity with the CU 172. The UE 102 thus initially retains the first preferred configuration but nevertheless releases the first preferred configuration prior to communicating data with the RAN 105 over the radio connection.

Generally, the CU 172 and DU 174 in FIG. 3B can perform similar actions as the CU 172 and DU 174 in FIG. 3A, respectively.

Initially, the UE 102 operates in a connected state and communicates 302B data with the CU 172 and the DU 174 via cell 124A by using a BS configuration, which includes multiple configurations, each corresponding to a respective configuration parameter, similar to event 302A.

Later in time, the CU 172 performs 304B a UE assistance configuration procedure with the UE 102 via the DU 174 to enable the UE 102 to transmit a preferred configuration to the base station 104A, similar to event 304A.

After the UE 102 is enabled to transmit a preferred configuration, the UE 102 performs a UE assistance information procedure 372B with the DU 174 and CU 172, similar to the UE assistance information procedure 372A, thereby providing the preferred configuration (i.e., a first preferred configuration) to the DU 174, which in turn provides the first preferred configuration to the CU 172.

In response to receiving the first preferred configuration from the DU 174, the CU 172 performs a DU reconfiguration procedure 374B with the DU 174, similar to the DU reconfiguration procedure 374A, thereby receiving a DU configuration (i.e., a first DU configuration) from the DU 174 that indicates no more than the preferred maximum number of SCell(s), MIMO layer(s), and/or aggregated bandwidth indicated in the first preferred configuration.

In some implementations, after receiving the first DU configuration from the DU 174, the CU 172 performs an RRC reconfiguration procedure 376B with the DU 174 and UE 102, similar to the RRC reconfiguration procedure 376A. Thus, the UE 102 can update the multiple configuration parameters previously provided by the base station 104A at event 302B with the first DU configuration, and communicate with the DU 174 by using the updated configuration parameters.

Later in time (e.g., after the CU 172 detects that traffic of the UE 102 is inactive on the BS-terminated radio bearer(s)), the CU 172 determines to suspend a radio connection (e.g., including an RRC connection) with the UE 102. In response to determining to suspend the radio connection, the CU 172 performs an RRC suspension procedure 378B, similar to the RRC suspension procedure 378A. As a result, the UE 102 suspends the radio connection, and can transition to an inactive state or an idle state.

Later in time after suspending the radio connection, the UE 102 can perform an RRC resume procedure 380B to transition from the inactive or idle state to the connected state, similar to the RRC resume procedure 380A. As a result, the UE 102 resumes 338B the suspended radio connection and transitions to the connected state. The UE 102 can transmit 340B an RRC resume complete message to the DU 174, which in turn can send 342B the RRC resume complete message to the CU 172, similar to events 340A and 342A, respectively.

In some implementations, after the base station 104A performs the RRC suspension procedure 378B with the UE 102, the UE 102 can retain 354B the first preferred configuration (e.g., in response to receiving an RRC suspension message during the RRC suspension procedure 378B). Similarly, in some implementations, the CU 172 can retain 353B the first preferred configuration in response to determining to suspend the radio connection with the UE 102. In other implementations, the UE 102 can retain 354B the first preferred configuration in response to initiating the RRC resume procedure 380B or during the RRC resume procedure 380B. Similarly, in some implementations, the CU 172 can retain 353B the first preferred configuration during the RRC resume procedure 380B.

After the UE 102 resumes 338B the suspended radio connection and transitions to the connected state, the UE 102 transmits 344B another UE assistance information message including another preferred configuration (i.e., a second preferred configuration) to the DU 174. The DU 174 in turn sends 346B the UE assistance information message to the CU 172.

By sending the second preferred configuration to the CU 172 via the DU 174, the UE 102 can override the first preferred configuration retained at the CU 172, so that upon resuming connectivity with the CU 172, the UE 102 and CU 172 can communicate using the second preferred configuration. As such, in contrast to releasing the first preferred configuration described above with respect to FIG. 3A, the UE 102 and the CU 172 can alternatively retain the first preferred configuration, yet override the first preferred configuration with the second preferred configuration for use after resuming connectivity.

The UE 102 can transmit 344B the second preferred configuration for different reasons in various scenarios and implementations. In one implementation, the UE 102 can transmit the second preferred configuration if the UE 102 is satisfied with configuration parameters in the BS configuration that are used by the UE 102 to communicate with the base station 104A, as described in event 302A (i.e., the configuration parameters satisfy the preferences of the UE 102 as defined in the second preferred configuration). In another implementation, the UE 102 can transmit the second preferred configuration if the UE 102 no longer experiences an overheating situation, no longer detects low battery power, or otherwise no longer determines to conserve power. In another implementation, the UE 102 can transmit the second preferred configuration if the UE 102 experiences a different overheating situation (e.g., less severe situation or more severe situation) or determines to conserve less or more power. In another implementation, the UE 102 can transmit the second preferred configuration if the UE 102 experiences more overheating than the overheating situation that triggered the UE 102 to generate the first preferred configuration.

In response to receiving 346B the UE assistance information message from the DU 174, the CU 172 sends 362B a fourth interface message (e.g., UE Context Modification Request message) including the second preferred configuration to the DU 174. In some implementations, the DU 174 generates 364B another DU configuration (i.e., a second DU configuration) for the UE 102 in response to the second preferred configuration if the configuration parameters at the UE 102 that were updated as a result of receiving the first DU configuration during the RRC reconfiguration procedure 376B do not satisfy the second preferred configuration, or if the DU 174 determines to modify the configuration parameters despite the configuration parameters satisfying the second preferred configuration. The DU 174 generates the second DU configuration in a manner that would not exceed the capabilities of the UE 102, e.g., by considering the UE capabilities.

In some scenarios and implementations, the UE 102 can send the second preferred configuration to the base station 104A to request that the base station 104A generate a second DU configuration that would not maximize capabilities of the UE 102 as defined in the UE capabilities. For example, in response to receiving the second preferred configuration from the UE 102 that indicates a preferred maximum number of SCell(s), MIMO layer(s), and/or aggregated bandwidth that is less than the corresponding maximum number of SCell(s), MIMO layer(s), and/or aggregated bandwidth supported by the UE capabilities but greater than the corresponding maximum number of SCell(s), MIMO layer(s), and/or aggregated bandwidth as indicated in the first preferred configuration, the base station 104A can generate a second DU configuration that indicates no more than the preferred maximum number of SCell(s), MIMO layer(s), and/or aggregated bandwidth indicated in the second preferred configuration. As another example, the second preferred configuration can indicate the same number of SCell(s), MIMO layer(s), and/or aggregated bandwidth that are supported by the UE capabilities or as indicated in the BS configuration.

After the DU 174 generates the second DU configuration at event 364B, the DU 174 can then send 366B a fourth interface message (e.g., UE Context Modification Response message, UE Context Modification Required message) including the second DU configuration to the CU 172. In other implementations, in response to receiving 362B the second preferred configuration, the DU 174 need not generate the second DU configuration if the configuration parameters in the first preferred configuration satisfy the second preferred configuration. In this case, the DU 174 may omit the second DU configuration in the fourth interface message, or may include a second DU configuration irrelevant to the first preferred configuration in the fourth interface message. In response to receiving the fourth interface message from the DU 174, the CU 172 can send a UE Context Modification Confirm message to the DU 174. The events 362B, 364B, and 366B are collectively referred to in FIG. 3B as a second DU reconfiguration procedure 382B.

In some implementations, after receiving the second DU configuration from the DU 174, the CU 172 sends 317B an RRC reconfiguration message including the second DU configuration to the DU 174, which in turn transmits 319B the RRC reconfiguration message to the UE 102. In response, the UE 102 can transmit 321B an RRC reconfiguration complete message to the DU 174, which in turn sends 323B the RRC reconfiguration complete message to the CU 172. Thus, the UE 102 can update the multiple configuration parameters that were previously updated in accordance with the first preferred configuration with the second DU configuration, and communicate with the DU 174 by using the updated configuration parameters. In some implementations, the CU 172 can send 317B a DL RRC Message Transfer message including the RRC reconfiguration message to the DU 174, which in turn can send 323B a UL RRC Message Transfer message including the RRC reconfiguration complete message to the CU 172. The events 317B, 319B, 321B, and 323B are collectively referred to in FIG. 3B as a second RRC reconfiguration procedure 384B.

Figure 3C:
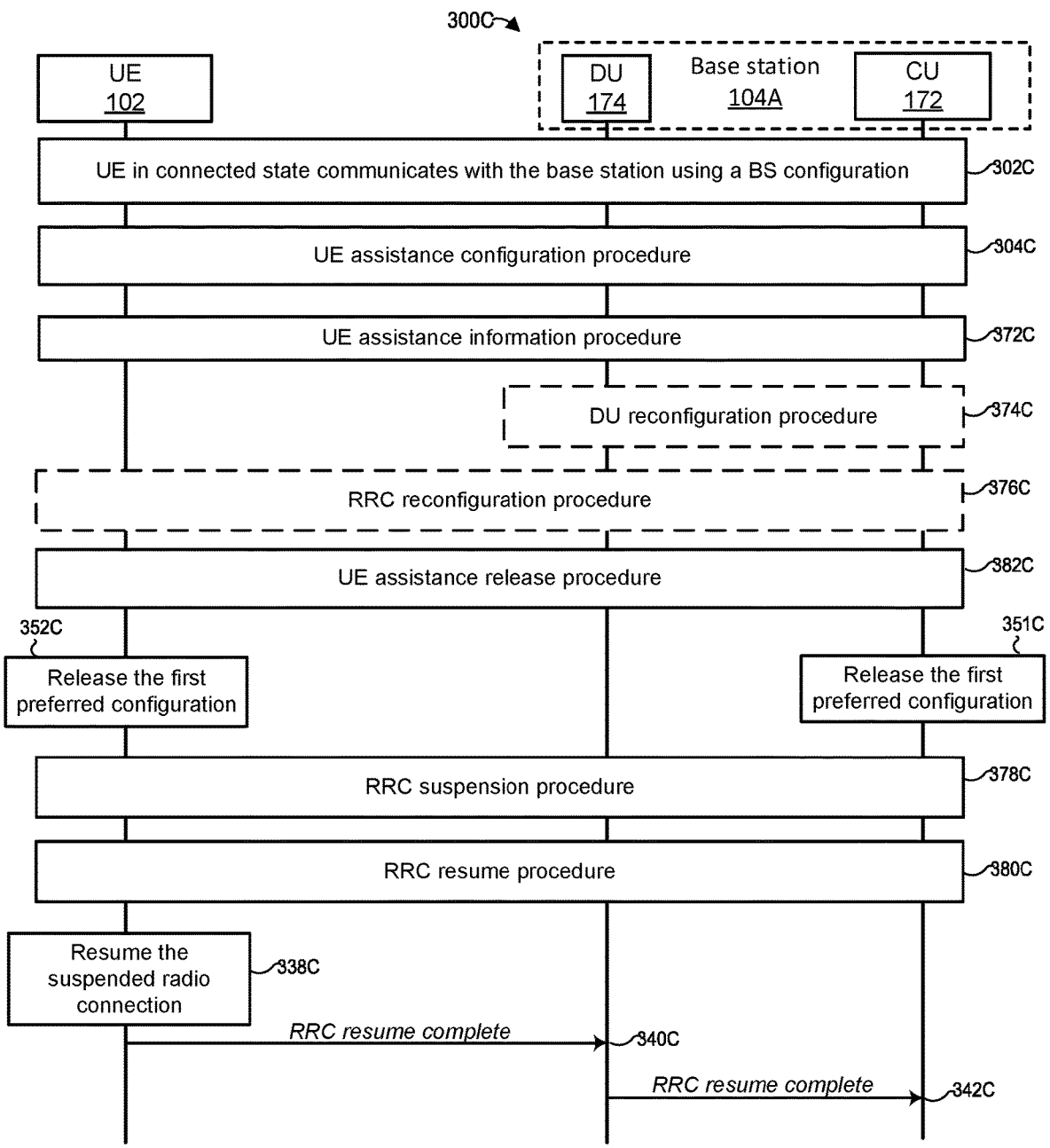
FIG. 3C is a messaging diagram of an example scenario in which the UE releases a preferred configuration prior to suspending a radio connection with a base station.

Referring now to FIG. 3C, in a scenario 300C, the base station 104A again operates as a serving base station for UE 102, similar to scenario 300A. Whereas in FIG. 3A the UE 102 and the base station 104A perform the RRC suspension procedure prior to the UE 102 and the base station 104A releasing the first preferred configuration, in FIG. 3C the UE 102 and the base station 104A release the first preferred configuration prior to performing the RRC suspension procedure. Generally, the CU 172 and DU 174 in FIG. 3C can perform similar actions as the CU 172 and DU 174 in FIG. 3A, respectively.

Initially, the UE 102 operates in a connected state and communicates 302C data with the CU 172 and the DU 174 via cell 124A by using a BS configuration, which includes multiple configurations, each corresponding to a respective configuration parameter, similar to event 302A.

Later in time, the UE 102 and base station 104A perform a UE assistance configuration procedure 304C, a UE assistance information procedure 372C, a DU reconfiguration procedure 374C, and then an RRC reconfiguration procedure 376C, similar to events 304A, 372A, 374A, and 376A, respectively.

After performing the RRC reconfiguration procedure 376C, the UE 102 and the base station 104A perform 382C a UE assistance release procedure. During the UE assistance release procedure, the CU 172 can transmit an RRC message (e.g., an RRC reconfiguration message or a newly defined RRC message) to the UE 102 via the DU 174 to instruct the UE 102 to release the first preferred configuration, in some implementations. Subsequently, in some implementations, the UE 102 can release 352C the first preferred configuration, and the CU 172 can release 351C the first preferred configuration, similar to events 352A and 351A, respectively. In some implementations, the UE 102 can release the OtherConfig IE, the overheating configuration, and/or the power saving configuration in response to the UE assistance release procedure. The UE 102 can disable transmission of a UE assistance information message in response to releasing the OtherConfig IE, the overheating configuration, and/or the power saving configuration. Similarly, in some implementations, the CU 172 can release the OtherConfig IE, the overheating configuration, and/or the power saving configuration in response to the UE assistance release procedure.

Later in time (e.g., after the CU 172 detects that traffic of the UE 102 is inactive on the BS-terminated radio bearer(s)), the CU 172 determines to suspend a radio connection (e.g., including an RRC connection) with the UE 102. In response to determining to suspend the radio connection, the CU 172 performs an RRC suspension procedure 378C, similar to the RRC suspension procedure 378A. As a result, the UE 102 suspends the radio connection, and can transition to an inactive state or an idle state.

After suspending the radio connection, the UE 102 can perform an RRC resume procedure 380C to transition from the inactive or idle state to the connected state, similar to the RRC resume procedure 380A. As a result, the UE 102 resumes 338C the suspended radio connection and transitions to the connected state. The UE 102 can transmit 340C an RRC resume complete message to the DU 174, which in turn can send 342C the RRC resume complete message to the CU 172, similar to events 340A and 342A, respectively.

Now referring to FIGS. 4A-4B, the UE 102 resumes the suspended radio connection with a disaggregated base station, and subsequently provides a preferred configuration to the CU of the disaggregated base station. The CU can transmit the preferred configuration to a DU of the disaggregated base station, or release the preferred configuration.

Figure 4A:
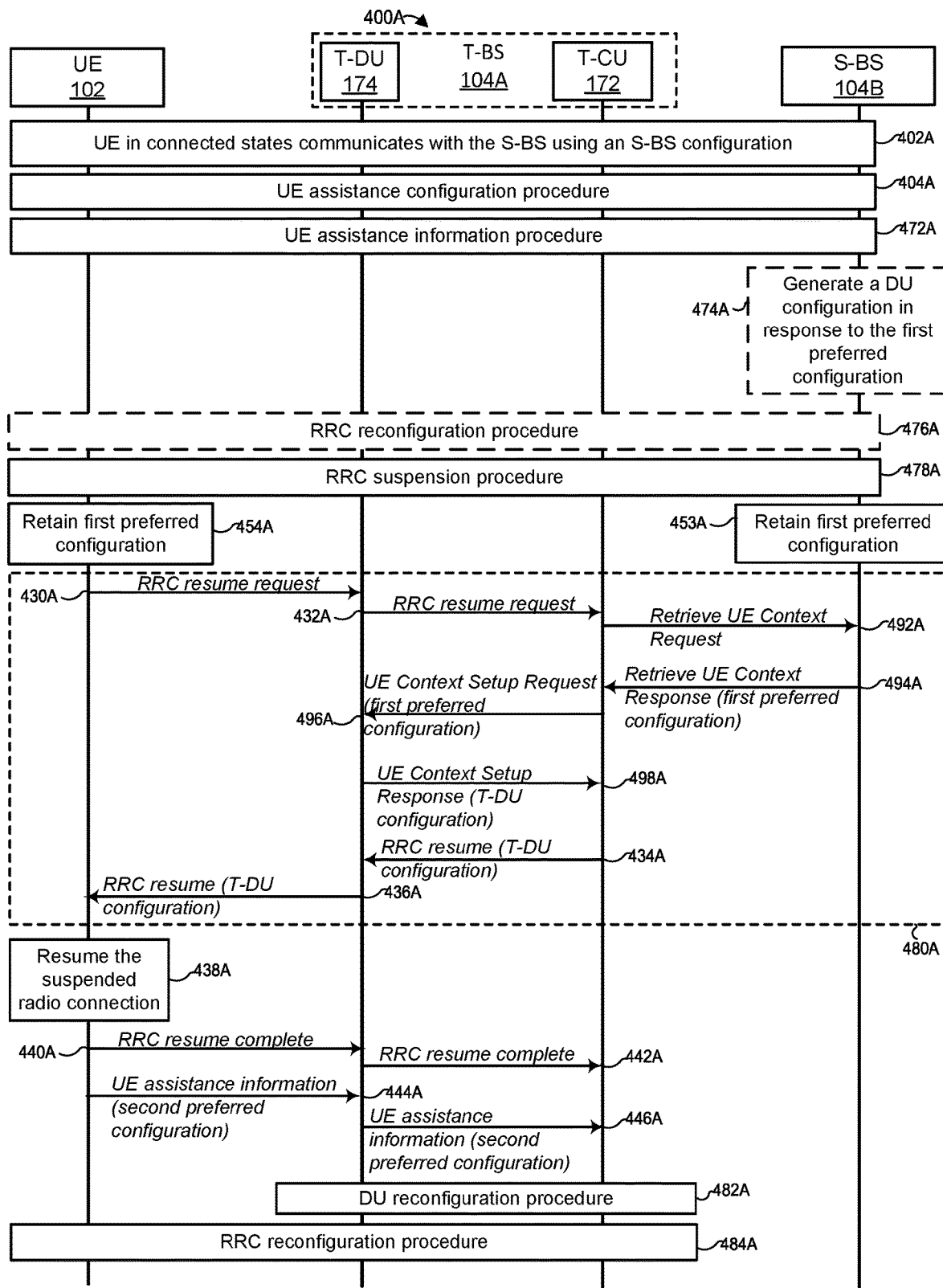
FIG. 4A is a messaging diagram of an example scenario in which a central unit (CU) of a disaggregated base station receives a preferred configuration of a UE and transmits the preferred configuration to a distributed unit (DU) of the disaggregated base station.

Referring first to FIG. 4A, in a resume scenario 400A, a source base station (S-BS) 104B operates as a serving base station for UE 102, similar to the serving base station 104A in scenario 300B. Whereas in FIG. 3B the UE 102 resumes the suspended radio connection with the same serving base station 104A and subsequently provides a second preferred configuration to the serving base station 104A, in FIG. 4A the UE 102 resumes the suspended radio connection with a target base station (e.g., T-BS 104A) in a handover scenario, and subsequently provides the second preferred configuration to the target base station. In some implementations, the S-BS 104B in FIG. 4A can be a distributed base station like the base station 104A in scenario 300B, and thus perform similar actions as the CU 172 and DU 174 in FIG. 3B, respectively. In another implementation, the S-BS 104B is an aggregated base station. In yet another implementation, the S-BS 104B and the T-BS 104A can share the same CU (i.e., T-CU 172), and thus the S-BS 104B and the T-BS 104A can be the same base station with two DUs. As such, in this implementation, messages described below that are exchanged between S-BS 104B and the T-BS 104A as separate base stations need not be exchanged. For ease of illustration, in FIG. 4A, the S-BS 104B is depicted as an aggregated base station, and the T-BS 104A is depicted as a distributed base station including a T-CU 172 and a T-DU 174.

Initially, the UE 102 operates in a connected state and communicates 402A data with the S-BS 104B via cell 124B by using an S-BS configuration, which includes multiple configurations, each corresponding to a respective configuration parameter, similar to event 302B.

Later in time, the S-BS 104B performs 404A a UE assistance configuration procedure with the UE 102 to enable the UE 102 to transmit a preferred configuration to the S-BS 104B, similar to event 304B.

After the UE 102 is enabled to transmit a preferred configuration, the UE 102 performs a UE assistance information procedure 472A with the S-BS 104B, similar to the UE assistance information procedure 372B, thereby providing the preferred configuration (i.e., a first preferred configuration) to the S-BS 104B.

In response to receiving the first preferred configuration from the UE 102, the S-BS 104B performs a DU reconfiguration procedure 474A, similar to the DU reconfiguration procedure 374B, thereby generating a DU configuration (i.e., a first DU configuration) that indicates no more than the preferred maximum number of SCell(s), MIMO layer(s), and/or aggregated bandwidth indicated in the first preferred configuration.

In some implementations, after generating the first DU configuration, the S-BS 104B performs an RRC reconfiguration procedure 476A with the UE 102, similar to the RRC reconfiguration procedure 376B. Thus, the UE 102 can update the multiple configuration parameters previously provided by the S-BS 104B at event 402A with the first DU configuration, and communicate with the S-BS 104B by using the updated configuration parameters.

Later in time (e.g., after the S-BS 104B detects that traffic of the UE 102 is inactive on the S-BS-terminated radio bearer(s)), the S-BS 104B determines to suspend a radio connection (e.g., including an RRC connection) with the UE 102. In response to determining to suspend the radio connection, the S-BS 104B performs an RRC suspension procedure 478A, similar to the RRC suspension procedure 378B. As a result, the UE 102 suspends the radio connection, and can transition to an inactive state or an idle state.

In some implementations, the S-BS 104B need not generate the first DU configuration if the configuration parameters in the S-BS configuration satisfy the first preferred configuration. In these implementations, the S-BS 104B need not perform the DU reconfiguration procedure 474A and the RRC reconfiguration procedure 476A before the RRC suspension procedure 478A. The S-BS 104B may not perform the DU reconfiguration procedure 474A and the RRC reconfiguration procedure 476A for other reasons, such as when the S-BS 104B is transmitting a high volume of data to the UE 102, or is otherwise busy, for example.

Later in time after suspending the radio connection, the UE 102 can perform an RRC resume procedure 480A to transition from the inactive or idle state to the connected state. In contrast to the UE 102 performing the RRC resume procedure 380B with the same serving base station 104A described in FIG. 3B, the UE 102 in FIG. 4A performs the RRC resume procedure 480A with the T-BS 104A. Particularly, in the RRC resume procedure 480A, the UE 102 transmits 430A an RRC resume request message to the T-DU 174, which in turn sends 432A the RRC resume request message to the T-CU 172. According to the RRC resume request message, the T-CU 172 addresses the S-BS 104B (e.g., a source CU of the S-BS 104B) and sends 492A a Retrieve UE Context Request message to the S-BS 104B to retrieve a UE context of the UE 102. The S-BS 104B sends 494A a Retrieve UE Context Response message including the first preferred configuration to the T-CU 172. The S-BS 104B may also include the S-BS configuration in the Retrieve UE Context Response message. Then the T-CU 172 can send 496A a UE Context Setup Request message including the first preferred configuration to the T-DU 174.

In some implementations, if the Retrieve UE Context Response message includes the S-BS configuration, the T-CU 172 can include, in the UE Context Setup Request message, an S-DU configuration that is contained in the S-BS configuration, and send 496A the UE Context Setup Request message to the T-DU 174, enabling the T-DU 174 to generate a T-DU configuration, i.e., a delta T-DU configuration augmenting the S-DU configuration. In other implementations, the T-CU 172 omits the S-DU configuration, to enable the T-DU 174 to generate a full T-DU configuration (i.e., a complete and self-contained T-DU configuration). The T-DU 174 then sends 498A a UE Context Setup Response message, including the T-DU configuration, to the T-CU 172.

In response to the RRC resume request message received at event 432A, the T-CU 172 sends 434A an RRC resume message including the T-DU configuration to the T-DU 174, which in turn transmits 436A the RRC resume message to the UE 102, thereby completing the RRC resume procedure 480A. As a result, the UE 102 resumes 438A the suspended radio connection with the T-BS 104A, and transitions to the connected state. The UE 102 can transmit 440A an RRC resume complete message to the T-DU 174, which in turn can send 442A the RRC resume complete message to the T-CU 172, similar to events 340B and 342B, respectively.

In some implementations, after the S-BS 104B performs the RRC suspension procedure 478A with the UE 102, the UE 102 can retain 454A the first preferred configuration (e.g., in response to receiving an RRC suspension message during the RRC suspension procedure 478A). Similarly, in some implementations, the S-BS 104B can retain 453A the first preferred configuration in response to determining to suspend the radio connection with the UE 102. In other implementations, the UE 102 can retain 454A the first preferred configuration in response to initiating the RRC resume procedure 480A or during the RRC resume procedure 480A. Similarly, in some implementations, the S-BS 104B can retain 453A the first preferred configuration during the RRC resume procedure 480A.

As discussed above in FIG. 3B, in some implementations, the UE 102 and the S-BS 104B in FIG. 4A can either release or retain some or all configurations in the S-BS configuration. Further, in some implementations, while the UE 102 is in inactive state or idle state, the UE 102 can retain the current security keys, a ROHC state if ROHC is configured at the UE 102, QoS flow to DRB mapping rules, a C-RNTI used in a source PCell (e.g., PCell 124B), a cell identity and a physical cell identity of the source PCell, and other configuration parameters in an RLC configuration, a MAC configuration, and/or a physical layer configuration. In some implementations, while the UE 102 is in inactive state or idle state, the UE 102 can retain the field or IE that enables the UE 102 to transmit the first preferred configuration. In other implementations, the UE 102 can release configurations within ReconfigurationWithSync IE and/or ServingCellConfigCommonSIB IE and/or the field or IE that enables the UE 102 to transmit the first preferred configuration in response to the RRC suspension message in the RRC suspension procedure 478A or during the RRC resume procedure 480A.

After the UE 102 resumes 438A the suspended radio connection and transitions to the connected state, the UE 102 transmits 444A another UE assistance information message including another preferred configuration (i.e., a second preferred configuration) to the T-DU 174, similar to event 344B, for similar reasons described above with respect to FIG. 3B. The T-DU 174 in turn sends 446A the UE assistance information message to the T-CU 172, similar to event 346B. By sending the second preferred configuration to the T-CU 172, the UE 102 can override the first preferred configuration retained at the T-CU 172, so that upon resuming connectivity with the T-CU 172, the UE 102 and T-CU 172 can then communicate using the second preferred configuration. Then the T-CU 172 performs 482A a DU reconfiguration procedure with the T-DU 174, thereby generating a second DU configuration, similar to procedure 382B, which causes the T-CU 172 to perform 484A an RRC reconfiguration procedure with the UE 102, similar to the RRC reconfiguration procedure 384B. Thus, the UE 102 can update the multiple configuration parameters that were previously updated in accordance with the first preferred configuration with the second DU configuration, and communicate with the T-DU 174 by using the updated configuration parameters.

Figure 4B:
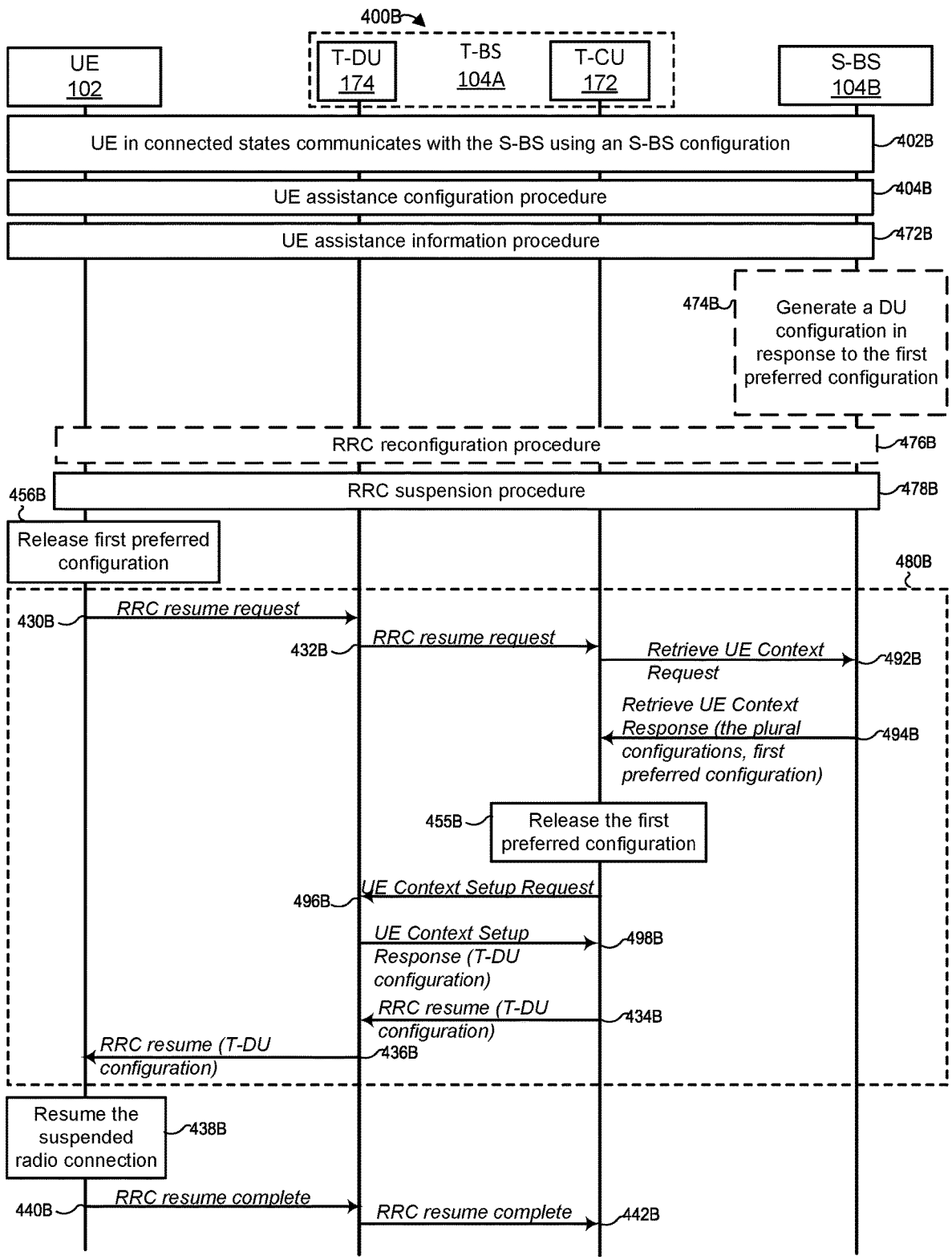
FIG. 4B is a messaging diagram of an example scenario in which a CU of a disaggregated base station receives a preferred configuration of a UE and releases the preferred configuration.

Referring now to FIG. 4B, in a resume scenario 400B, the S-BS 104B again operates as a serving base station for UE 102. Whereas in FIG. 4A the UE 102 and the S-BS 104B retain the first preferred configuration, in FIG. 4B the UE 102 and the S-BS 104B release the first preferred configuration. Generally, the S-BS 104B and T-BS 104A in FIG. 4B can perform similar actions as the S-BS 104B and T-BS 104A in FIG. 4A, respectively.

Initially, the UE 102 operates in a connected state and communicates 402B data with the S-BS 104B via cell 124B by using an S-BS configuration, which includes multiple configurations, each corresponding to a respective configuration parameter, similar to event 402A.

Later in time, the S-BS 104B performs 404B a UE assistance configuration procedure with the UE 102 to enable the UE 102 to transmit a preferred configuration to the S-BS 104B, similar to event 404A.

After the UE 102 is enabled to transmit a preferred configuration, the UE 102 performs a UE assistance information procedure 472B with the S-BS 104B, similar to the UE assistance information procedure 472A, thereby providing the preferred configuration (i.e., a first preferred configuration) to the S-BS 104B.

In response to receiving the first preferred configuration from the UE 102, the S-BS 104B performs a DU reconfiguration procedure 474B, similar to the DU reconfiguration procedure 474A, thereby generating a DU configuration (i.e., a first DU configuration) that indicates no more than the preferred maximum number of SCell(s), MIMO layer(s), and/or aggregated bandwidth indicated in the first preferred configuration.

In some implementations, after generating the first DU configuration, the S-BS 104B performs an RRC reconfiguration procedure 476B with the UE 102, similar to the RRC reconfiguration procedure 476A. Thus, the UE 102 can update the multiple configuration parameters previously provided by the S-BS 104B at event 402B with the first DU configuration, and communicate with the S-BS 104B by using the updated configuration parameters.

Later in time (e.g., after the S-BS 104B detects that traffic of the UE 102 is inactive on the S-BS-terminated radio bearer(s)), the S-BS 104B determines to suspend a radio connection (e.g., including an RRC connection) with the UE 102. In response to determining to suspend the radio connection, the S-BS 104B performs an RRC suspension procedure 478B, similar to the RRC suspension procedure 478A. As a result, the UE 102 suspends the radio connection, and can transition to an inactive state or an idle state.

In some implementations, after the S-BS 104B performs the RRC suspension procedure 478B with the UE 102, the UE 102 can release 456B the first preferred configuration (e.g., in response to receiving an RRC suspension message during the RRC suspension procedure 478B). In other implementations, the UE 102 can release 456B the first preferred configuration in response to initiating the RRC resume procedure 480B or during the RRC resume procedure 480B, as will be further described below.

Later in time after suspending the radio connection, the UE 102 can perform the RRC resume procedure 480B to transition from the inactive or idle state to the connected state. Particularly, in the RRC resume procedure 480B, the UE 102 transmits 430B an RRC resume request message to the T-DU 174, which in turn sends 432B the RRC resume request message to the T-CU 172. According to the RRC resume request message, the T-CU 172 addresses the S-BS 104B and sends 492B a Retrieve UE Context Request message to the S-BS 104B to retrieve a UE context of the UE 102. The S-BS 104B sends 494B a Retrieve UE Context Response message including the first preferred configuration to the T-CU 172. The S-BS 104B may also include the S-BS configuration in the Retrieve UE Context Response message. Then the T-CU 172 releases 455B the first preferred configuration and sends 496B a UE Context Setup Request message (i.e., omitting the first preferred configuration) to the T-DU 174. In some implementations, if the Retrieve UE Context Response message includes the S-BS configuration, the T-CU 172 can include, in the UE Context Setup Request message, an S-DU configuration that is contained in the S-BS configuration, and send 496B the UE Context Setup Request message to the T-DU 174, enabling the T-DU 174 to generate a T-DU configuration, i.e., a delta T-DU configuration augmenting the S-DU configuration. In other implementations, the T-CU 172 omits the S-DU configuration, to enable the T-DU 174 to generate a full T-DU configuration (i.e., a complete and self-contained T-DU configuration). The T-DU 174 then sends 498B a UE Context Setup Response message, including the T-DU configuration, to the T-CU 172.

In response to the RRC resume request message received at event 432B, the T-CU 172 sends 434B an RRC resume message including the T-DU configuration to the T-DU 174, which in turn transmits 436B the RRC resume message to the UE 102, thereby completing the RRC resume procedure 480B. As a result, the UE 102 resumes 438B the suspended radio connection with the T-BS 104A, and transitions to the connected state. The UE 102 can transmit 440B an RRC resume complete message to the T-DU 174, which in turn can send 442B the RRC resume complete message to the T-CU 172, similar to events 440A and 442A, respectively.

By releasing the first preferred configuration at the UE 102 and the T-CU 172 at events 456B and 455B, respectively, the UE 102 and the T-CU 172 need not be limited to communicating with each other according to the first preferred configuration upon resuming the suspended radio connection. For example, the UE 102 may have recovered from an overheating situation or increased battery power since the inactive state or an idle state, such that the UE 102 is able to utilize more SCell(s), MIMO layer(s), and/or aggregated bandwidth than those indicated in the first preferred configuration after transitioning back to the connected state. Because the UE 102 and the T-CU 172 are still aware of the S-BS configuration (including the updated configuration parameters configured by the RRC reconfiguration procedures 476B), the UE 102 and the T-CU 172 may proceed to communicate using the S-BS configuration again, for example.

In some implementations, the T-CU 172 can obtain another DU configuration (i.e., second DU configuration) from the T-DU 174, e.g., by using a UE Context Setup procedure (e.g., as described in FIG. 4A above), and include the second DU configuration in the RRC resume message. In another such implementation, the CU 172 can generate configuration(s) and include the generated configuration(s) in the RRC resume message. In other implementations, after receiving the RRC resume complete message, the T-CU 172 can obtain another DU configuration (i.e., second DU configuration) from the T-DU 174, e.g., by using a DU reconfiguration procedure (similar to the DU reconfiguration procedure 374A) and perform an RRC reconfiguration procedure with the UE 102, similar to the RRC reconfiguration procedure 376A. The CU 172 can include the second DU configuration in an RRC reconfiguration message in the RRC reconfiguration procedure. Because the T-CU 172 releases the first preferred configuration at event 455B, the T-CU 172 does not send the first preferred configuration to the T-DU 174 during the DU reconfiguration procedure or the UE Context Setup procedure. Therefore, the T-DU 174 generates the second DU configuration in a manner that would not underestimate the capabilities of the UE 102, e.g., by considering the UE capabilities rather than the first preferred configuration.

Now referring to FIGS. 5A-5G, the UE 102 is in DC with an MN and an SN, and later disconnects from the SN. In various scenarios, the UE 102 can release or retain a preferred configuration upon disconnecting from the SN.

Figure 5A:
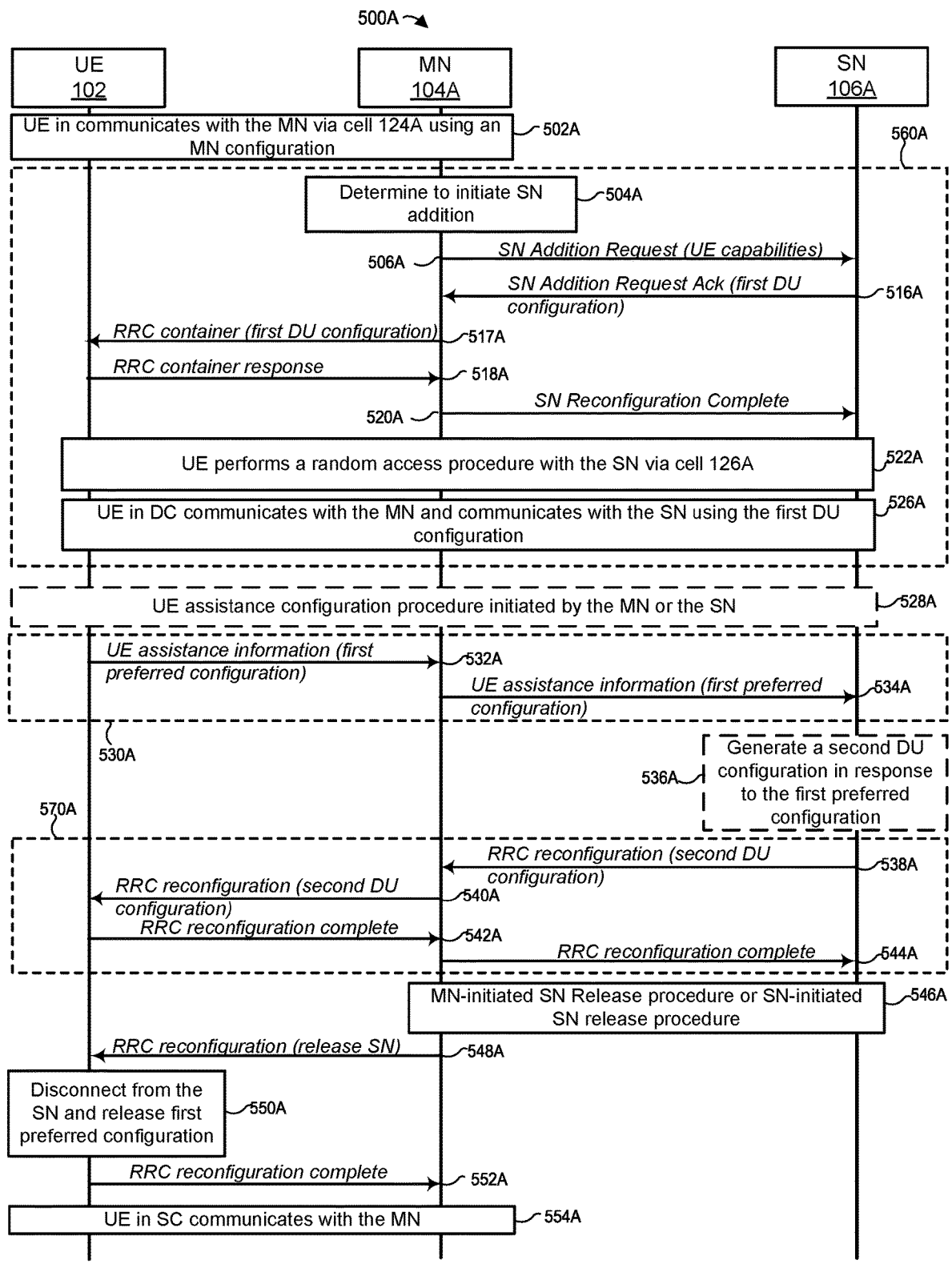
FIG. 5A is a messaging diagram of an example scenario in which the UE provides a preferred configuration to an secondary node (SN) via a master node (MN) and later releases the preferred configuration upon disconnecting from the SN.

Referring first to FIG. 5A, in a scenario 500A, the base station 104A operates as an MN for the UE 102, and the base station 106A operates as an SN for the UE 102. In some implementations, the SN 106A is a distributed base station that includes a CU and a DU, where the CU can exchange SN messages with the MN 104A and exchange RRC messages with the UE 102 via the MN 104A, as further described below. For ease of illustration, the SN 106A is depicted as an aggregated base station. In this implementation, the UE 102 releases the first preferred configuration upon SN release.

Initially, the UE 102 communicates 502A data in SC with the MN 104A via cell 124A by using an MN configuration, which is similar to the BS configuration described above with respect to FIG. 3A, for example. In other implementations and scenarios, the UE 102 communicates 502A data in DC with the MN 104A via PCell 124A by using the MN configuration, and with a source SN (S-SN) (e.g., S-SN 106B via PSCell 126B) by using an S-SN configuration. In this scenario, the SN 106A depicted in FIG. 5A is a target SN (T-SN). In some implementations, during event 502A, the MN 104A can receive UE capabilities of the UE 102 from the UE 102, the CN 110 (e.g., an MME 114 or AMF 164), or another base station (e.g., base station 104B).

Later in time, the MN 104A determines 504A to initiate an SN addition procedure for the SN 106A and the UE 102 to communicate, e.g., blindly or in response to detecting a suitable event. For example, the determination 504A can occur in response to the MN 104A receiving one or more measurement results from the UE 102 that are above (or below) one or more predetermined thresholds, or calculating a filtered result (from the measurement result(s)) that is above (or below) a predetermined threshold. In another example, the suitable event can be that the UE 102 is moving toward the SN 106A. In yet another example, the suitable event can be one or more measurement results, generated or obtained by the MN 104A based on measurements of signals received from the UE 102, being above (or below) one or more predetermined thresholds. In yet another example, the determination 504A can occur in response to the MN 104A receiving an SN Change Required message from an S-SN (e.g., S-SN 106B).

After determining 504A to initiate the SN addition procedure, the MN 104A sends 506A an SN Addition Request message including UE capabilities of the UE 102 to the SN 106A. In turn, the SN 106A can generate a DU configuration (i.e., a first DU configuration) in a manner that would not exceed the capabilities of the UE 102, e.g., by considering the UE capabilities. In some implementations, if the SN 106A is a T-SN, the MN 104A can also include the S-SN configuration associated with the S-SN (e.g., S-SN 106B) in the SN Addition Request message.

If the SN 106A is a distributed base station that consists of a CU and DU, the CU sends a UE Context Setup Request message to the DU to obtain the first DU configuration for the UE 102 in response to receiving the SN Addition Request message. In response to the UE Context Setup Request message, the DU sends a UE Context Setup Response message including the first DU configuration to the CU. The CU can include the UE capabilities in the UE Context Setup Request message, and the DU can generate the first DU configuration in a manner that would not exceed the UE capabilities. In some implementations, the CU can include the S-SN configuration or an S-DU configuration in the S-SN configuration in the UE Context Setup Request message. The DU can generate the first DU configuration as a delta DU configuration which augments a portion of the S-SN configuration or the S-DU configuration. In other implementations, the DU can generate the first DU configuration as a full DU configuration which is a complete and self-contained DU configuration. The first DU configuration and the S-DU configuration are similar to the DU configuration as described above with respect to FIG. 3A.

In response to receiving the SN Addition Request message, the SN 106A sends 516A an SN Addition Request Acknowledge message including the first DU configuration to the MN 104A. In turn, the MN 104A transmits 517A an RRC container message including the first DU configuration to the UE 102. In response to the RRC container message, the UE 102 transmits 518A an RRC container response message to the MN 104A, which in turn sends 520A an SN Reconfiguration Complete message to the SN 106A. In some implementations, the SN 106A generates an RRC reconfiguration message that includes the first DU configuration, includes the RRC reconfiguration message in the SN Addition Request Acknowledge message, and sends 516A the SN Addition Request Acknowledge message to the MN 104A. In turn, the MN 104A transmits 517A the RRC container message including the RRC reconfiguration message to the UE 102. In some implementations, the UE 102 may include an RRC reconfiguration complete message in the RRC container response message, and the MN 104A in turn includes the RRC reconfiguration complete message in the SN Reconfiguration Complete message at event 520A. In some implementations, the SN 106A can include a measurement configuration (e.g., MeasConfig IE) in the RRC reconfiguration message.

In implementations in which the MN 104A receives an SN Change Required message from an S-SN (e.g., S-SN 106B), the MN 104A may send an SN Change Confirm message to the S-SN in response to the SN Change Required message, e.g., before or after receiving the RRC container response message or the SN Addition Request Acknowledge message. In some implementations, the MN 104A may send an SN Release Request message to the S-SN after determining 504A to initiate the SN addition procedure. The S-SN may send an SN Release Request Acknowledge message to the MN 104A in response.

In some implementations, the SN 106A (e.g., the CU of the SN 106A) can generate a CU configuration. For example, the CU configuration can be a radio bearer configuration (RadioBeareConfig IE). The SN 106A can include the CU configuration in the SN Addition Request Acknowledge message at event 516A and the MN 104A can include the CU configuration in the RRC container message at event 517A. The CU configuration can be a full CU configuration, which is a complete and self-contained CU configuration, or a delta CU configuration, which augments a source CU configuration (e.g., RadioBeareConfig IE) in the S-SN configuration.

The first DU configuration or the RRC reconfiguration message described above also includes one or more random access configurations needed by the UE 102 to connect to the SN 106A (e.g., the DU of the SN 106A), and in some implementations, includes additional fields, such as a mobility field (e.g., mobilityControlInfoSCG field or a ReconfigurationWithSync IE), which can include some or all of the random access configurations.

In response to receiving 517A the first DU configuration or the RRC reconfiguration message, the UE 102 performs 522A a random access procedure with the SN 106A (e.g., the DU of the SN 106A), e.g., by using one or more random access configurations in the first DU configuration or the RRC reconfiguration message. After the SN 106A (e.g., the DU of the SN 106A) identifies the UE 102 during the random access configuration (e.g., the UE 102 succeeds the contention resolution), the UE 102 communicates 526A control signals and data in DC with the MN 104A and with the SN 106A (e.g., the DU of the SN 106A) by using the first DU configuration. In implementations in which the MN 104A includes the CU configuration in the RRC container message at event 517A, the UE 102 can communicate 526A data with the SN 106A (e.g., the CU of the SN 106A) by using either the full CU configuration or the delta CU configuration and a portion of the source CU configuration. After the SN 106A (e.g., the DU of the SN 106A) identifies the UE 102 during the random access configuration (e.g., the UE 102 succeeds the contention resolution), the DU of the SN 106A may send a Downlink Data Delivery Status message to the CU of the SN 106A in response to identifying the UE 102 during the random access procedure. The events 504A, 506A, 516A, 517A, 518A, 520A, 522A, and 526A are collectively referred to in FIG. 5A as a DC configuration procedure 560A.

After the UE 102 connects to the SN 106A at event 522A, either the MN 104A or the SN 106A can initiate 528A a UE assistance configuration procedure with the UE 102 to enable the UE 102 to transmit a preferred configuration, similar to event 304A. In an MN-initiated UE assistance configuration procedure, the MN 104A can configure the UE 102 to indirectly provide the preferred configuration to the SN 106A via the MN 104A. In an SN-initiated UE assistance configuration procedure, the SN 106A can configure the UE 102 to either directly provide the preferred configuration to the SN 106A, or indirectly provide the preferred configuration to the SN 106A via the MN 104A.

For example, during the SN-initiated UE assistance configuration procedure, the SN 106A can transmit an RRC message to the UE 102 via the MN 104A, or broadcast an RRC message via PSCell 126A, to enable the UE 102 to transmit a preferred configuration, and in turn, the UE 102 can transmit an RRC response message to the SN 106A via the MN 104A, in some implementations. In other implementations, the SN 106A can include a field/IE in the RRC reconfiguration message at event 516A for enabling transmission of a preferred configuration.

The SN 106A can enable the UE 102 to transmit the preferred configuration if the UE capabilities indicate support of transmitting the preferred configuration to the SN 106A. In some implementations, the UE 102 can indicate support of transmitting a preferred configuration to the SN 106A in a capability IE for the SN 106A. For example, if the SN 106A is a gNB, the capability IE is a UE-NR-Capability or a UE-MRDC-Capability. If the SN 106A is an ng-eNB, the capability IE is a UE-EUTRA-Capability or a UE-MRDC-Capability. In some implementations, the UE 102 can indicate support of transmitting a preferred configuration to the SN 106A in a capability IE for the MN 104A.

If the UE capabilities do not indicate support of transmitting the preferred configuration to the SN 106A, the SN 106A does not enable the UE 102 to transmit the preferred configuration to the SN 106A. For example, if the UE capabilities indicate support of transmitting a preferred configuration only to the MN 104A, the SN 106A does not enable the UE 102 to transmit the preferred configuration to the SN 106A. In some implementations, the UE 102 can indicate support of transmitting a preferred configuration to the MN 104A in a capability IE for the MN 104A. For example, if the MN 104A is a gNB, the capability IE is a UE-NR-Capability. If the MN is an eNB or ng-eNB, the capability IE is a UE-EUTRA-Capability. In some implementations, the UE 102 can indicate support of indirectly transmitting a preferred configuration to the SN 106A via the MN 104A in a capability IE for the MN 104A. For example, if the MN 104A is a gNB, the capability IE is a UE-NR-Capability. If the MN is an eNB or ng-eNB, the capability IE is a UE-EUTRA-Capability.

In some implementations, the SN 106A can optionally update the first DU configuration (e.g., adding new configurations to the first DU configuration or modifying configurations in the first DU configuration) by transmitting an RRC reconfiguration message to the UE 102 via the MN 104A. In response, the UE 102 can transmit an RRC reconfiguration complete message to the SN 106A via the MN 104A. For simplicity, the first DU configuration described with respect to FIG. 5A can refer to the original first DU configuration or the updated first DU configuration.

After the UE 102 is enabled to transmit a preferred configuration, the UE 102 transmits 532A a UE assistance information message including a first preferred configuration to the MN 104A. The UE 102 can transmit 532A the first preferred configuration for different reasons in various scenarios and implementations. In one implementation, the UE 102 can transmit the first preferred configuration if the UE 102 is not satisfied with configuration parameters in the first DU configuration that are used by the UE 102 to communicate with the SN 106A, as described in event 526A (i.e., the configuration parameters do not satisfy the preferences of the UE 102 as defined in the first preferred configuration). In another implementation, the UE 102 can transmit the first preferred configuration even if the UE 102 is satisfied with the configuration parameters, to prevent the SN 106A from changing the configuration parameters that the UE 102 may not prefer. In some implementations, the UE 102 can transmit the first preferred configuration if the UE 102 experiences an overheating situation (e.g., due to heavy application processing), detects low battery power, or otherwise determines to conserve power. The UE 102 can transmit the first preferred configuration for power saving purposes (even if the UE 102 does not experience an overheating situation), overheating purposes, or both.

In response to receiving 532A the UE assistance information message from the UE 102, the MN 104A in turn sends 534A the UE assistance information message to the SN 106A. The events 532A and 534A are collectively referred to in FIG. 5A as a UE assistance information procedure 530A. In some implementations, if SRB3 between the UE 102 and the SN 106A is not configured, the UE 102 can transmit 532A an ULInformationTransferMRDC message including the UE assistance information message to the MN 104A via SRB1. In some implementations, if SRB3 between the UE 102 and the SN 106A is configured and not suspended, the UE 102 can transmit 531A the UE assistance information message to the SN 106A via the SRB3 instead of transmitting the UE assistance information message to the SN 106A via the MN 104A (events 532A and 534A). In other implementations, if SRB3 between the UE 102 and the SN 106A is configured and suspended, the UE 102 can transmit 532A an ULInformationTransferMRDC message including the UE assistance information message to the MN 104A via SRB1. In such a case, the UE 102 may not transmit to the MN 104A via SRB1 an ULInformationTransferMRDC message including a MeasurementReport message associated to a measurement configuration configured by the SN 106A. In yet other implementations, if SRB3 between the UE 102 and the SN 106A is configured and suspended, the UE 102 can suspend transmission of the UE assistance information message (i.e., the UE 102 neither transmits the UE assistance information message to the MN 104A nor the SN 106A). After resuming SRB3, if the UE 102 determines a condition is still met for transmitting the UE assistance information message, the UE 102 can transmit the UE assistance information message to the SN 106A on the SRB3. After resuming SRB3, if the UE 102 determines no condition is met for transmitting the UE assistance information message, the UE 102 abandons transmission of the UE assistance information message. If the UE 102 has generated the UE assistance information message and determines no condition is met for transmitting the UE assistance information message, the UE 102 can discard the UE assistance information message.

In response to receiving the UE assistance information message, the SN 106A then generates 536A a second DU configuration in response to receiving the first preferred configuration, similar to the manner in which the base station 104A generates the DU configuration in the DU reconfiguration procedure 374A described above with respect to FIG. 3A. That is, in implementations in which the SN 106A is a distributed base station, the CU of the SN 106A sends a first interface message including the first preferred configuration to the DU of the SN 106A, the DU generates the second DU configuration, and the DU sends the second DU configuration in a second interface message to the CU. In some implementations, the SN 106A may omit the second DU configuration in the second interface message, or may include a second DU configuration irrelevant to the first preferred configuration in the second interface message, similar to the manner in which the base station 104A omits the DU configuration or includes the DU configuration irrelevant to the first preferred configuration in the second interface message in the DU reconfiguration procedure 374A.

In some implementations, after generating the second DU configuration, the SN 106A sends 538A an RRC reconfiguration message including the second DU configuration to the MN 104A, which in turn transmits 540A the RRC reconfiguration message to the UE 102. In response, the UE 102 can transmit 542A an RRC reconfiguration complete message to the MN 104A, which in turn sends 544A the RRC reconfiguration complete message to the SN 106A. Thus, the UE 102 can update the multiple configuration parameters previously provided by the SN 106A at event 526A in the first DU configuration with the second DU configuration, and communicate with the SN 106A (e.g., the DU of the SN 106A) by using the updated configuration parameters. In some implementations, the SN 106A can send 538A an SN message (e.g., SN Modification Required message, SN Modification Request Acknowledge message or RRC Transfer message) including the RRC reconfiguration message to the MN 104A, which in turn can send 540A an RRC container message including the RRC reconfiguration message to the UE 102. The UE 102 can then transmit 542A an RRC container response message including the RRC reconfiguration complete message to the MN 104A, which in turn can send 544A an SN message (e.g., SN Modification Request message, RRC Transfer message or SN Reconfiguration Complete message) including the RRC reconfiguration complete message to the SN 106A. The events 538A, 540A, 542A, and 544A are collectively referred to in FIG. 5A as an RRC reconfiguration procedure 570A.

Although the SN 106A is described as generating a single second DU configuration at event 536A, the SN 106A may generate multiple second DU configurations. If the SN 106A generates multiple second DU configurations, the SN 106A and the UE 102 can perform the RRC reconfiguration procedure 570A multiple times so that the UE 102 can obtain the multiple second DU configurations.

As discussed above, in some implementations, in response to receiving 534A the first preferred configuration, the SN 106A need not generate the second DU configuration. In these implementations, the SN 106A need not perform the DU reconfiguration procedure 536A and the RRC reconfiguration procedure 570A before the SN release procedure 546A. The SN 106A need not perform the DU reconfiguration procedure 536A and the RRC reconfiguration procedure 570A for other reasons, such as when the SN 106A is transmitting a high volume of data to the UE 102, or is otherwise busy, for example.

In some scenarios and implementations, after receiving the first preferred configuration at event 530A, the SN 106A can generate a C-DU configuration, similar to the manner in which the base station 104A of FIG. 3A generates the DU configuration in the DU reconfiguration procedure 374A, to prepare a conditional configuration for conditional PSCell addition or change (CPAC) for the UE 102. The SN 106A can generate the C-DU configuration that satisfies the first preferred configuration. In other scenarios and implementations, either before or after event 530A, the SN 106A can generate a C-DU configuration according to the UE capabilities stored in the SN 106A without taking the first preferred configuration into account. After the SN 106A obtains the C-DU configuration, the SN 106A generates an RRC message including the C-DU configuration, a conditional configuration including the RRC message, and an RRC reconfiguration message including the conditional configuration. Then the SN 106A transmits the RRC reconfiguration message to the UE 102 via the MN 104A or via an SRB (e.g., SRB3). Later, if the UE 102 detects that a condition for connecting to a candidate cell of the SN 106A is satisfied, the UE 102 connects to the SN 106A via the candidate cell (i.e., candidate PSCell). The SN 106A can perform an RRC reconfiguration procedure with the UE 102 via the MN 104A or the SRB to transmit another DU configuration satisfying the first preferred configuration to the UE 102, similar to the DU reconfiguration procedure 536A or 536B and RRC reconfiguration procedure 570A or 571B.

If the SN 106A transmits a conditional configuration (i.e., a first conditional configuration) to the UE 102 before receiving the first preferred configuration from the UE 102, the SN 106A may not update the conditional configuration even though the conditional configuration does not satisfy the first preferred configuration, in one implementation. In another implementation, if the conditional configuration does not satisfy the first preferred configuration, the SN 106A can transmit an RRC reconfiguration message to the UE 102 for releasing the conditional configuration via the MN 104A or the SRB. In yet another implementation, the CU 172 can transmit an RRC reconfiguration message to the UE 102 for releasing the conditional configuration via the MN 104A or the SRB in response to receiving the first preferred configuration from the UE 102. In yet another implementation, if the conditional configuration does not satisfy the first preferred configuration received from the UE 102, the SN 106A can transmit an RRC reconfiguration message including another conditional configuration (i.e., a second conditional configuration) to the UE 102 via the MN 104A or the SRB to replace the first conditional configuration. The SN 106A can obtain a new C-DU configuration satisfying the first preferred configuration and transmit the second conditional configuration including the new C-DU configuration to the UE 102 in a similar manner as described above.

In some scenarios and implementations, the UE 102 can be in SC with the MN 104A or in DC with the MN 104A and the SN 106A as shown in FIG. 5A. After receiving the first preferred configuration from the UE 102, the MN 104A can perform a conditional DC configuration procedure (i.e., CSAC configuration procedure) with a candidate SN (C-SN) (e.g., C-SN 106B) and the UE 102, similar to the DC configuration procedure 560A, to transmit a conditional configuration for CSAC to the UE 102. The MN 104A can include the first preferred configuration in an SN Addition Request message in the CSAC configuration procedure. Then the C-SN can generate a C-DU configuration satisfying the first preferred configuration and generate an RRC reconfiguration message including the C-DU configuration. The C-SN can send an SN Addition Request Acknowledge message including the RRC reconfiguration message to the MN 104A in response to the SN Addition Request message. In turn, the MN 104A generates a conditional configuration including the RRC reconfiguration message and transmits an RRC container message including the conditional configuration to the UE 102.

In other scenarios and implementations, the UE 102 can be in SC with the MN 104A or in DC with the MN 104A and the SN 106A as shown in FIG. 5A. Either before or after receiving the first preferred configuration, the MN 104A can perform a CSAC configuration procedure with a C-SN (e.g., C-SN 106B) and the UE 102, similar to the DC configuration procedure 560A, to transmit a conditional configuration for CSAC to the UE 102. The MN 104A can send an SN Addition Request message excluding the first preferred configuration in the CSAC configuration procedure. Then the C-SN can generate a C-DU configuration according to the UE capabilities and generate an RRC reconfiguration message including the C-DU configuration. The C-SN can send an SN Addition Request Acknowledge message including the RRC reconfiguration message to the MN 104A in response to the SN Addition Request message. In turn, the MN 104A generates a conditional configuration including the RRC reconfiguration message and transmits an RRC container message including the conditional configuration to the UE 102. Later, if the UE 102 detects that a condition for connecting to a candidate cell of the C-SN is satisfied, the UE 102 connects to the C-SN via the candidate cell (i.e., candidate PSCell). If the C-SN receives the first preferred configuration from the UE 102 or the MN 104A, the C-SN can perform an RRC reconfiguration procedure with the UE 102 via the MN 104A or the SRB to transmit another DU configuration satisfying the first preferred configuration to the UE 102, similar to the DU reconfiguration procedure 536A or 536B and RRC reconfiguration procedure 570A or 571B.

If the MN 104A transmits a conditional configuration (i.e., a first conditional configuration) to the UE 102 before receiving the first preferred configuration from the UE 102, the MN 104A may not update the conditional configuration even though the conditional configuration does not satisfy the first preferred configuration, in one implementation. In another implementation, if the conditional configuration does not satisfy the first preferred configuration, the MN 104A can transmit an RRC container message releasing the conditional configuration to the UE 102. In yet another implementation, the MN 104A can transmit an RRC container message to the UE 102 for releasing the conditional configuration in response to receiving the first preferred configuration from the UE 102. In yet another implementation, if the conditional configuration does not satisfy the first preferred configuration received from the UE 102, the MN 104A can transmit an RRC container message including another conditional configuration (i.e., a second conditional configuration) to the UE 102 to replace the first conditional configuration. The MN 104A can obtain an RRC reconfiguration message including a new C-DU configuration satisfying the first preferred configuration from the C-SN and transmit the second conditional configuration including the RRC reconfiguration message to the UE 102 in a similar manner as described above.

Later in time (e.g., after the MN 104A or the SN 106A detects that traffic of the UE 102 is inactive on the SN-terminated radio bearer(s)), the MN 104A or the SN 106A determines to release the SN 106A for the UE 102. In an MN-initiated SN release procedure, the MN 104A can initiate 546A an SN release procedure with the SN 106A to release the SN 106A for the UE 102 (i.e., configure the UE 102 to be in SC). The MN 104A sends an SN Release Request message to the SN 106A, which in turn sends an SN Release Request Acknowledge message to the MN 104A. Alternatively, in an SN-initiated SN release procedure, the SN 106A can initiate 546A the SN release procedure with the MN 104A to release the SN 106A for the UE 102. The SN 106A sends an SN Release Required message to the MN 104A, which in turn sends an SN Release Confirm message to the SN 106A. After either the MN 104A or the SN 106A determines to release the SN 106A, the MN 104A sends 548A an RRC reconfiguration message indicating release of the SN 106A to the UE 102. That is, the MN 104A can send 548A the RRC reconfiguration message to the UE 102 during the MN-initiated SN release procedure or the SN-initiated SN release procedure. As a result, the UE 102 disconnects 550A from the SN 106A and releases the first preferred configuration in response to releasing the SN 106A. Because the second DU configuration received at event 540A is unnecessary as a result of disconnecting 550A from the SN 106A, the UE 102 also releases the second DU configuration. The UE 102 then transmits 552A an RRC reconfiguration complete message to the MN 104A in response to the RRC reconfiguration message. Accordingly, the UE 102 in SC communicates 554A with the MN 104A after disconnecting from the SN 106A.

In some implementations, the UE 102 can either release or retain some or all configurations in the second DU configuration in response to receiving the RRC reconfiguration message at event 548A or in response to releasing the SN 106A. If there are configuration(s) in the first DU configuration which have not been updated by the second DU configuration, the UE 102 can also release the configuration(s) in the first DU configuration in response to the RRC reconfiguration message at event 548A or in response to releasing the SN 106A. In some implementations, the UE 102 can release configurations within ReconfigurationWithSync IE and/or ServingCellConfigCommonSIB IE, and/or release or retain the field or IE that enables the UE 102 to transmit the first preferred configuration in response to receiving the RRC reconfiguration message at event 548A or in response to releasing the SN 106A. In some implementations, if the UE 102 receives the field or IE that enables the UE 102 to transmit the first preferred configuration in the MN-initiated UE assistance configuration procedure, the UE 102 can retain the field or IE in response to receiving the RRC reconfiguration message at event 548A or in response to releasing the SN 106A. In other implementations, if the UE 102 receives the field or IE that enables the UE 102 to transmit the first preferred configuration in the SN-initiated UE assistance configuration procedure, the UE 102 can release the field or IE in response to receiving the RRC reconfiguration message at event 548A or in response to releasing the SN 106A.

In some implementations, if the MN 104A is a gNB, the RRC container message can be an RRCReconfiguration message and the RRC container response message can be an RRCReconfigurationComplete message. In other implementations, if the MN 104A is an eNB or an ng-eNB, the RRC container message can be an RRCConnectionReconfiguration message and the RRC container response message can be an RRCConnectionReconfigurationComplete message.

In some implementations, if the SN 106A is a gNB, the RRC reconfiguration message and the RRC reconfiguration complete message can be an RRCReconfiguration message and an RRCReconfigurationComplete message, respectively. In other implementations, if the SN 106B is an eNB or an ng-eNB, the RRC reconfiguration message and the RRC reconfiguration complete message can be an RRCConnectionReconfiguration message and an RRCConnectionReconfigurationComplete message, respectively.

Figure 5B:
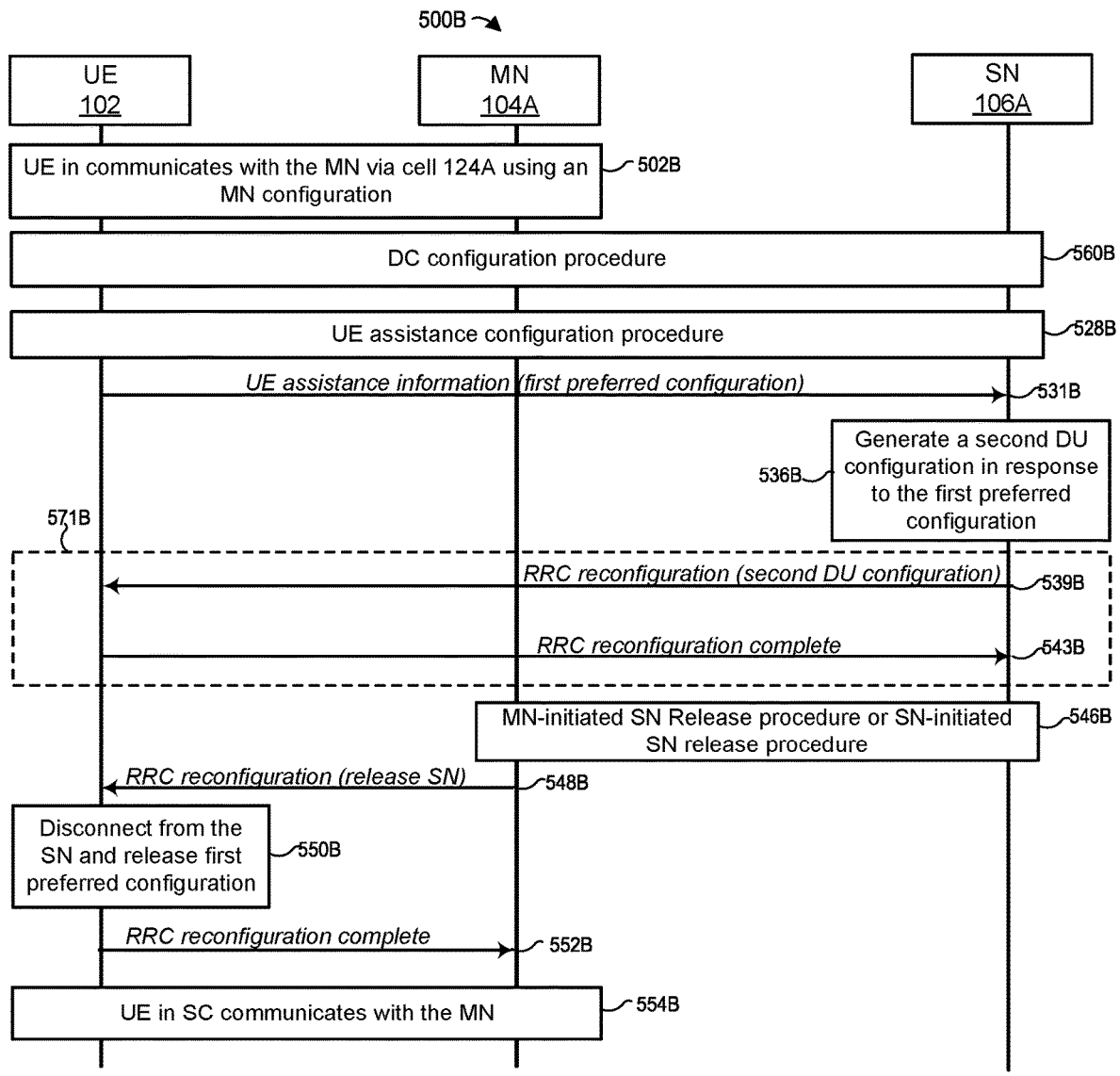
FIG. 5B is a messaging diagram of a scenario similar to the scenario of FIG. 5A, but with the SN providing a DU configuration to the UE directly over a radio interface.

Referring now to FIG. 5B, in a scenario 500B, the base station 104A again operates as an MN for the UE 102, and the base station 106A again operates as an SN for the UE 102. Whereas in FIG. 5A the UE 102 sends the first preferred configuration to the SN 106A via the MN 104A, in FIG. 5B the UE 102 sends the first preferred configuration directly to the SN 106A. Consequently, the SN 106A sends the second DU configuration directly to the UE 102.

Initially, the UE 102 communicates 502B data in SC with the MN 104A via cell 124A by using an MN configuration, similar to event 502A. Later in time, the MN 104A performs a DC configuration procedure 560B, similar to the DC configuration procedure 560A. As a result, the UE 102 communicates control signals and data in DC with the MN 104A and with the SN 106A (e.g., the DU of the SN 106A) by using a first DU configuration received from the MN 104A during the DC configuration procedure 560B.

After the UE 102 connects to the SN 106A, either the MN 104A or the SN 106A can initiate 528B a UE assistance configuration procedure with the UE 102, similar to event 528A, to enable the UE 102 to transmit a preferred configuration directly to the SN 106A. After the UE 102 is enabled to transmit a preferred configuration, the UE 102 performs a UE assistance information procedure 531B by transmitting a UE assistance information message including a first preferred configuration directly to the SN 106A for different reasons in various scenarios and implementations, as discussed above with respect to FIG. 5A. The SN 106A then generates 536B a second DU configuration in response to receiving the first preferred configuration, similar to event 536A.

In some implementations, after generating the second DU configuration, the SN 106A sends 539B an RRC reconfiguration message including the second DU configuration directly to the UE 102. In response, the UE 102 can transmit 543B an RRC reconfiguration complete message directly to the SN 106A. SRB3 resources can enable the UE 102 and the SN 106A to exchange the RRC reconfiguration message and the RRC reconfiguration complete message. Thus, the UE 102 can update the multiple configuration parameters previously provided by the SN 106A during the DC configuration procedure 560B in the first DU configuration with the second DU configuration, and communicate with the SN 106A by using the updated configuration parameters. The events 539B and 543B are collectively referred to in FIG. 5B as an RRC reconfiguration procedure 571B.

Later in time (e.g., after the MN 104A or the SN 106A detects that traffic of the UE 102 is inactive on the SN-terminated radio bearer(s)), the MN 104A or the SN 106A can initiate 546B an SN release procedure to release the SN 106A for the UE 102, similar to event 546A. After either the MN 104A or the SN 106A determines to release the SN 106A, the MN 104A sends 548B an RRC reconfiguration message indicating release of the SN 106A to the UE 102, similar to event 548A. As a result, the UE 102 disconnects 550B from the SN 106A and releases the first preferred configuration in response to releasing the SN 106A, similar to event 550A. The UE 102 then transmits 552B an RRC reconfiguration complete message to the MN 104A in response to the RRC reconfiguration message, similar to event 552A. Accordingly, the UE 102 in SC communicates 554B with the MN 104A after disconnecting from the SN 106A, similar to event 554A.

Figure 5C:
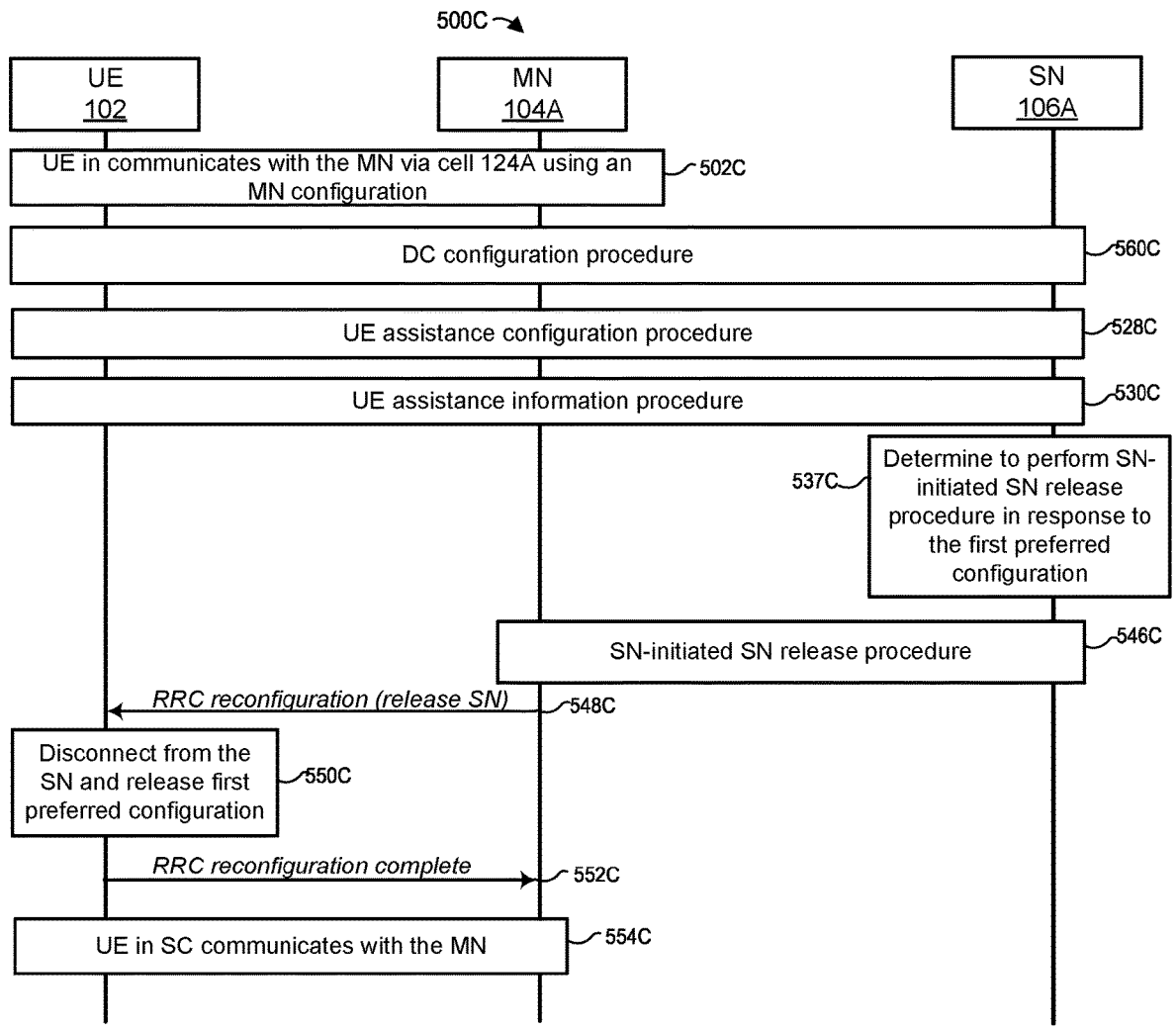
FIG. 5C is a messaging diagram of an example scenario in which an SN initiates an SN release procedure due to the preferred configuration of the UE, and the UE releases the preferred configuration in response to the initiation of the SN release procedure.

Referring now to FIG. 5C, in a scenario 500C, the base station 104A again operates as an MN for the UE 102, and the base station 106A again operates as an SN for the UE 102. Whereas in FIG. 5A or FIG. 5B the MN 104A or the SN 106A initiates the SN release procedure independent of the first preferred configuration received from the UE 102, in FIG. 5C the UE 102 informs the SN 106A to initiate the SN release procedure by way of sending the first preferred configuration to the SN 106A.

Initially, the UE 102 communicates 502C data in SC with the MN 104A via cell 124A by using an MN configuration, similar to event 502A. Later in time, the MN 104A performs a DC configuration procedure 560C, similar to the DC configuration procedure 560A. As a result, the UE 102 communicates control signals and data in DC with the MN 104A and with the SN 106A by using a first DU configuration received from the MN 104A during the DC configuration procedure 560C.

After the UE 102 connects to the SN 106A, either the MN 104A or the SN 106A can initiate 528C a UE assistance configuration procedure with the UE 102, similar to event 528A, to enable the UE 102 to transmit a preferred configuration. After the UE 102 is enabled to transmit a preferred configuration, the UE 102 performs a UE assistance information procedure 530C, similar to events 530A or 531B, thereby providing a first preferred configuration to the SN 106A. In some implementations, the first preferred configuration generated by the UE 102 can include indications for releasing the SN 106A. For example, if the SN 106A is a 5G base station such as a gNB, the first preferred configuration includes indications for disabling 5G. As another example, the first preferred configuration includes indications for zero SCells associated with the SN 106A. For example, the indications can be reducedCCsDL and/or reducedCCsUL fields. In the first preferred configuration or UE assistance information message, the UE 102 can include the reducedCCsDL field having a value "0" to indicate zero SCells associated with the SN 106A, in one implementation. In this implementation, the UE 102 may or may not include the reducedCCsUL field in the first preferred configuration or UE assistance information message. If the UE 102 includes the reducedCCsUL field, it may have a value "0" or a value other than "0". If the SN 106A receives the reducedCCsDL field with value "0" and the reducedCCsUL field with a value other than "0", the SN 106A can determine that the UE 102 indicates zero SCells associated with the SN 106A according to the reducedCCsDL field and ignore the reducedCCsUL field. Upon receiving the first preferred configuration, the SN 106A, instead of generating a second DU configuration like in events 536A or 536B, determines 537C to perform an SN release procedure in response to the first preferred configuration.

Accordingly, the SN 106A can initiate 546C the SN release procedure to release the SN 106A for the UE 102. After the SN 106A determines to release the SN 106A, the MN 104A sends 548C an RRC reconfiguration message indicating release of the SN 106A to the UE 102, similar to event 548A. As a result, the UE 102 disconnects 550C from the SN 106A and releases the first preferred configuration in response to releasing the SN 106A, similar to event 550A. The UE 102 then transmits 552C an RRC reconfiguration complete message to the MN 104A in response to the RRC reconfiguration message, similar to event 552A. Accordingly, the UE 102 in SC communicates 554C with the MN 104A after disconnecting from the SN 106A, similar to event 554A.

Figure 5D:
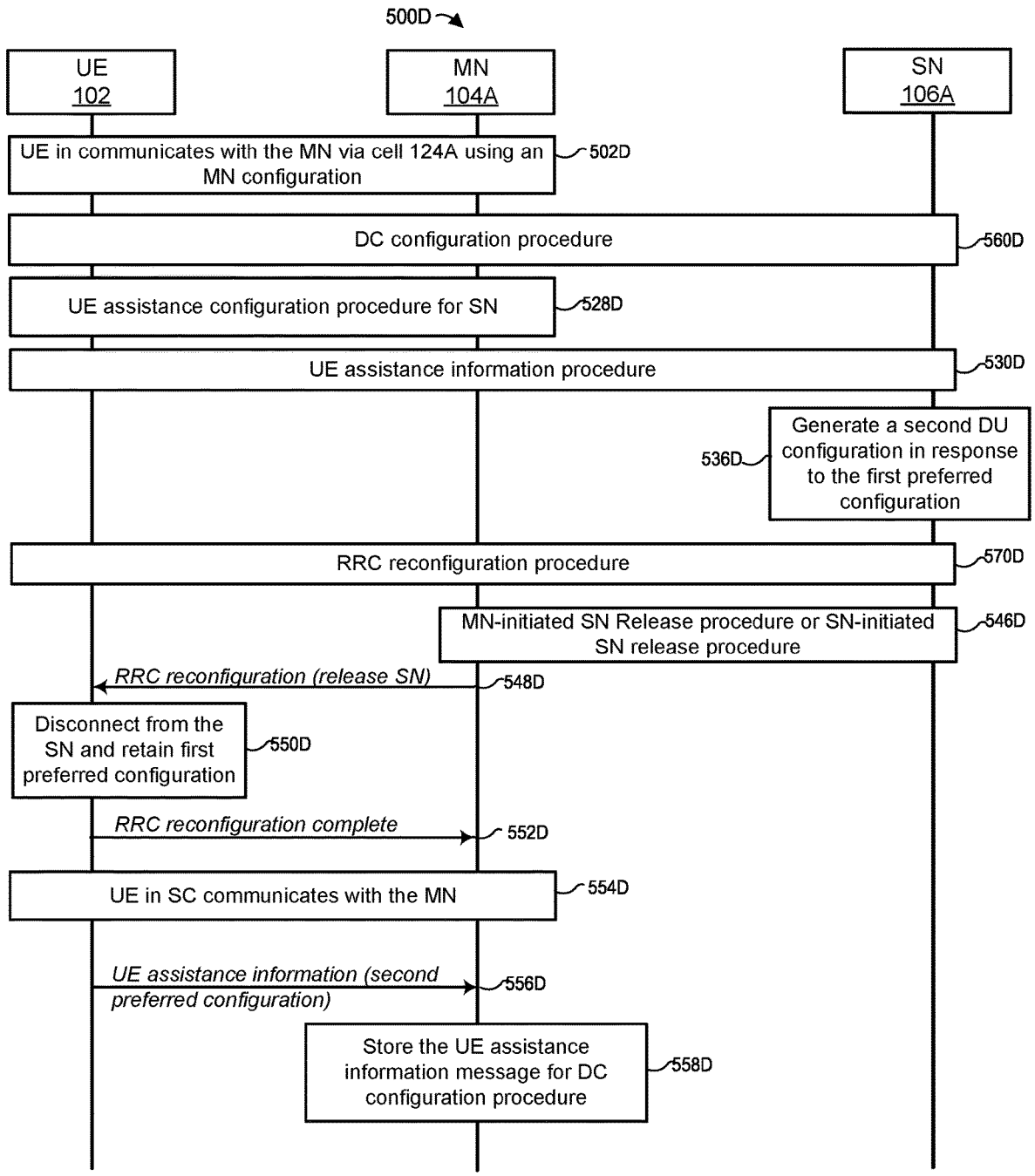
FIG. 5D is a messaging diagram of an example scenario in which the UE retains the preferred configuration in response to the initiation of the SN release procedure, until the UE generates a new preferred configuration.

Referring now to FIG. 5D, in a scenario 500D, the base station 104A again operates as an MN for the UE 102, and the base station 106A again operates as an SN for the UE 102. Whereas in FIG. 5A the UE 102 releases the first preferred configuration at event 550A, in FIG. 5D the UE 102 retains the first preferred configuration.

Initially, the UE 102 communicates 502D data in SC with the MN 104A via cell 124A by using an MN configuration, similar to event 502A. Later in time, the MN 104A performs a DC configuration procedure 560D, similar to the DC configuration procedure 560A. As a result, the UE 102 communicates control signals and data in DC with the MN 104A and with the SN 106A by using a first DU configuration received from the MN 104A during the DC configuration procedure 560D.

After the UE 102 connects to the SN 106A, whereas in FIG. 5A either the MN 104A or the SN 106A can initiate 528A a UE assistance configuration procedure, in FIG. 5D only the MN 104A can initiate 528D the UE assistance configuration procedure, to enable the UE 102 to transmit a preferred configuration. After the UE 102 is enabled to transmit a preferred configuration, the UE 102 performs a UE assistance information procedure 530D by transmitting a UE assistance information message including a first preferred configuration to the SN 106A via the MN 104A for different reasons in various scenarios and implementations, as discussed above with respect to FIG. 5A. The SN 106A then generates 536D a second DU configuration in response to receiving the first preferred configuration, similar to event 536A.

In some implementations, after generating the second DU configuration, the SN 106A performs an RRC reconfiguration procedure 570D with the UE 102, similar to events 570A or 571B. Thus, the UE 102 can update the multiple configuration parameters previously provided by the SN 106A during the DC configuration procedure 560D in the first DU configuration with the second DU configuration, and communicate with the SN 106A by using the updated configuration parameters.

Later in time (e.g., after the MN 104A or the SN 106A detects that traffic of the UE 102 is inactive on the SN-terminated radio bearer(s)), the MN 104A or the SN 106A can initiate 546D an SN release procedure to release the SN 106A for the UE 102, similar to event 546A. After either the MN 104A or the SN 106A determines to release the SN 106A, the MN 104A sends 548D an RRC reconfiguration message indicating release of the SN 106A to the UE 102, similar to event 548A. As a result, the UE 102 disconnects 550D from the SN 106A, similar to event 550A, but retains the first preferred configuration in response to releasing the SN 106A. The UE 102 then transmits 552D an RRC reconfiguration complete message to the MN 104A in response to the RRC reconfiguration message, similar to event 552A. Accordingly, the UE 102 in SC communicates 554D with the MN 104A after disconnecting from the SN 106A, similar to event 554A.

Later in time, the UE 102 can transmit 556D another UE assistance information message including another preferred configuration (i.e., a second preferred configuration) to the MN 104A, similar to the manner in which the UE 102 can transmit 344B the second preferred configuration to the DU 174 of the base station 104A discussed above with respect to FIG. 3B. By sending the second preferred configuration to the MN 104A, the UE 102 can override the first preferred configuration retained at the MN 104A during the UE assistance information procedure 530D, so that the UE 102 and MN 104A can then communicate using the second preferred configuration. The MN 104A can also store 558D the second preferred configuration. In some implementations, the MN 104A can release the first preferred configuration at event 558D. In other implementations, the MN 104A can store preferred parameter(s) that remain unchanged by the second preferred configuration at event 558D.

The UE 102 can transmit 556D the second preferred configuration for similar reasons described above with respect to FIG. 3B. In one particular example, the UE 102 can transmit the second preferred configuration to adjust (e.g., increase or decrease) the number of SCells associated with the SN 106A as indicated in the first preferred configuration or release the first preferred configuration. As such, because the MN 104A can store 558D the second preferred configuration, the MN 104A can accommodate preferences of the UE 102 related to the SN 106A if the MN 104A later determines to perform a DC configuration procedure, similar to event 560D.

Figure 5E:
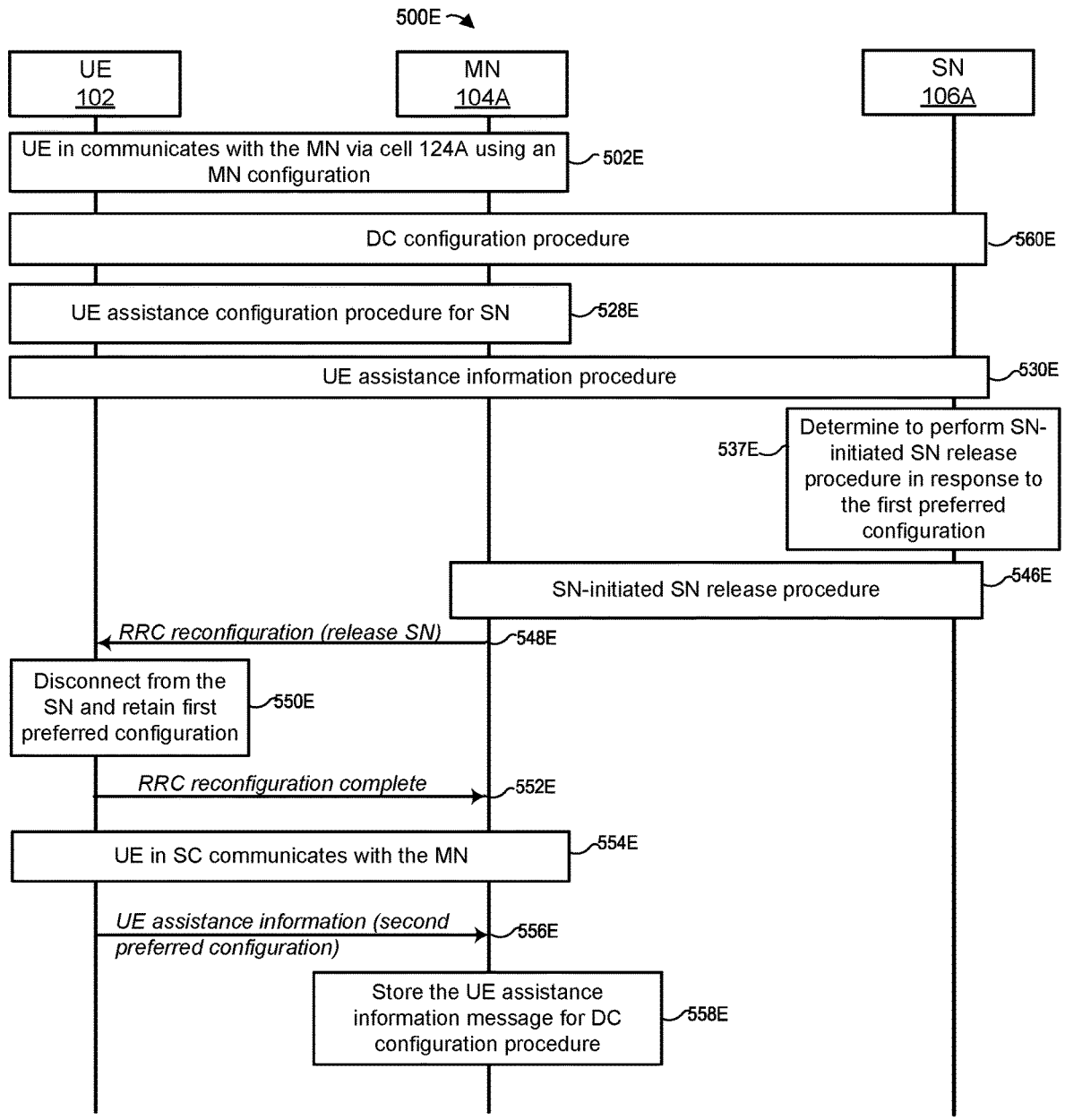
FIG. 5E is a messaging diagram of an example scenario in which an SN initiates an SN release procedure due to the preferred configuration of the UE, but the UE retains the preferred configuration in response to the initiation of the SN release procedure, until the UE generates a new preferred configuration.

Referring now to FIG. 5E, in a scenario 500E, the base station 104A again operates as an MN for the UE 102, and the base station 106A again operates as an SN for the UE 102. Whereas in FIG. 5C the UE 102 disconnects from the SN 106A and releases the first preferred configuration, in FIG. 5E the UE 102 disconnects from the SN 106A and retains the first preferred configuration.

Initially, the UE 102 communicates 502E data in SC with the MN 104A via cell 124A by using an MN configuration, similar to event 502C. Later in time, the MN 104A performs a DC configuration procedure 560E, similar to the DC configuration procedure 560C. As a result, the UE 102 communicates control signals and data in DC with the MN 104A and with the SN 106A by using a first DU configuration received from the MN 104A during the DC configuration procedure 560E.

After the UE 102 connects to the SN 106A, whereas in FIG. 5C either the MN 104A or the SN 106A can initiate 528C a UE assistance configuration procedure, in FIG. 5E only the MN 104A can initiate 528E the UE assistance configuration procedure, similar to event 528D, to enable the UE 102 to transmit a preferred configuration. After the UE 102 is enabled to transmit a preferred configuration, the UE 102 performs a UE assistance information procedure 530E, similar to event 530D, thereby providing a first preferred configuration to the SN 106A. In some implementations, the first preferred configuration generated by the UE 102 can include indications for releasing the SN 106A. For example, if the SN 106A is a gNB, the first preferred configuration includes indications for disabling 5G. As another example, the first preferred configuration includes indications (e.g., reducedCCsDL and/or reducedCCsUL fields discussed above) for zero SCells associated with the SN 106A. Upon receiving the first preferred configuration, the SN 106A determines 537E to perform an SN release procedure in response to the first preferred configuration, similar to event 537C.

Accordingly, the SN 106A can initiate 546E the SN release procedure to release the SN 106A for the UE 102, similar to event 546C. After the SN 106A determines to release the SN 106A, the MN 104A sends 548E an RRC reconfiguration message indicating release of the SN 106A to the UE 102, similar to event 548C. As a result, the UE 102 disconnects 550E from the SN 106A, similar to event 550D, but retains the first preferred configuration in response to releasing the SN 106A. The UE 102 then transmits 552E an RRC reconfiguration complete message to the MN 104A in response to the RRC reconfiguration message, similar to event 552D. Accordingly, the UE 102 in SC communicates 554E with the MN 104A after disconnecting from the SN 106A, similar to event 554D.

Later in time, the UE 102 can transmit 556E another UE assistance information message including another preferred configuration (i.e., a second preferred configuration) to the MN 104A, similar to event 556D. By sending the second preferred configuration to the MN 104A, the UE 102 can override the first preferred configuration retained at the MN 104A during the UE assistance information procedure 530E, so that the UE 102 and MN 104A can then communicate using the second preferred configuration. The UE 102 can transmit 556E the second preferred configuration for similar reasons described above with respect to FIG. 5D. The MN 104A can also store 558E the second preferred configuration, similar to event 558D.

Figure 5F:
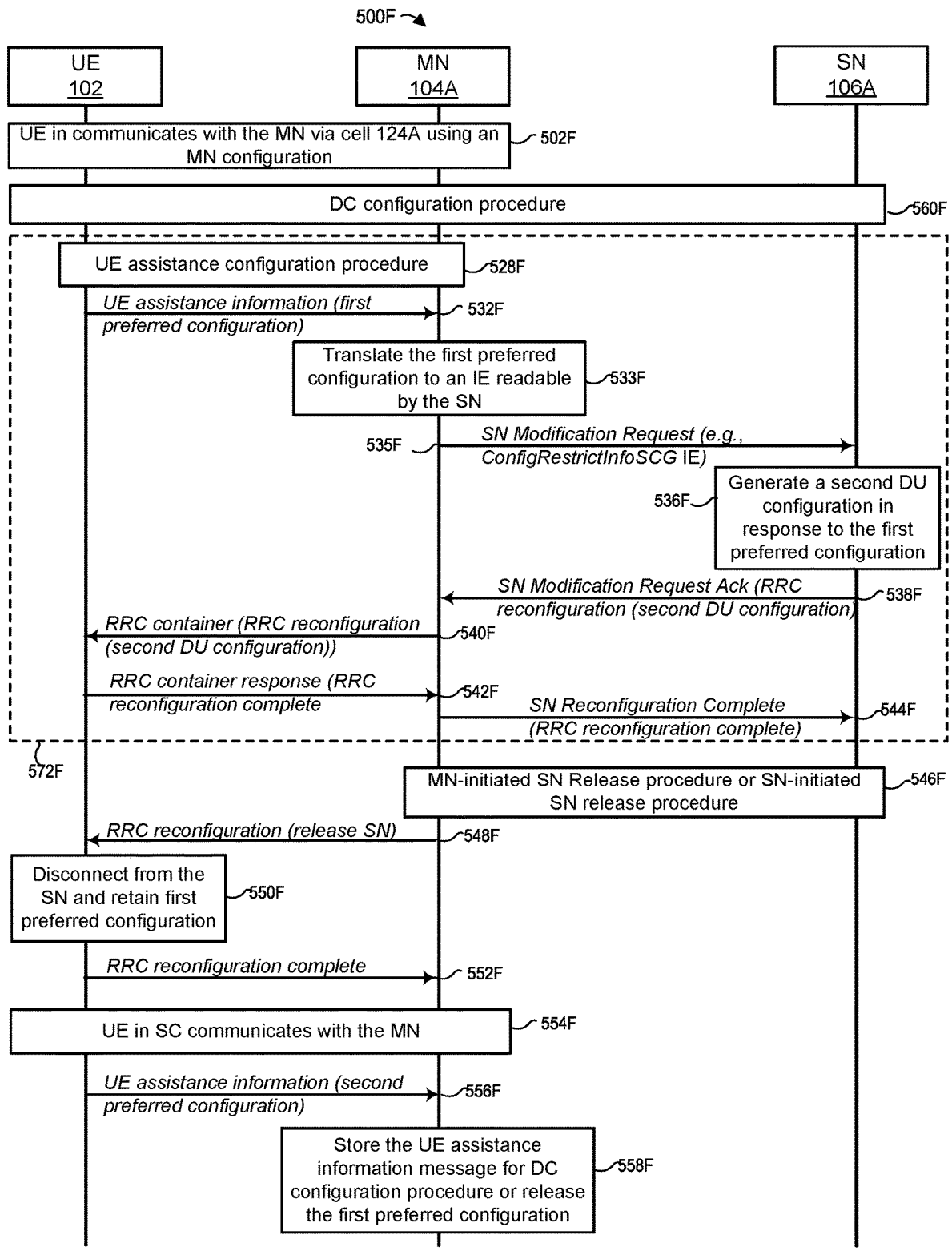
FIG. 5F is a messaging diagram of an example scenario in which the MN formats preferred configuration so that the SN can process the preferred configuration.

Referring now to FIG. 5F, in a scenario 500F, the base station 104A again operates as an MN for the UE 102, and the base station 106A again operates as an SN for the UE 102. Whereas in FIG. 5D the SN 106A is capable of receiving a UEAssistanceInformation message including a first preferred configuration from the MN 104A to generate a second DU configuration at event 536D, in FIG. 5F the SN 106A is a legacy base station that is not capable of interpreting a UEAssistanceInformation message. To provide the first preferred configuration to a legacy SN 106A, the MN 104A can send the first preferred configuration to the SN 106A via an SN Modification Request message.

Initially, the UE 102 communicates 502F data in SC with the MN 104A via cell 124A by using an MN configuration, similar to event 502D. Later in time, the MN 104A performs a DC configuration procedure 560F, similar to the DC configuration procedure 560D. As a result, the UE 102 communicates control signals and data in DC with the MN 104A and with the SN 106A by using a first DU configuration received from the MN 104A during the DC configuration procedure 560D.

After the UE 102 connects to the SN 106A, the MN 104A initiates 528F the UE assistance configuration procedure to enable the UE 102 to transmit a preferred configuration, similar to event 528D. After the UE 102 is enabled to transmit a preferred configuration, the UE transmits 532F a UE assistance information message including a first preferred configuration to the MN 104, similar to event 532A. In turn, the MN 104A translates 533F the first preferred configuration to an IE that can be readable by the SN 106A. The IE can be a ConfigRestrictInfoSCG IE as defined in 3 GPP TS 36.331 and 38.331, for example. Subsequently, in contrast to sending the first preferred configuration in a UE assistance information message like in event 534A, the MN 104A transmits 535F an SN Modification Request message including the IE to the SN 106A. Thus, even if the SN 106A is a legacy base station that is unable to interpret the UE assistance information message, the SN 106A can interpret the SN Modification Request message and generate 536F a second DU configuration in response to receiving the first preferred configuration via the SN Modification Request message.

In some implementations, after generating the second DU configuration, the SN 106A sends 538F an RRC reconfiguration message including the second DU configuration to the MN 104A via an SN Modification Request Acknowledge message, which in turn transmits 540F the RRC reconfiguration message to the UE 102 via an RRC container message. In response, the UE 102 can transmit 542F an RRC reconfiguration complete message to the MN 104A via an RRC container response message, which in turn sends 544F the RRC reconfiguration complete message to the SN 106A via an SN Reconfiguration Complete message. Thus, the UE 102 can update the multiple configuration parameters previously provided by the SN 106A during the DC configuration procedure 560F in the first DU configuration with the second DU configuration, and communicate with the SN 106A by using the updated configuration parameters. The events 528F, 532F, 533F, 535F, 536F, 538F, 540F, 542F, and 544F are collectively referred to in FIG. 5F as a legacy UE assistance information procedure 572F.

Later in time (e.g., after the MN 104A or the SN 106A detects that traffic of the UE 102 is inactive on the SN-terminated radio bearer(s)), the MN 104A or the SN 106A can initiate 546F an SN release procedure to release the SN 106A for the UE 102, similar to event 546D. After either the MN 104A or the SN 106A determines to release the SN 106A, the MN 104A sends 548F an RRC reconfiguration message indicating release of the SN 106A to the UE 102, similar to event 548D. As a result, the UE 102 disconnects 550F from the SN 106A and retains the first preferred configuration in response to releasing the SN 106A, similar to event 550D. The UE 102 then transmits 552F an RRC reconfiguration complete message to the MN 104A in response to the RRC reconfiguration message, similar to event 552D. Accordingly, the UE 102 in SC communicates 554F with the MN 104A after disconnecting from the SN 106A, similar to event 554D.

Later in time, the UE 102 can transmit 556F another UE assistance information message including another preferred configuration (i.e., a second preferred configuration) to the MN 104A, similar to event 556D, for similar reasons described above with respect to FIG. 5D. By sending the second preferred configuration to the MN 104A, the UE 102 can override the first preferred configuration retained at the MN 104A during the legacy UE assistance information procedure 572F, so that the UE 102 and MN 104A can then communicate using the second preferred configuration. The MN 104A can store 558F the second preferred configuration, similar to event 558D. In doing so, the MN 104A can accommodate preferences of the UE 102 related to the SN 106A if the MN 104A later determines to perform a DC configuration procedure, similar to event 560F. In some implementations, the MN 104A can release the first preferred configuration at event 558F.

Later, the MN 104A can perform a DC configuration procedure with an SN (e.g., SN 106A or SN 106B), similar to the DC configuration procedure 560A. In one implementation, the MN 104A can translate the second preferred configuration to an IE (e.g., ConfigRestrictInfoSCG IE) that can be readable by the SN, and send an SN Addition Request message including the IE to the SN in the DC configuration procedure. Therefore, the SN can generate a DU configuration according to the IE to satisfy the second preferred configuration for the UE 102, and transmit the DU configuration to the UE 102 via the MN 104A, similar to the events 516A and 517A. In another implementation, if the MN 104A releases the first preferred configuration, the MN 104A can translate the UE capabilities to an IE (e.g., ConfigRestrictInfoSCG IE) that can be readable by the SN, and send an SN Addition Request message including the IE to the SN in the DC configuration procedure.

Figure 5G:
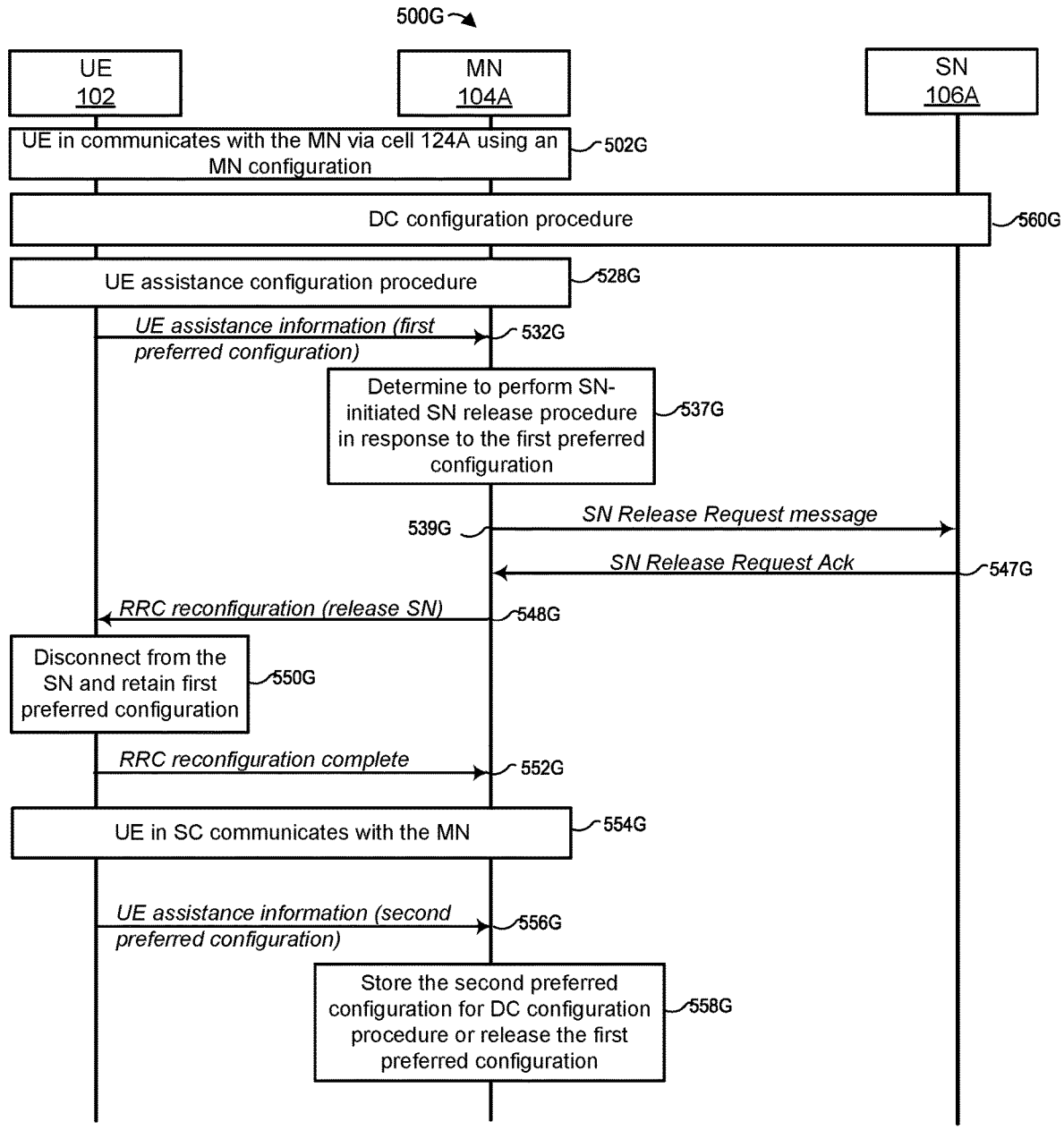
FIG. 5G is a messaging diagram of an example scenario in which the MN determines to release an SN in response to receiving a preferred configuration from the SN.

Referring now to FIG. 5G, in a scenario 500G, the base station 104A again operates as an MN for the UE 102, and the base station 106A again operates as an SN for the UE 102. Whereas in FIG. 5E the SN 106A determines to perform the SN release procedure at event 537E, in FIG. 5G the MN 104A determines to perform the SN release procedure.

Initially, the UE 102 communicates 502G data in SC with the MN 104A via cell 124A by using an MN configuration, similar to event 502E. Later in time, the MN 104A performs a DC configuration procedure 560G, similar to the DC configuration procedure 560E. As a result, the UE 102 communicates control signals and data in DC with the MN 104A and with the SN 106A by using a first DU configuration received from the MN 104A during the DC configuration procedure 560G.

After the UE 102 connects to the SN 106A, the MN 104A can initiate 528G the UE assistance configuration procedure, similar to event 528E, to enable the UE 102 to transmit a preferred configuration. After the UE 102 is enabled to transmit a preferred configuration, the UE 102 transmits 532G a UE assistance information message including a first preferred configuration to the MN 104, similar to event 532A. The first preferred configuration can include an indication to release the SN 106A or disabling 5G. In turn, the MN 104A determines 537G to perform an SN release procedure in response to the first preferred configuration. Subsequently, the MN 104A sends 539G an SN Release Request message to the SN 106A, which in turn sends 547G an SN Release Request Acknowledge message to the MN 104A. In turn, the MN 104A sends 548G an RRC reconfiguration message indicating release of the SN 106A to the UE 102, similar to event 548E. As a result, the UE 102 disconnects 550G from the SN 106A and retains the first preferred configuration in response to releasing the SN 106A, similar to event 550E. The UE 102 then transmits 552G an RRC reconfiguration complete message to the MN 104A in response to the RRC reconfiguration message, similar to event 552E. Accordingly, the UE 102 in SC communicates 554G with the MN 104A after disconnecting from the SN 106A, similar to event 554E.

Later in time, the UE 102 can transmit 556G another UE assistance information message including another preferred configuration (i.e., a second preferred configuration) to the MN 104A, similar to event 556E. For example, the second preferred configuration can include an indication to add the SN 106A that was previously indicated to be released in the first preferred configuration. By sending the second preferred configuration to the MN 104A, the UE 102 can override the first preferred configuration retained at the MN 104A at event 532G, so that the UE 102 and MN 104A can then communicate using the second preferred configuration. The UE 102 can transmit 556G the second preferred configuration for similar reasons described above with respect to FIG. 5E. The MN 104A can store 558G the second preferred configuration, similar to event 558E. In doing so, the MN 104A can perform a DC configuration procedure for the UE 102 or accommodate preferences of the UE 102 related to the SN 106A if the MN 104A later determines to perform a DC configuration procedure. In some implementations, the MN 104A can release the first preferred configuration at event 558G.

Figure 6A:
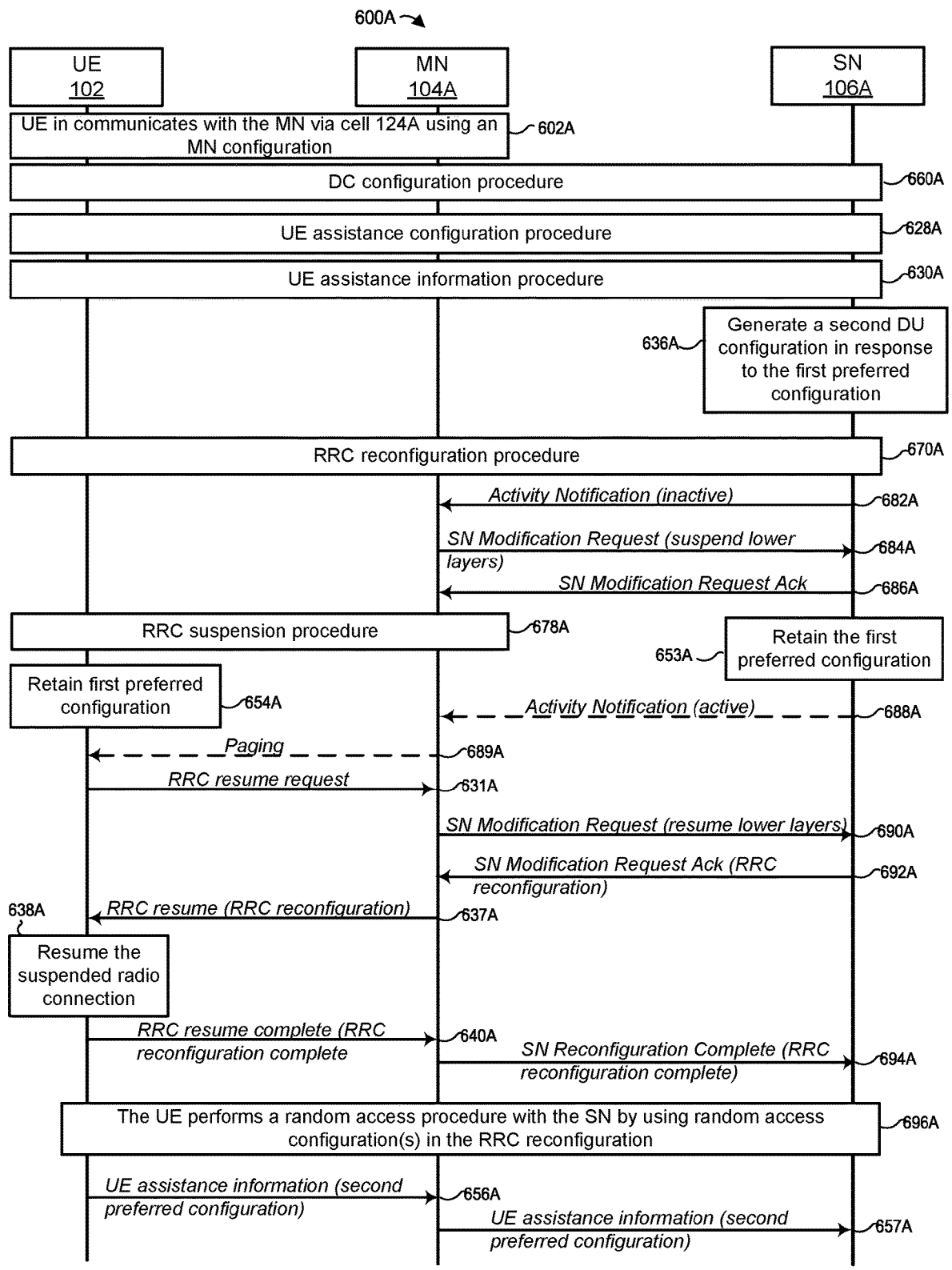
FIG. 6A is a messaging diagram of an example scenario in which the UE retains a preferred configuration in response to receiving an indication from an MN to suspend a radio connection with the RAN, until the UE generates a new preferred configuration.
Figure 6B:
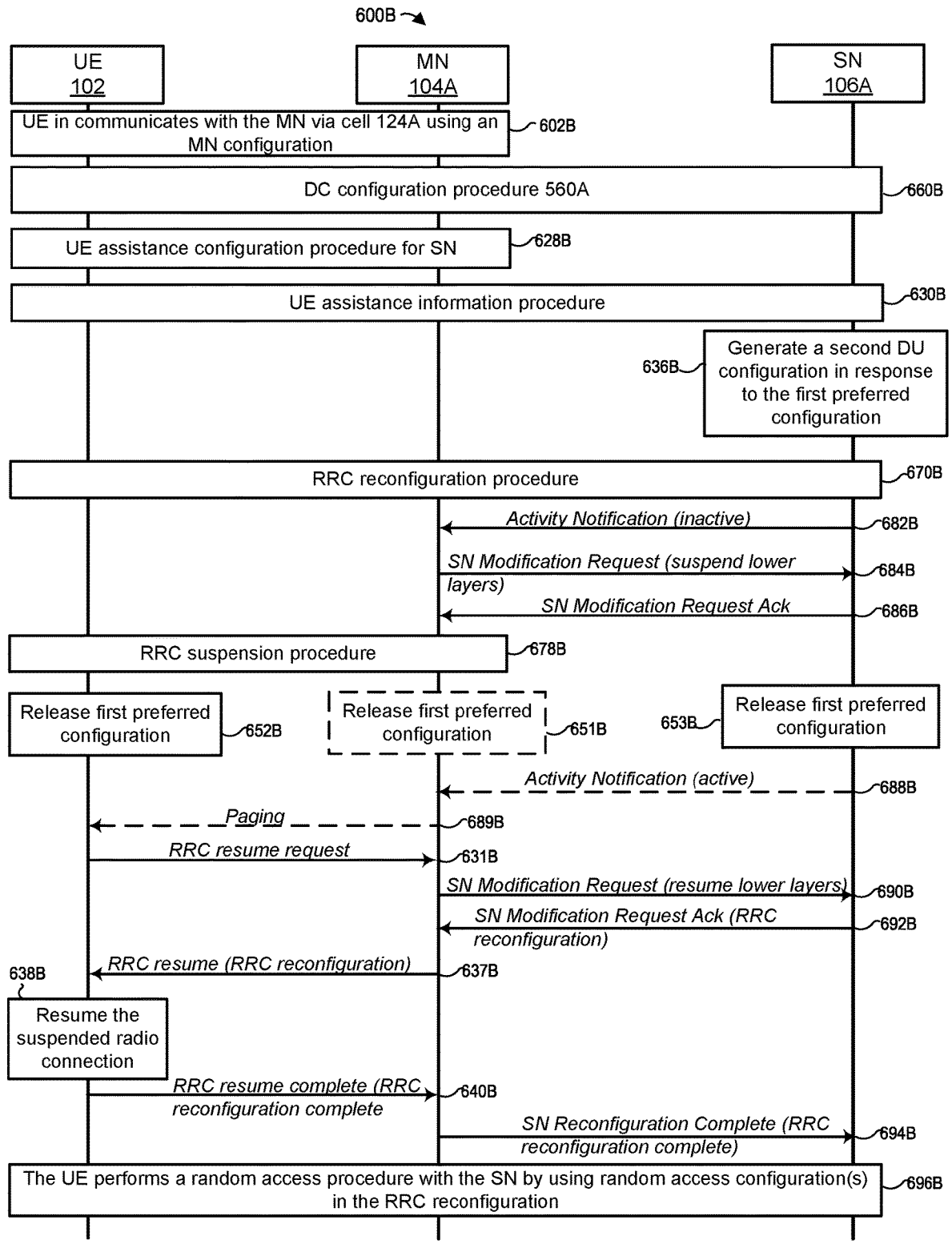
FIG. 6B is a messaging diagram of an example scenario in which the UE releases a preferred configuration after receiving an indication from an MN to suspend a radio connection with an SN.
Figure 6C:
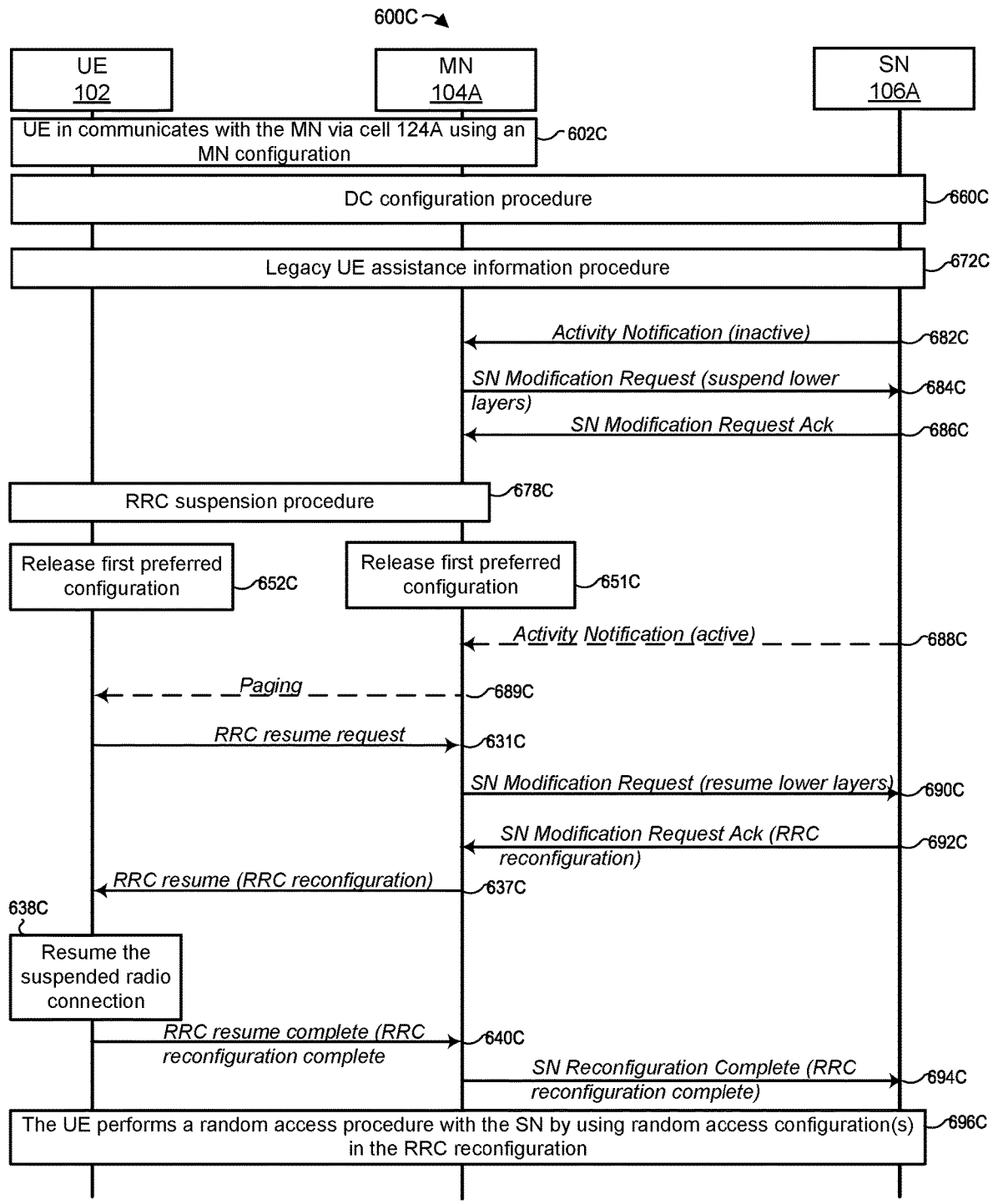
FIG. 6C is a messaging diagram of an example scenario in which the UE releases a preferred configuration after receiving an indication from an MN to suspend a radio connection with a legacy SN.

Now referring to FIGS. 6A-6C, the UE 102 retains or releases a preferred configuration in response to suspending a radio connection with the RAN.

Referring first to FIG. 6A, in a scenario 600A, the base station 104A again operates as an MN for the UE 102, and the base station 106A again operates as an SN for the UE 102. Later, e.g., due to data inactivity between the UE 102 and the SN 106A, the radio connection between the UE 102 and the SN 106A is suspended. The UE 102 and the SN 106A retain the first preferred configuration, and later the UE 102 provides a second preferred configuration to override the retained first preferred configuration upon resuming connectivity with the SN 106A.

Initially, the UE 102 communicates 602A data in SC with the MN 104A via cell 124A by using an MN configuration, similar to event 502D. Later in time, the MN 104A performs a DC configuration procedure 660A, similar to the DC configuration procedure 560D. As a result, the UE 102 communicates control signals and data in DC with the MN 104A and with the SN 106A by using a first DU configuration received from the MN 104A during the DC configuration procedure 660A.

After the UE 102 connects to the SN 106A, the SN 106A initiates 628A the UE assistance configuration procedure, to enable the UE 102 to transmit a preferred configuration. After the UE 102 is enabled to transmit a preferred configuration, the UE 102 performs a UE assistance information procedure 630A, similar to events 530A or 531B, by transmitting a UE assistance information message including a first preferred configuration to the SN 106A, either directly or via the MN 104A for different reasons in various scenarios and implementations, as discussed above with respect to FIG. 5A. The SN 106A then generates 636A a second DU configuration in response to receiving the first preferred configuration, similar to event 536D.

In some implementations, after generating the second DU configuration, the SN 106A performs an RRC reconfiguration procedure 670A with the UE 102, similar to event 570D. Thus, the UE 102 can update the multiple configuration parameters previously provided by the SN 106A during the DC configuration procedure 660A in the first DU configuration with the second DU configuration, and communicate with the SN 106A by using the updated configuration parameters.

Later in time (e.g., after the SN 106A detects that traffic of the UE 102 is inactive on the SN-terminated radio bearer(s)), the SN 106A sends 682A an Activity Notification message to the MN 104A, indicating that the traffic of the UE 102 is inactive on some or all of the SN-terminated radio bearer(s). After receiving the Activity Notification message, the MN 104A determines that the UE 102 should transition to the inactive state. In response to this determination, or in response to receiving the Activity Notification message, the MN 104A transmits 684A to the SN 106A an SN Modification Request message for the UE 102. The SN Modification Request message includes an indication that the SN 106A should suspend lower layers of the SN-terminated radio bearer(s). For example, the SN Modification Request message can indicate that the SN 106A should suspend the resources of the PHY layer, the MAC layer, and/or the RLC layer. In response to receiving the SN Modification Request message, the SN 106A suspends the lower layers of the SN-terminated radio bearer(s) and transmits 686A an SN Modification Request Acknowledge message to the MN 104A.

In response to receiving the SN Modification Request Acknowledge message, the MN 104A performs an RRC suspension procedure 678A, similar to the RRC suspension procedure 378A. As a result, the UE 102 suspends the radio connection associated with the SN 106A, and can transition to an inactive state or an idle state.

In some implementations, after the MN 104A performs the RRC suspension procedure 678A with the UE 102, the UE 102 can retain 654A the first preferred configuration (e.g., in response to receiving an RRC suspension message during the RRC suspension procedure 678A). Similarly, in some implementations, the SN 106A can retain 653A the first preferred configuration.

Later in time (e.g., after the SN 106A detects that traffic of the UE 102 is active on the SN-terminated radio bearer(s)), the SN 106A can send 688A an Activity Notification message to the MN 104A, indicating that the traffic of the UE 102 is active on some or all of the SN-terminated radio bearer(s), in some implementations. In turn, MN 104A sends 689A a Paging message to the UE 102. In response to the Paging message, the UE 102 can transmit 631A an RRC resume request message to the MN 104A. In other implementations, the UE 102 can transmit 631A an RRC resume request message to the MN 104A upon determining to initiate a data transmission with the SN 106A instead of in response to the Paging message.

In response to receiving either the Activity Notification message from the SN 106A or the RRC resume request message from the UE 102, the MN 104A determines that the UE 102 should transition back to the connected state. In response to this determination, or in response to receiving the Activity Notification message, the MN 104A transmits 690A to the SN 106A an SN Modification Request message for the UE 102. The SN Modification Request message includes an indication that the SN 106A should resume the lower layers of the SN-terminated radio bearer(s) that were previously suspended at event 684A. For example, the SN Modification Request message can indicate that the SN 106A should resume the resources of the PHY layer, the MAC layer, and/or the RLC layer. In response to receiving the SN Modification Request message, the SN 106A resumes the lower layers of the SN-terminated radio bearer(s) and transmits 692A an RRC reconfiguration message to the MN 104A via an SN Modification Request Acknowledge message to enable the UE 102 to again communicate with the SN 106A. In turn, the MN 104A transmits 637A the RRC reconfiguration message to the UE 102 via an RRC resume message. As a result, the UE 102 resumes 638A the suspended radio connection and transitions to the connected state. The UE 102 can transmit 640A an RRC reconfiguration complete message to the MN 104A via an RRC resume complete message, which in turn can send 694A an RRC reconfiguration complete message to the SN 106A via an SN reconfiguration complete message.

The UE 102 then initiates 696A a random access procedure with the SN 106A, e.g., by using one or more random access configurations included in the RRC reconfiguration message. After gaining access to a channel, the SN 106A identifies the UE 102 during the random access procedure (e.g., the UE 102 succeeds the contention resolution), and as a result, the UE 102 communicates control signals and data with the SN 106A.

Later in time, the UE 102 can transmit 656A another UE assistance information message including another preferred configuration (i.e., a second preferred configuration) to the SN 106A, either directly (not shown) or via the MN 104A at event 657A. By sending the second preferred configuration to the SN 106A, the UE 102 can override the first preferred configuration retained at the SN 106A at event 653A, so that the UE 102 and SN 106A can then communicate using the second preferred configuration. The UE 102 can transmit 656A the second preferred configuration for similar reasons described above with respect to FIG. 3B and FIG. 5D. In one particular example, the UE 102 can transmit the second preferred configuration to adjust (e.g., increase or decrease) the number of SCells associated with the SN 106A as indicated in the first preferred configuration.

Although not shown in FIG. 6A, the SN 106A can proceed to performing a second DU reconfiguration procedure and a second RRC reconfiguration procedure, similar to a second DU reconfiguration procedure 382B and second RRC reconfiguration procedure 384B, respectively. Thus, the UE 102 can update the multiple configuration parameters that were previously updated in accordance with the first preferred configuration with a second DU configuration generated during the second DU reconfiguration procedure, and communicate with the SN 106A by using the updated configuration parameters.

Referring now to FIG. 6B, in a scenario 600B, the base station 104A again operates as an MN for the UE 102, and the base station 106A again operates as an SN for the UE 102. Whereas in FIG. 6A the UE 102 and the SN 106A retain the first preferred configuration, in FIG. 6B the UE 102 and the SN 106A release the first preferred configuration.

Initially, the UE 102 communicates 602B data in SC with the MN 104A via cell 124A by using an MN configuration, similar to event 602A. Later in time, the MN 104A performs a DC configuration procedure 660B, similar to the DC configuration procedure 660A. As a result, the UE 102 communicates control signals and data in DC with the MN 104A and with the SN 106A by using a first DU configuration received from the MN 104A during the DC configuration procedure 660B.

After the UE 102 connects to the SN 106A, the MN 104A initiates 628B the UE assistance configuration procedure, similar to event 528D, to enable the UE 102 to transmit a preferred configuration. After the UE 102 is enabled to transmit a preferred configuration, the UE 102 performs a UE assistance information procedure 630B, similar to event 530A, by transmitting a UE assistance information message including a first preferred configuration to the SN 106A via the MN 104A for different reasons in various scenarios and implementations, as discussed above with respect to FIG. 5A. The SN 106A then generates 636B a second DU configuration in response to receiving the first preferred configuration, similar to event 636A.

In some implementations, after generating the second DU configuration, the SN 106A performs an RRC reconfiguration procedure 670B with the UE 102, similar to event 670A. Thus, the UE 102 can update the multiple configuration parameters previously provided by the SN 106A during the DC configuration procedure 660B in the first DU configuration with the second DU configuration, and communicate with the SN 106A by using the updated configuration parameters.

Later in time (e.g., after the SN 106A detects that traffic of the UE 102 is inactive on the SN-terminated radio bearer(s)), the SN 106A sends 682B an Activity Notification message to the MN 104A, similar to event 682A. The MN 104A then transmits 684B to the SN 106A an SN Modification Request message for the UE 102, and the SN 106A in turn transmits 686B an SN Modification Request Acknowledge message to the MN 104A, similar to events 684A and 686A, respectively.

In response to receiving the SN Modification Request Acknowledge message, the MN 104A performs an RRC suspension procedure 678B, similar to the RRC suspension procedure 678A. As a result, the UE 102 suspends the radio connection associated with the SN 106A, and can transition to an inactive state or an idle state.

In some implementations, after the MN 104A performs the RRC suspension procedure 678B with the UE 102, the UE 102 can release 652B the first preferred configuration (e.g., in response to receiving an RRC suspension message during the RRC suspension procedure 678B). Similarly, in some implementations, the MN 104A can optionally release the first preferred configuration at event 651B, similar to event 351A. In some implementations, the SN 106A can release the first preferred configuration at event 653B as described below.

Later in time (e.g., after the SN 106A detects that traffic of the UE 102 is active on the SN-terminated radio bearer(s)), the SN 106A can send 688B an Activity Notification message to the MN 104A, similar to event 688A. In turn, MN 104A sends 689B a Paging message to the UE 102, similar to event 689A. In response to the Paging message, the UE 102 can transmit 631B an RRC resume request message to the MN 104A, similar to event 631A. In other implementations, the UE 102 can transmit 631B an RRC resume request message to the MN 104A upon determining to initiate a data transmission with the SN 106A instead of in response to the Paging message.

In response to receiving either the Activity Notification message from the SN 106A or the RRC resume request message from the UE 102, the MN 104A determines that the UE 102 should transition back to the connected state. In response to this determination, or in response to receiving the Activity Notification message, the MN 104A transmits 690B to the SN 106A an SN Modification Request message for the UE 102, similar to event 690A. In response to receiving the SN Modification Request message, the SN 106A resumes the lower layers of the SN-terminated radio bearer(s) and transmits 692B an RRC reconfiguration message to the MN 104A via an SN Modification Request Acknowledge message to enable the UE 102 to again communicate with the SN 106A, similar to event 692A. In turn, the MN 104A transmits 637B the RRC reconfiguration message to the UE 102 via an RRC resume message, similar to event 637A. As a result, the UE 102 resumes 638B the suspended radio connection and transitions to the connected state, similar to event 638A. The UE 102 can then transmit 640B an RRC reconfiguration complete message to the MN 104A via an RRC resume complete message, similar to event 640A, which in turn can send 694B an RRC reconfiguration complete message to the SN 106A via an SN reconfiguration complete message, similar to event 694A.

Instead of releasing the first preferred configuration in response to the RRC suspension procedure at event 652B, the UE 102 can release the first preferred configuration in response to initiating transmission of the RRC resume message or the RRC resume complete message, receiving an RRC resume message, or during the RRC resume procedure, similar to events 352A and 456B.

In one implementation, the SN 106A can release 653B the first preferred configuration after transmitting the Activity Notification message 682B, after receiving the SN Modification Request message at either event 684B or event 690B, after receiving the SN Reconfiguration Complete message at event 694B, or at any time between any two of events 682B, 684B, 686B, 688B, 690B, 692B, 694B.

The UE 102 then initiates 696B a random access procedure with the SN 106A, similar to event 696A, e.g., by using one or more random access configurations included in the RRC reconfiguration message. After gaining access to a channel, the SN 106A identifies the UE 102 during the random access procedure (e.g., the UE 102 succeeds the contention resolution), and as a result, the UE 102 communicates control signals and data with the SN 106A.

By releasing the first preferred configuration at the UE 102, MN 104A, and SN 106A at events 652B, 651B, and 653B, respectively, the UE 102, MN 104A, and SN 106A need not be limited to communicating among each other according to the first preferred configuration upon resuming the suspended radio connection. For example, the UE 102 may have recovered from an overheating situation or increased battery power since the inactive state or an idle state, such that the UE 102 is able to utilize more SCell(s), MIMO layer(s), and/or aggregated bandwidth than those indicated in the first preferred configuration after transitioning back to the connected state.

Referring now to FIG. 6C, in a scenario 600C, the base station 104A again operates as an MN for the UE 102, and the base station 106A again operates as an SN for the UE 102. Whereas in FIG. 6B the SN 106A is capable of receiving a UEAssistanceInformation message including a first preferred configuration from the MN 104A to generate a second DU configuration at event 636B, in FIG. 6C the SN 106A is a legacy base station that is not capable of interpreting a UEAssistanceInformation message. To provide the first preferred configuration to a legacy SN 106A, the MN 104A can send the first preferred configuration to the SN 104A via an SN Modification Request message.

Initially, the UE 102 communicates 602C data in SC with the MN 104A via cell 124A by using an MN configuration, similar to event 602B. Later in time, the MN 104A performs a DC configuration procedure 660C, similar to the DC configuration procedure 660B. As a result, the UE 102 communicates control signals and data in DC with the MN 104A and with the SN 106A by using a first DU configuration received from the MN 104A during the DC configuration procedure 660C.

After the UE 102 connects to the SN 106A, the MN 104A, SN 106A, and the UE 102 collectively perform a legacy UE assistance information procedure 672C, similar to the legacy UE assistance information procedure 572F. In the legacy UE assistance information procedure 672C, the MN 104A can translate the first preferred configuration included in a UE assistance information message to an IE (e.g., ConfigRestrictInfoSCG IE) that can be readable by the SN 106A. Thus, even if the SN 106A is a legacy base station that is unable to interpret the UE assistance information message, the SN 106A can interpret the IE and generate a second DU configuration based on the first preferred configuration. Accordingly, the UE 102 can update the multiple configuration parameters previously provided by the SN 106A during the DC configuration procedure 660C in the first DU configuration with the second DU configuration, and communicate with the SN 106A by using the updated configuration parameters Later in time (e.g., after the SN 106A detects that traffic of the UE 102 is inactive on the SN-terminated radio bearer(s)), the SN 106A sends 682C an Activity Notification message to the MN 104A, similar to event 682B. The MN 104A then transmits 684C to the SN 106A an SN Modification Request message for the UE 102, and the SN 106A in turn transmits 686C an SN Modification Request Acknowledge message to the MN 104A, similar to events 684B and 686B, respectively.

In response to receiving the SN Modification Request Acknowledge message, the MN 104A performs an RRC suspension procedure 678C, similar to the RRC suspension procedure 678B. As a result, the UE 102 suspends the radio connection associated with the SN 106A, and can transition to an inactive state or an idle state.

In some implementations, after the MN 104A performs the RRC suspension procedure 678C with the UE 102, the UE 102 can release 652C the first preferred configuration (e.g., in response to receiving an RRC suspension message during the RRC suspension procedure 678C). Similarly, in some implementations, the MN 104A can release 651C the first preferred configuration.

Later in time (e.g., after the SN 106A detects that traffic of the UE 102 is active on the SN-terminated radio bearer(s)), the SN 106A can send 688C an Activity Notification message to the MN 104A, similar to event 688B. In turn, MN 104A sends 689C a Paging message to the UE 102, similar to event 689B. In response to the Paging message, the UE 102 can transmit 631C an RRC resume request message to the MN 104A, similar to event 631B. In other implementations, the UE 102 can transmit 631C an RRC resume request message to the MN 104A upon determining to initiate a data transmission with the SN 106A instead of in response to the Paging message.

In response to receiving either the Activity Notification message from the SN 106A or the RRC resume request message from the UE 102, the MN 104A determines that the UE 102 should transition back to the connected state. In response to this determination, or in response to receiving the Activity Notification message, the MN 104A transmits 690C to the SN 106A an SN Modification Request message for the UE 102. The SN Modification Request message can include the IE generated by the MN 104A during the legacy UE assistance information procedure 672C, or otherwise include a modified IE to adjust (e.g., increase or decrease) the number of SCells associated with the SN 106A as indicated in the first preferred configuration. In response to receiving the SN Modification Request message, the SN 106A resumes the lower layers of the SN-terminated radio bearer(s) and transmits 692C an RRC reconfiguration message to the MN 104A via an SN Modification Request Acknowledge message to enable the UE 102 to again communicate with the SN 106A, similar to event 692B. In turn, the MN 104A transmits 637C the RRC reconfiguration message to the UE 102 via an RRC resume message, similar to event 637B. As a result, the UE 102 resumes 638C the suspended radio connection and transitions to the connected state, similar to event 638B. The UE 102 can transmit 640C an RRC reconfiguration complete message to the MN 104A via an RRC resume complete message, similar to event 640B, which in turn can send 694C an RRC reconfiguration complete message to the SN 106A via an SN reconfiguration complete message, similar to event 694B.

The UE 102 then initiates 696C a random access procedure with the SN 106A, similar to event 696B. After gaining access to a channel, the SN 106A identifies the UE 102 during the random access procedure (e.g., the UE 102 succeeds the contention resolution), and as a result, the UE 102 communicates control signals and data with the SN 106A.

By releasing the first preferred configuration at the UE 102 and MN 104A at events 652C and 651C, respectively, the UE 102, MN 104A, and SN 106A need not be limited to communicating among each other according to the first preferred configuration upon resuming the suspended radio connection. For example, the UE 102 may have recovered from an overheating situation or increased battery power since the inactive state or an idle state, such that the UE 102 is able to utilize more SCell(s), MIMO layer(s), and/or aggregated bandwidth than those indicated in the first preferred configuration after transitioning back to the connected state.

Figure 7:
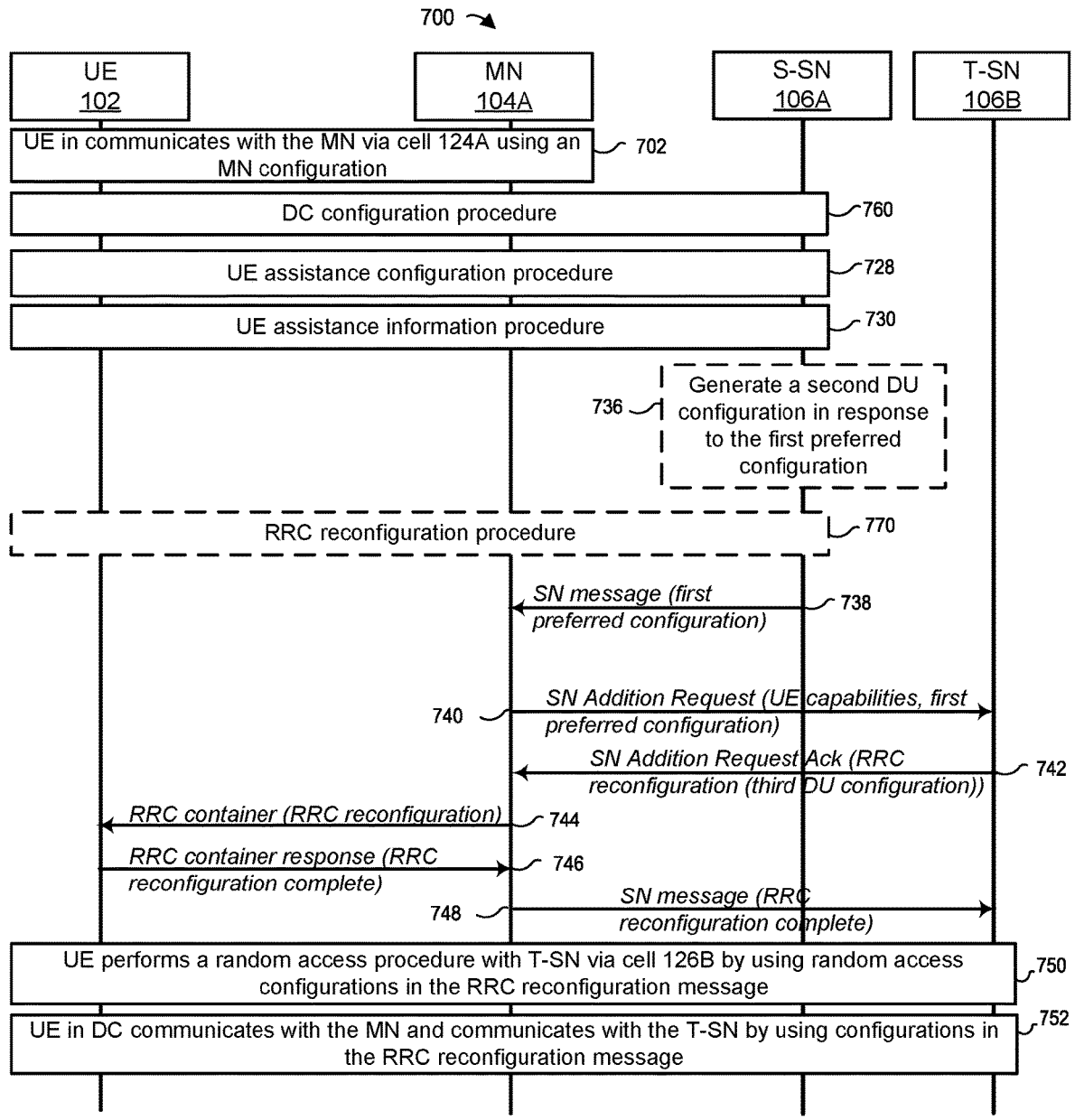
FIG. 7 is a messaging diagram of an example scenario in which an MN forwards a preferred configuration from a source SN to a target SN during an SN change procedure.

Referring now to FIG. 7, in a PSCell change scenario 700, the base station 104A again operates as an MN for the UE 102, and the base station 106A again operates as an SN for the UE 102. In the PSCell change scenario 700, the SN 106A (i.e., an S-SN) can forward the first preferred configuration to a T-SN (e.g., T-SN 106B) via the MN 104A, so that the SN 106B can be aware of the first preferred configuration when the UE 102 performs a PSCell change procedure from a PSCell of the S-SN 106A to a target PSCell of the T-SN 106B Initially, the UE 102 communicates 702 data in SC with the MN 104A via cell 124A by using an MN configuration, similar to event 502A. Later in time, the MN 104A performs a DC configuration procedure 760, similar to the DC configuration procedure 560A. As a result, the UE 102 communicates control signals and data in DC with the MN 104A and with the S-SN 106A by using a first DU configuration received from the MN 104A during the DC configuration procedure 760.

After the UE 102 connects to the S-SN 106A, the MN 104A or the S-SN 106A initiates 728 the UE assistance configuration procedure, to enable the UE 102 to transmit a preferred configuration. After the UE 102 is enabled to transmit a preferred configuration, the UE 102 performs a UE assistance information procedure 730, similar to events 530A or 531B, by transmitting a UE assistance information message including a first preferred configuration to the S-SN 106A, either directly or via the MN 104A for different reasons in various scenarios and implementations, as discussed above with respect to FIG. 5A. The S-SN 106A then generates 736 a second DU configuration in response to receiving the first preferred configuration, similar to event 536A.

In some implementations, after generating the second DU configuration, the S-SN 106A performs an RRC reconfiguration procedure 770 with the UE 102, similar to events 570A or 571B. Thus, the UE 102 can update the multiple configuration parameters previously provided by the S-SN 106A during the DC configuration procedure 760 in the first DU configuration with the second DU configuration, and communicate with the S-SN 106A by using the updated configuration parameters.

Later in time, the MN 104A determines to initiate a PSCell change involving an SN change (i.e., MN-initiated SN addition or change procedure) for the T-SN 106B and the UE 102 to communicate via a T-PSCell 126B, e.g., blindly or in response to detecting a suitable event. For example, the determination can occur in response to the MN 104A receiving one or more measurement results from the UE 102 that are above (or below) one or more predetermined thresholds, or calculating a filtered result (from the measurement result(s)) that is above (or below) a predetermined threshold. In another example, the suitable event can be that the UE 102 is moving toward the T-SN 106B. In yet another example, the suitable event can be one or more measurement results, generated or obtained by the MN 104A based on measurements of signals received from the UE 102, being above (or below) one or more predetermined thresholds.

In response to determining to initiate the PSCell change, the MN 104A sends 740 an SN Addition Request message to the T-SN 106B. In some implementations, the SN Addition Request message includes the UE capabilities and the first preferred configuration received in events 702 and 738. In some implementations, if the T-SN 106B is a legacy base station that is not capable of interpreting the first preferred configuration, the SN Addition Request message can include an IE (e.g., ConfigRestrictInfoSCG IE) that corresponds to a translation of the first preferred configuration. In some implementations, if the MN 104A did not receive the first preferred configuration in event 730 (e.g., similar to event 531B), the MN 104A can receive the first preferred configuration from the S-SN 106A in an SN message at event 738. In some implementations, the SN message can be an SN Change Required message, an SN Modification Required message, an SN Modification Request Acknowledge message. In other implementations, the SN 106A can include the first preferred configuration or the UE assistance information message including the first preferred configuration in a CG-Config IE in the SN message.

In response, the T-SN 106B generates a third DU configuration, and sends 742 the third DU configuration in an RRC reconfiguration message to the MN 104A via an SN Addition Request Acknowledge message. The T-SN 106B generates the third DU configuration in response to the first preferred configuration in a manner that would not exceed the capabilities of the UE 102, e.g., by considering the UE capabilities included in the SN Addition Request message.

In response to receiving 742 the SN Addition Request Acknowledge message from the T-SN 106B, the MN 104A includes the RRC reconfiguration message in an RRC container message, and transmits 744 the RRC container message to the UE 102. In some implementations, the RRC container message can include one or more random access configurations needed by the UE 102 to connect to the T-SN 106B, and in some implementations, includes additional fields, such as a mobility field (e.g., mobilityControlInfoSCG field or a reconfigurationWithSync field), which can include some or all of the random access configurations.

In response to receiving 744 the RRC container message, the UE 102 transmits 746 an RRC container response message including an RRC reconfiguration complete message to the MN 104A. In some implementations, the MN 104A can send 748 an SN message (e.g., SN Reconfiguration Complete message or SN Confirm message) including the RRC reconfiguration complete message to the T-SN 106B in response to the RRC container response message.

In response to receiving 744 the RRC container message, the UE 102 attempts to perform PSCell change to the T-SN 106B via T-PSCell 126B in accordance with the configuration(s) included in the RRC reconfiguration message. In attempting to perform the PSCell change, the UE 102 initiates 750 a random access procedure with the T-SN 106B via T-PSCell 126B, e.g., by using one or more random access configurations in the RRC reconfiguration message. After the T-SN 106B identifies the UE 102 during the random access procedure (e.g., the UE 102 succeeds the contention resolution), the UE 102 communicates 752 in DC with MN 104A and the T-SN 106B via T-PSCell 126B by using configuration(s) in the RRC reconfiguration message included in the RRC container message. Later, the UE 102 can provide a second preferred configuration to the T-SN 106B to override the first preferred configuration, e.g., in a similar manner as described for event 530A. The UE 102 can transmit the second preferred configuration for different reasons in various scenarios and implementations as described above.

In some scenarios and implementations, the S-SN 106A receives the first UE preferred configuration and does not provide the first UE preferred configuration to the MN 104A, so that the MN 104A cannot provide the first UE preferred configuration to the T-SN 106B. After the UE 102 successfully performs 752 the random access procedure, the UE 102 can provide a second preferred configuration to the T-SN 106B, e.g., in a similar manner as described for event 530A or 531B. The UE 102 can transmit the second preferred configuration for the same or a different reason as when the UE 102 transmits the first preferred configuration. The second preferred configuration can be the same as or different from the first preferred configuration.

In some scenarios and implementations, the UE 102 can receive the RRC reconfiguration message in event 744 while or immediately after transmitting a UE assistance information message to the S-SN 106A via SRB3 (similar to event 531B). Before successfully transmitting the UE assistance information message to the S-SN 106A, the UE 102 may disconnect from the S-SN 106A and perform 750 the random access procedure on the cell 126B. In other scenarios and implementations, the UE 102 transmits a UE assistance information message to the MN 104A (similar to event 532A) or the S-SN 106A (similar to event 531B) after the MN 104A sends 740 the SN Addition Request message. In such scenarios and implementations, the UE 102 cannot ensure that the T-SN 106B receives the UE assistance information message from the S-SN 106A. After the UE 102 successfully performs 752 the random access procedure, the UE 102 can provide a second preferred configuration to the T-SN 106B, e.g., in a similar manner as described for event 530A or 531B. The second preferred configuration can be the same as or different from the first preferred configuration. If the MN 104A receives a UE assistance information message or the first UE preferred configuration after sending 740 the SN Addition Request message, the MN 104A can send another SN message (i.e., a second SN message) including the UE assistance information message or the first UE preferred configuration to the T-MN 106B. More particularly, the UE 102 transmits the UE assistance information message or the first UE preferred configuration to the MN 104A before transmitting 746 the RRC container message.

In some implementations, the UE 102 transmits the second preferred configuration to the T-SN 106B (similar to event 530A or 531B) if the RRC reconfiguration message enables the UE 102 to transmit a preferred configuration or enables the UE 102 to transmit a UE assistance information message. Otherwise the UE 102 disables transmission of a preferred configuration or a UE assistance information message. If the UE 102 transmits the UE assistance information message to the S-SN 106A via the SRB3 (similar to event 531B) while or immediately before receiving the RRC reconfiguration message, the UE 102 may retransmit the UE assistance information message (i.e., the first preferred configuration) to the T-SN 106B. If the UE 102 transmits the UE assistance information message to the S-SN 106A via the MN 104 while or immediately before receiving the RRC reconfiguration message, the UE 102 may not retransmit the UE assistance information message to the T-SN 106B. "Immediately" as used in this paragraph can be a short duration such as X second(s) (e.g., X=1 or 0<X<10 such as X=1, 1.1, 1.2 . . . , 2, . . . or 9).

In one implementation, if the UE 102 receives a RRC reconfiguration message including a secondary cell group configuration (e.g., secondaryCellGroup) from the S-SN 106A on SRB3 or via the MN 104A, and the UE 102 transmitted a UE assistance information message during the last X second (e.g., X=1, 0<X<10 such as X=1, 1.1, 1.2 . . . , 2, . . . or 9), and still configured to transmit a preferred configuration by the RRC reconfiguration message, the UE 102 can re-send the UE assistance information message to the T-SN 106B (similar to event 530A or 531B) after completing the random access procedure. Alternatively, instead of re-sending, the UE 102 can send to the T-SN 106B another UE assistance information message including similar content as the previously transmitted UE assistance information message. Otherwise, the UE 102 may not re-send the UE assistance information message to the MN 104A or the T-SN 106B or send to the MN 104A or T-SN 106B another UE assistance information message including similar content as the previously transmitted UE assistance information message, after completing the random access procedure.

In another implementation, when the UE 102 receives an RRC reconfiguration message including a secondary cell group configuration (e.g., secondaryCellGroup) from the S-SN 106A on SRB3 or via the MN 104A, and if the UE 102 transmitted a UE assistance information message and did not receive from the MN 104A or the S-SN 106A an acknowledge message (e.g., an RLC Control PDU, a PDCP Control PDU, or a HARQ acknowledge) for the UE assistance information message, the UE 102 can re-send the UE assistance information message to the T-SN 106B (similar to event 530A or 531B) after completing the random access procedure. Alternatively, instead of re-sending, the UE 102 can send to the T-SN 106B another UE assistance information message including similar content as the previously transmitted UE assistance information message (similar to event 530A or 531B). Otherwise, the UE 102 may not re-send the UE assistance information message to the MN 104A or the T-SN 106B or send to the MN 104A or T-SN 106B another UE assistance information message including similar content as the previously transmitted UE assistance information message, after completing the random access procedure.

Whereas in FIG. 7 the PSCell change scenario 700 occurs between two base stations (e.g., the base stations 104A, 106A) with respect to the UE 102, the description above can apply to a PSCell change scenario within a single base station (e.g., the base station 106A) with respect to the UE 102. Description for the UE 102 and T-SN 106B can apply to the UE 102 and the S-SN 106A. For example, the S-SN 106A can transmit an RRC reconfiguration message to the UE 102 via SRB3 to configure the UE 102 to perform PSCell change from PSCell 126A to a new PSCell (i.e., a second cell operated by the S-SN 106A that is not shown in FIG. 1). In response, the UE 102 can transmit an RRC reconfiguration complete message via the SRB3 to the S-SN 106A. In another example, the S-SN 106A can transmit an RRC reconfiguration message to the UE 102 via the MN 104A to configure the UE 102 to perform PSCell change from PSCell 126A to another cell (not shown in FIG. 1). In response, the UE 102 can transmit an RRC reconfiguration complete message to the S-SN 106A via the MN 104A.

In some scenarios and implementations, the UE 102 can receive the RRC reconfiguration message while or immediately after transmitting a UE assistance information message to the S-SN 106A via SRB3 (similar to event 531B). Before successfully transmitting the UE assistance information message to the S-SN 106A, the UE 102 may disconnect from the PSCell 126A and perform the random access procedure on the new PSCell. In such scenarios and implementations, the UE 102 cannot ensure that the S-SN 106A receives the UE assistance information message from the PSCell 126A. After the UE 102 successfully performs the random access procedure on the new PSCell, the UE 102 can provide a second preferred configuration to the S-SN 106A, e.g., in a similar manner as described for event 531B. The second preferred configuration can be the same as or different from the first preferred configuration.

In some implementations, the UE 102 transmits the second preferred configuration to the S-SN 106A via the new PSCell (similar to event 530A or 531B) if the RRC reconfiguration message enables the UE 102 to transmit a preferred configuration or enables the UE 102 to transmit a UE assistance information message. Otherwise the UE 102 disables transmission of a preferred configuration or a UE assistance information message. If the UE 102 transmits the UE assistance information message to the S-SN 106A via the SRB3 via the PSCell 126A (similar to event 531B) while or immediately before receiving the RRC reconfiguration message, the UE 102 may retransmit the UE assistance information message (i.e., the first preferred configuration) to the S-SN 106A via the new PSCell. If the UE 102 transmits the UE assistance information message to the S-SN 106A via the MN 104 while or immediately before receiving the RRC reconfiguration message, the UE 102 may not retransmit the UE assistance information message to the S-SN 106A. As discussed above, "immediately" as used in this paragraph can be a short duration such as X second(s) (e.g., X=1 or 0<X<10 such as X=1, 1.1, 1.2 . . . , 2, . . . or 9).

In one implementation, if the UE 102 receives a RRC reconfiguration message including a secondary cell group configuration (e.g., secondaryCellGroup) from the S-SN 106A on SRB3 or via the MN 104A, and the UE 102 transmitted a UE assistance information message during the last X second (e.g., X=1 or 0<X<10 such as X=1, 1.1, 1.2 . . . , 2, . . . or 9), and still configured to transmit a preferred configuration by the RRC reconfiguration message, the UE 102 can re-send the UE assistance information message to the S-SN 106A via the SRB3 on the new PSCell (similar to 531B) after completing the random access procedure on the new PSCell. Alternatively, instead of re-sending, the UE 102 can send to the S-SN 106A on the new PSCell another UE assistance information message including similar content as the previously transmitted UE assistance information message. Otherwise, the UE 102 may not re-send the UE assistance information message to the MN 104A or the S-SN 106A or send to the MN 104A or S-SN 106A another UE assistance information message including similar content as the previously transmitted UE assistance information message, after completing the random access procedure on the new PSCell.

In another implementation, when the UE 102 receives an RRC reconfiguration message including a secondary cell group configuration (e.g., secondaryCellGroup) from the S-SN 106A on SRB3 or via the MN 104A, if the UE 102 transmitted a UE assistance information message on the SRB3 and did not receive from the S-SN 106A an acknowledge message (e.g., an RLC Control PDU, a PDCP Control PDU, or a HARQ acknowledge) for the UE assistance information message, the UE 102 can re-send the UE assistance information message to the S-SN 106A via the SRB3 on the new PSCell (similar to event 531B) after completing the random access procedure on the new PSCell. Alternatively, instead of re-sending, the UE 102 can send to the S-SN 106A another UE assistance information message including similar content as the previously transmitted UE assistance information message. Otherwise, the UE 102 may not re-send the UE assistance information message to the MN 104A or the S-SN 106A on the new PSCell or send to the MN 104A or S-SN 106A on the new PSCell another UE assistance information message including similar content as the previously transmitted UE assistance information message, after completing the random access procedure on the new PSCell.

The UE 102 can re-send the UE assistance information message to the S-SN 106A via the new PSCell (similar to event 530A or 531B) after completing the random access procedure with the S-SN 106A on the new PSCell. Alternatively, instead of re-sending, the UE 102 can send to the S-SN 106B another UE assistance information message including similar contents as the previously transmitted UE assistance information message.

Figure 8A:
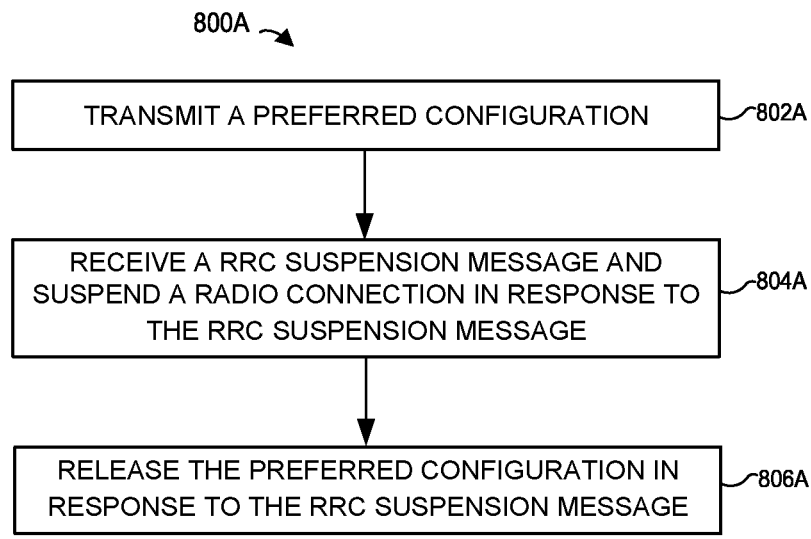
FIG. 8A is a flow diagram of an example method that includes releasing a preferred configuration upon suspension of a radio connection, which can be implemented in the UE of FIGS. 1A and 1B.

FIG. 8A is a flow diagram depicting an example method 800A, implemented in a UE (e.g., UE 102), for releasing a preferred configuration.

At block 802A, the UE transmits a preferred configuration (e.g., in any one of events 372A, 372C, 472B). The UE can transmit the preferred configuration to a base station (e.g., base station 104A, S-BS 104B, or SN 106A either directly or via the MN 104A), in various implementations.

At block 804A, the UE receives an RRC suspension message and suspends a radio connection in response to the RRC suspension message (e.g., in any one of events 378A, 378C, 478B).

At block 806A, in some implementations, the UE releases the preferred configuration in response to the RRC suspension message (e.g., in any one of events 352A, 456B). In other implementations, the UE releases the preferred configuration prior to receiving the RRC suspension message at block 804A (e.g., in event 356C). For example, during a UE assistance release procedure, the base station can transmit an RRC message to the UE to instruct the UE to release the first preferred configuration.

Figure 8B:
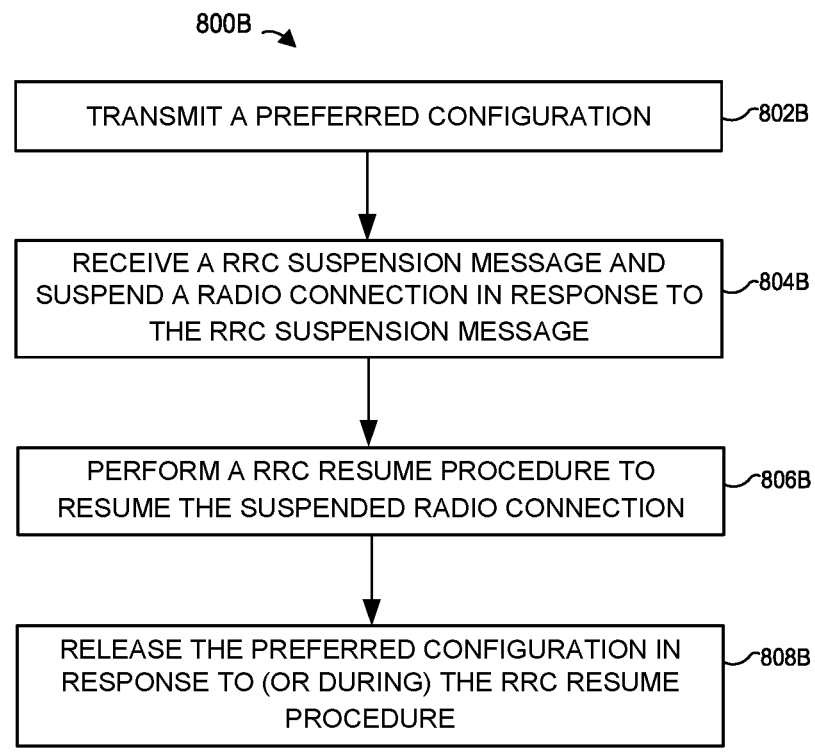
FIG. 8B is a flow diagram of an example method that includes releasing a preferred configuration upon resuming a previously suspended radio connection, which can be implemented in the UE of FIGS. 1A and 1B.

FIG. 8B is a flow diagram depicting an example method 800B as an alternative to the example method 800A, implemented in a UE (e.g., UE 102), for releasing a preferred configuration.

At block 802B, similar to block 802A, the UE transmits a preferred configuration (e.g., in any one of events 372A, 372C, 472B).

At block 804B, similar to block 804A, the UE receives an RRC suspension message and suspends a radio connection in response to the RRC suspension message (e.g., in any one of events 378A, 378C, 478B).

At block 806B, the UE performs an RRC resume procedure to resume the suspended radio connection (e.g., in any one of events 380A, 380C, 480B). The UE may perform the RRC resume procedure in response to determining to initiate a data transmission with the base station, or in response to a Paging message received from the base station, for example.

Whereas in block 806A the UE releases the preferred configuration in response to the RRC suspension message, at block 808B the UE releases the preferred configuration in response to (or during) the RRC resume procedure.

Figure 9:
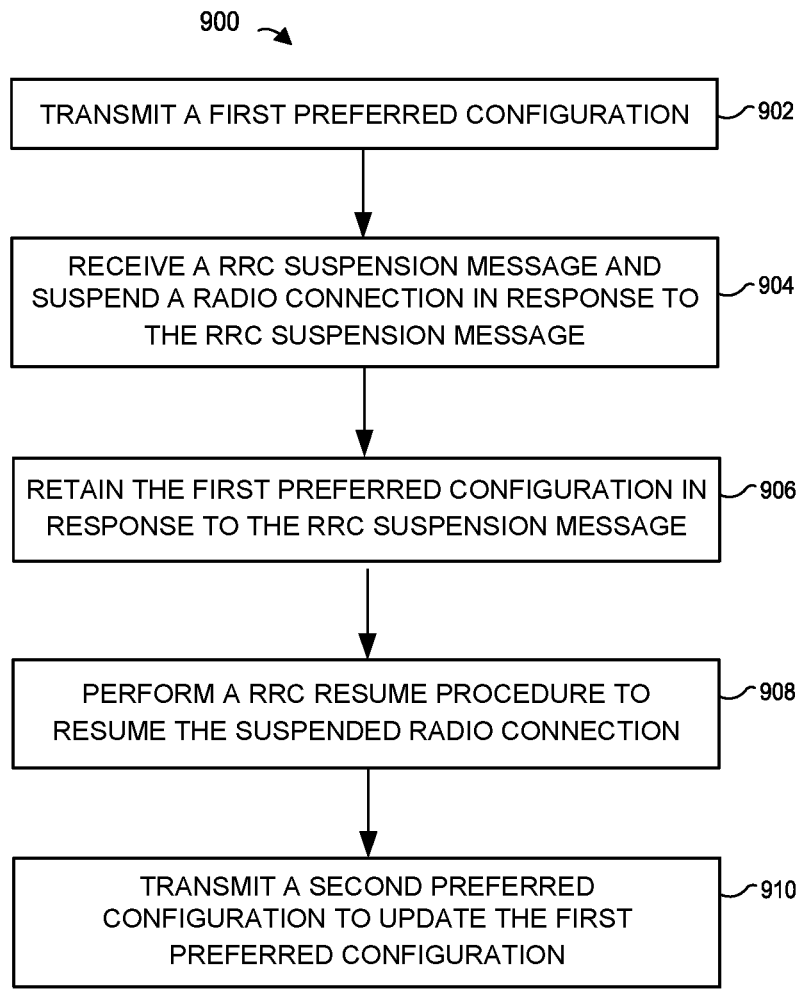
FIG. 9 is a flow diagram of an example method that includes releasing a preferred configuration upon generating a new preferred configuration, which can be implemented in the UE of FIGS. 1A and 1B.

FIG. 9 is a flow diagram depicting an example method 900, implemented in a UE (e.g., UE 102), for retaining a preferred configuration. As such, in contrast to releasing the preferred configuration described above with respect to FIGS. 8A and 8B, the UE and the base station can alternatively retain the preferred configuration, yet override the preferred configuration with another preferred configuration if necessary.

At block 902, similar to block 802A, the UE transmits a preferred configuration (e.g., in any one of events 372B, 472A). The UE can transmit the preferred configuration to a base station (e.g., base station 104A, S-BS 104B, or SN 106A either directly or via the MN 104A), in various implementations.

At block 904, similar to block 804A, the UE receives an RRC suspension message and suspends a radio connection in response to the RRC suspension message (e.g., in any one of events 378B, 478A).

Whereas in block 806A the UE releases the preferred configuration in response to the RRC suspension message, at block 906 the UE retains the preferred configuration in response to the RRC suspension message (e.g., in any one of events 354B, 454A).

At block 908, similar to block 806B, the UE performs an RRC resume procedure to resume the suspended radio connection (e.g., in any one of events 380B, 480A).

At block 910, the UE transmits another (i.e., second) preferred configuration to update the previously transmitted preferred configuration to the base station (e.g., in any one of events 344B, 444A). By sending the second preferred configuration to the base station, the UE can override the previously transmitted preferred configuration retained at the base station, so that upon resuming connectivity with the base station, the UE and the base station can then communicate using the second preferred configuration, for example.

Figure 10A:
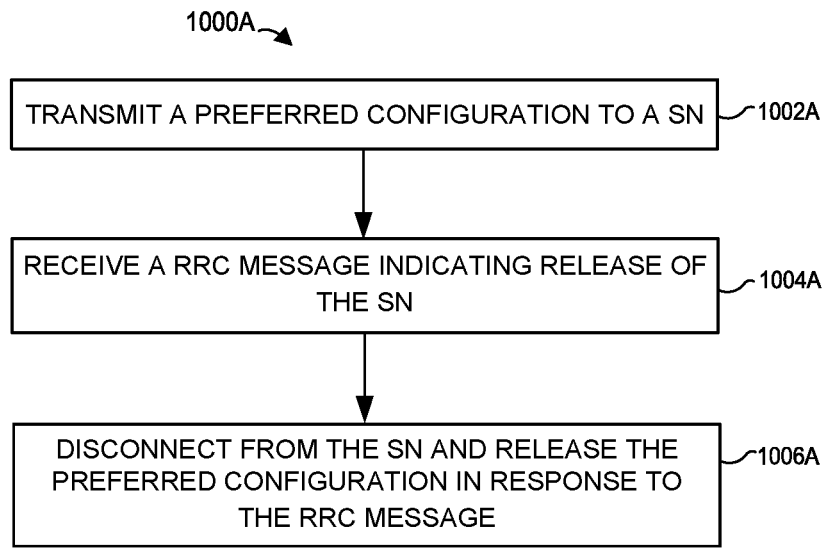
FIG. 10A is a flow diagram of an example method that includes releasing a preferred configuration upon disconnecting from an SN, which can be implemented in the UE of FIGS. 1A and 1B.

FIG. 10A is a flow diagram depicting an example method 1000A, implemented in a UE (e.g., UE 102), for disconnecting from an SN (e.g., SN 106A) and releasing a preferred configuration.

At block 1002A, the UE transmits a preferred configuration to the SN (e.g., in any one of events 530A, 531B, 530C).

The UE can transmit the preferred configuration to the SN either directly or via an MN (e.g., MN 104A), in various implementations.

At block 1004A, the UE receives, from the MN, an RRC message (e.g., an RRC reconfiguration message) indicating release of the SN (e.g., in any one of events 548A, 548B, 548C).

At block 1006A, the UE disconnects from the SN and releases the preferred configuration in response to the RRC message (e.g., in any one of events 550A, 550B, 550C).

Figure 10B:
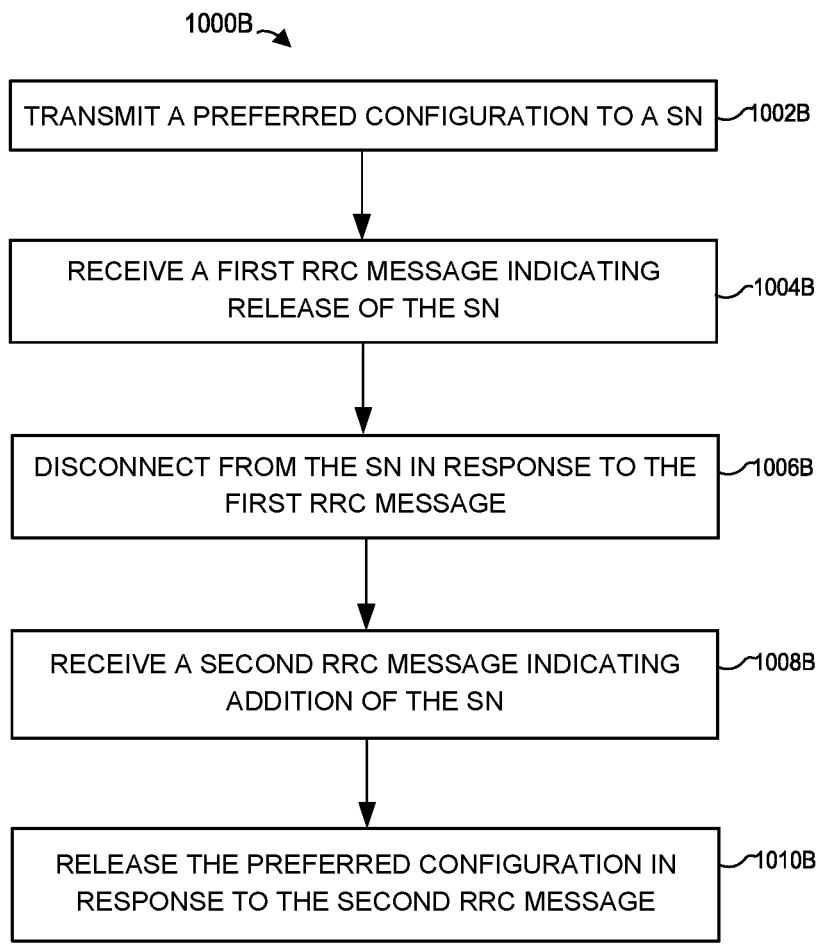
FIG. 10B is a flow diagram of an example method that includes releasing a preferred configuration in response to a configuration of an SN, which can be implemented in the UE of FIGS. 1A and 1B.

FIG. 10B is a flow diagram depicting an example method 1000B as an alternative to the example method 1000A, implemented in a UE (e.g., UE 102), for disconnecting from an SN (e.g., SN 106A) and releasing a preferred configuration.

At block 1002B, similar to block 1002A, the UE transmits a preferred configuration to the SN (e.g., in any one of events 530A, 531B, 530C).

At block 1004B, similar to block 1004A, the UE receives an RRC message (e.g., an RRC reconfiguration message) indicating release of the SN (e.g., in any one of events 548A, 548B, 548C).

Whereas in block 1006A the UE disconnects from the SN and releases the preferred configuration in response to the RRC message, at block 1006B, the UE disconnects from the SN but does not yet release the preferred configuration. Instead, the UE at block 1008B receives another (i.e., second) RRC message (e.g., an RRC resume message) indicating addition of the SN (e.g., the same SN 106A or a different SN than the SN 106A) and subsequently at block 1010B releases the preferred configuration in response to the second RRC message.

Figure 11:
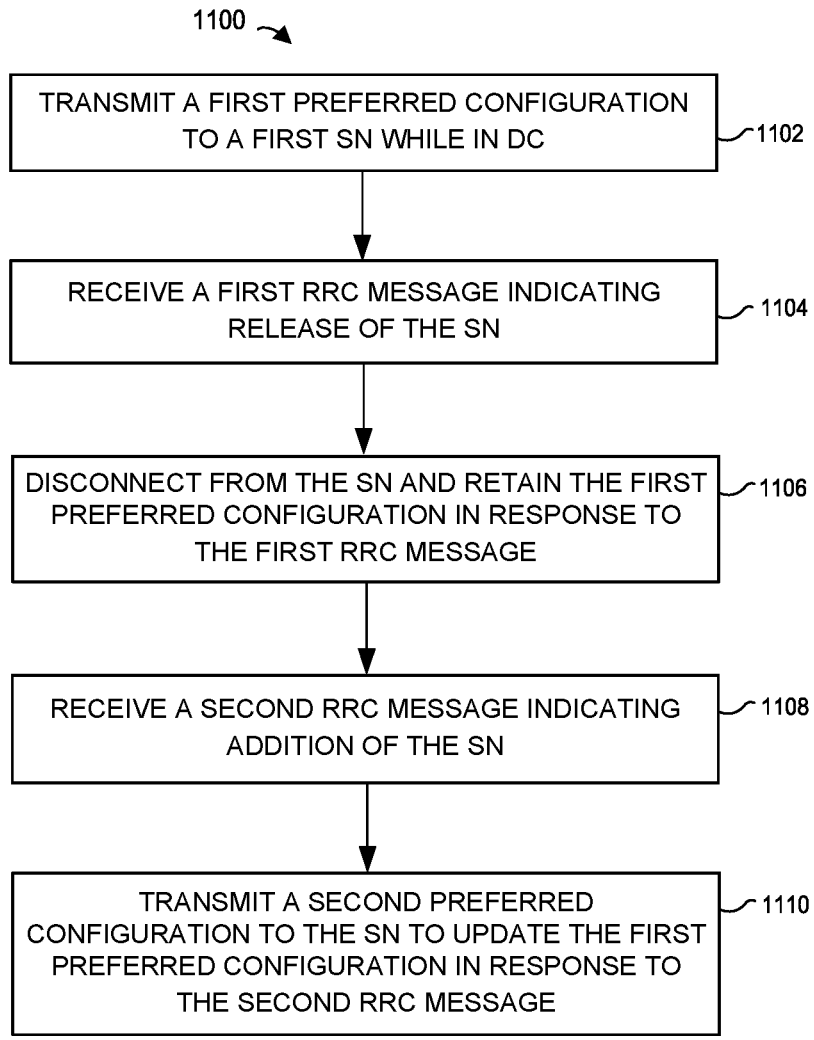
FIG. 11 is a flow diagram of an example method that includes releasing a preferred configuration upon generating a new preferred configuration, which can be implemented in the UE of FIGS. 1A and 1B.

FIG. 11 is a flow diagram depicting an example method 1100, implemented in a UE (e.g., UE 102), for disconnecting from an SN (e.g., SN 106A) and retaining a preferred configuration. As such, in contrast to releasing the preferred configuration described above with respect to FIGS. 10A and 10B, the UE and the base station can alternatively retain the preferred configuration, yet override the preferred configuration with another preferred configuration if necessary.

At block 1102, similar to block 1002A, the UE transmits a preferred configuration to the SN (e.g., in event 630A).

At block 1104, similar to block 1004A, the UE receives, from the MN, a first RRC message (e.g., an RRC reconfiguration message) indicating release of the SN (e.g., in event 678A).

Whereas in block 1006A the UE disconnects from the SN and releases the preferred configuration in response to the first RRC message, at block 1106 the UE disconnects from the SN and retains the preferred configuration in response to the first RRC message (e.g., in event 654A).

At block 1108, the UE receives a second RRC message (e.g., an RRC resume message) indicating addition of the SN (e.g., the same SN 106A or a different SN than the SN 106A) (e.g., in event 637A).

At block 1110, the UE transmits another (i.e., second) preferred configuration to the SN to update the previously transmitted preferred configuration in response to the second RRC message (e.g., in event 656A). By sending the second preferred configuration to the SN, the UE can override the previously transmitted preferred configuration retained at the SN, so that upon resuming connectivity with the SN, the UE and the SN can then communicate using the second preferred configuration, for example.

Figure 12A:
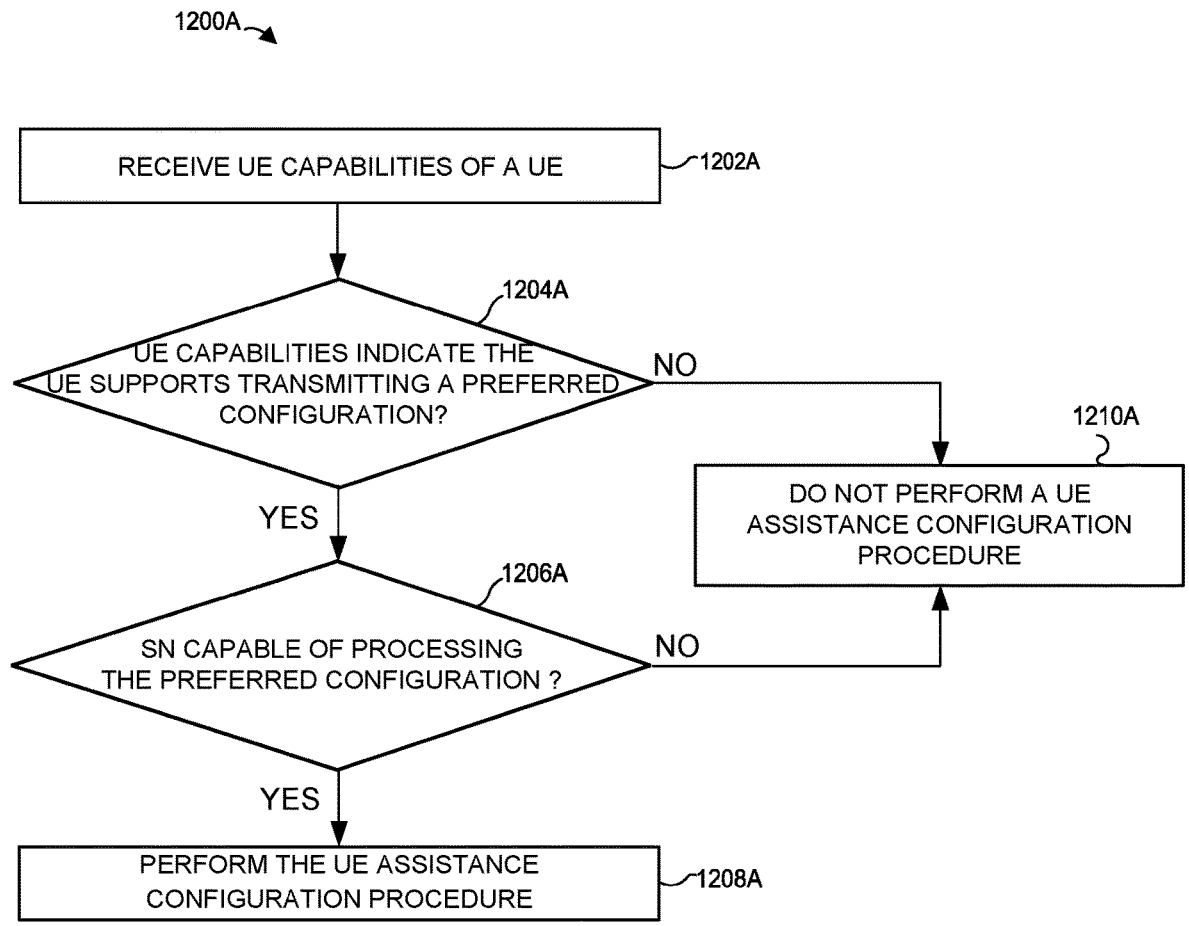
FIG. 12A is a flow diagram of an example method for determining whether the UE should transmit a preferred configuration to an SN, which can be implemented in an MN of FIGS. 1A and 1B.

FIG. 12A is a flow diagram depicting an example method 1200A, implemented in an MN (e.g., MN 104A), for determining whether to perform a UE assistance configuration procedure to enable the UE (e.g., UE 102) to transmit a preferred configuration to an SN (e.g., SN 106A).

At block 1202A, the MN receives UE capabilities of the UE. In various implementations, the MN can receive UE capabilities from the UE, the CN (e.g., CN 110), or another base station (e.g., base station 104B).

At block 1204A, the MN determines whether the UE capabilities indicate that the UE supports transmitting a preferred configuration. If at block 1204A the MN determines that the UE capabilities indicate that the UE is not capable of transmitting a preferred configuration, the MN at block 1210A does not perform a UE assistance configuration procedure.

If at block 1204A the MN determines that the UE capabilities indicate that the UE is capable of transmitting a preferred configuration, the MN at block 1206A determines whether the SN is capable of processing the preferred configuration. For example, the MN may be preconfigured to be aware of the capabilities of the SN. In yet another example, the MN may be can be informed by a network node (e.g., an operation and maintenance (Q&M) node) as to the capabilities of the SN.

If at block 1206A the MN determines that the SN is not capable of processing the preferred configuration, the MN at block 1210A does not perform a UE assistance configuration procedure. If at block 1206A the MN determines that the SN is capable of processing the preferred configuration, the MN at block 1208A performs the UE assistance configuration procedure (e.g., in any one of events 528A, 528B, 528C, 528D, 528E, 528F, 528G, 628A, 628B, 672C, 728). In the UE assistance configuration procedure, the MN can transmit an RRC message to the UE, enabling the UE to transmit the preferred configuration to the SN.

Figure 12B:
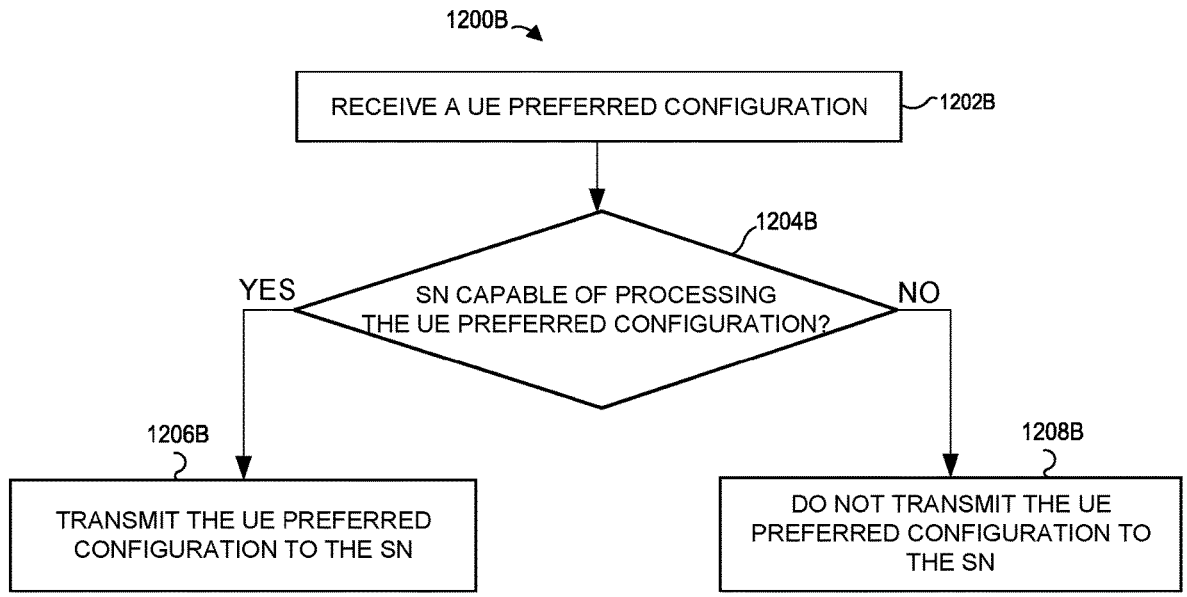
FIG. 12B is a flow diagram of an example method for determining whether an MN should transmit a preferred configuration to an SN, which can be implemented in an MN of FIGS. 1A and 1B.

FIG. 12B is a flow diagram depicting an example method 1200B, implemented in an MN (e.g., MN 104A), for determining whether to transmit a preferred configuration to an SN (e.g., SN 106A).

At block 1202B, the MN receives a UE preferred configuration (e.g., in any one of events 530A, 530C, 530D, 530E, 630A, 630B, 672C, 730). The MN may receive the UE preferred configuration from the UE via a UE assistance information message, for example.

At block 1204B, similar to block 1206A, the MN determines whether the SN is capable of processing the UE preferred configuration.

If at block 1204B the MN determines that the SN is not capable of processing the preferred configuration, the MN at block 1208B does not transmit the preferred configuration to the SN. If at block 1204B the MN determines that the SN is capable of processing the preferred configuration, the MN at block 1206B transmits the preferred configuration to the SN (e.g., in any one of events 530A, 530C, 530D, 530E, 630A, 630B, 730).

Figure 12C:
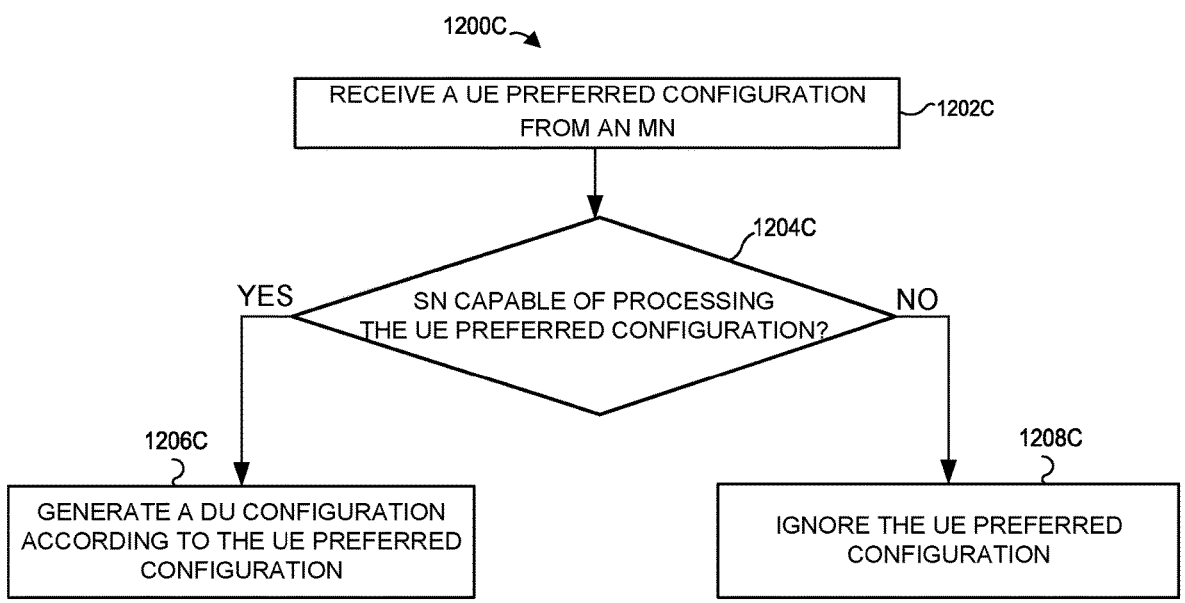
FIG. 12C is a flow diagram depicting an example method for determining whether to generate a DU configuration using a UE preferred configuration received from an MN, which can be implemented in an SN of FIGS. 1A and 1B.

FIG. 12C is a flow diagram depicting an example method 1200C, implemented in an SN (e.g., SN 106A), for determining whether to act upon a UE preferred configuration received from an MN (e.g., MN 104A).

At block 1202C, the SN receives a UE preferred configuration from the MN (e.g., in any one of events 530A, 530D, 630A, 630B, 730).

At block 1204C, the SN determines whether it is capable of processing the UE preferred configuration. For example, if the SN is unable to comprehend the UE preferred configuration, or comprehends the UE preferred configuration but cannot generate a DU configuration in response to receiving the UE preferred configuration, the SN determines that it is unable to process the UE preferred configuration.

If at block 1204C the SN determines that it is not capable of processing the UE preferred configuration, the SN at block 1208C ignores the UE preferred configuration. In some implementations, the SN does not transmit an error message back to the MN indicating that the SN is unable to process the UE preferred configuration. For example, the SN may transmit an SN Addition Request Acknowledge message to the MN rather than sending an SN Addition Reject message.

If at block 1204C the SN determines that it is capable of processing the UE preferred configuration, the SN at block 1206C generates a DU configuration according to the UE preferred configuration (e.g., in any one of events 536A, 536D, 636A, 636B, 736).

Figure 13:
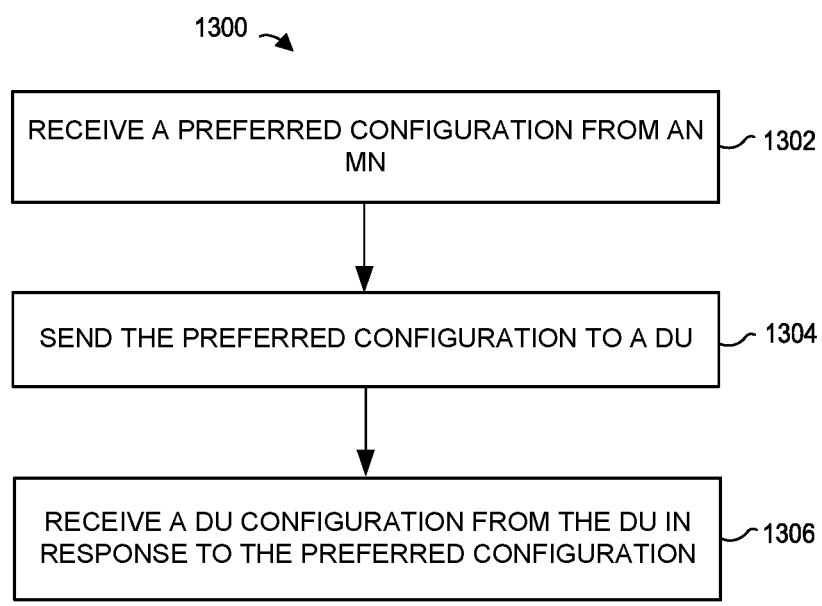
FIG. 13 is a flow diagram of an example method for processing a UE preferred configuration, which can be implemented in a CU of a disaggregated base station of FIG. 1A or 1B.

FIG. 13 is a flow diagram depicting an example method 1300, implemented in a distributed SN (e.g., SN 106A), for handling a UE preferred configuration received from an MN (e.g., MN 104A) within the distributed SN.

At block 1302, a CU of the distributed SN receives a UE preferred configuration from the MN (e.g., in any one of events 530A, 530D, 630A, 630B, 730).

At block 1304, the CU sends the UE preferred configuration to a DU (e.g., in any one of events 536A, 536D, 636A, 636B, 736).

At block 1306, the CU receives a DU configuration from the DU in response to the UE preferred configuration (e.g., in any one of events 536A, 536D, 636A, 636B, 736).

Figure 14A:
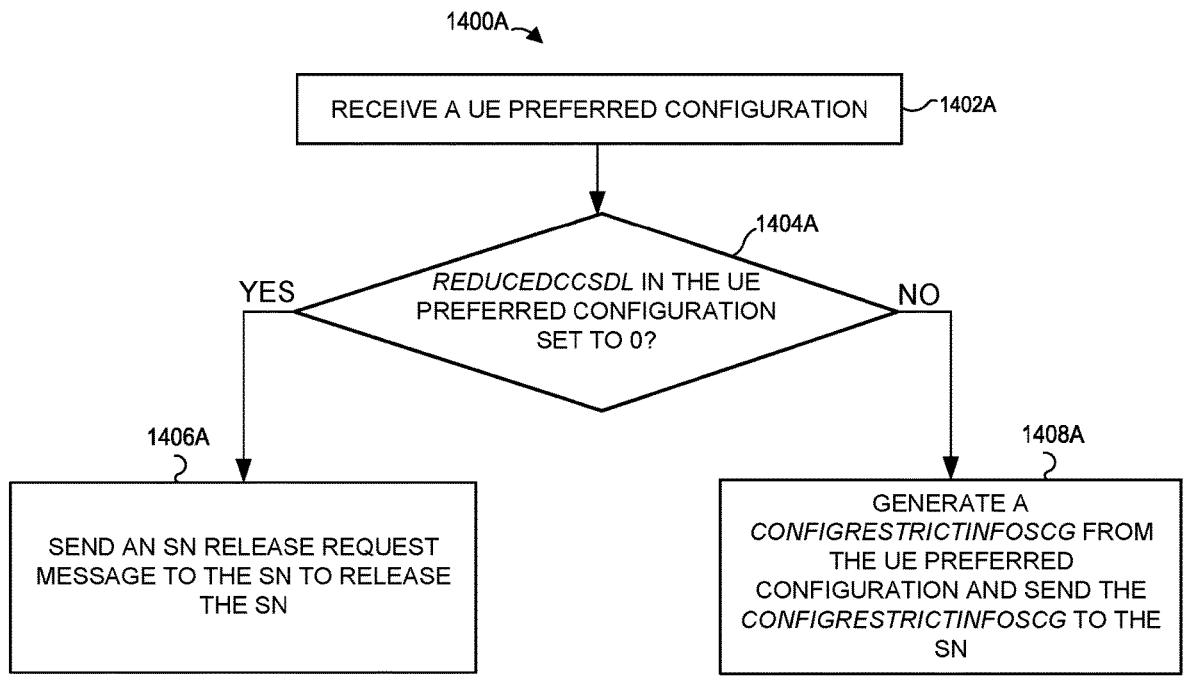
FIG. 14A is a flow diagram of an example method for analyzing a UE preferred configuration, which can be implemented in an MN of FIGS. 1A and 1B.

FIG. 14A is a flow diagram depicting an example method 1400A, implemented in an MN (e.g., MN 104A), for analyzing a UE preferred configuration.

At block 1402A, the MN receives a UE preferred configuration (e.g., in event 532F). The MN may receive the UE preferred configuration from the UE (e.g., UE 102) via a UE assistance information message, for example.

At block 1404A, the MN determines whether a reducedCCsDL IE in the UE preferred configuration is set to 0. The reducedCCsDL IE indicates the number of maximum SCells the UE prefers to be temporarily configured in downlink communications with an SN (e.g., SN 106A). Thus, if the reducedCCsDL IE is set to 0 in the UE preferred configuration, the UE is indicating that it does not prefer to connect to the SN.

If at block 1404A the MN determines that the reducedCCsDL IE is set to 0, the MN at block 1406A sends an SN Release Request message to the SN to release the SN. If at block 1404A the MN determines that the reducedCCsDL IE is not set to 0, the MN at block 1408A generates a ConfigRestrictInfoSCG IE from the UE preferred configuration and sends the ConfigRestrictInfoSCG IE (e.g., in an SN Modification Request message) to the SN (e.g., in events 533F, 535F). Thus, even if the SN is a legacy base station that is unable to interpret a UE assistance information message that includes the UE preferred configuration, the SN can interpret the SN Modification Request message to read the UE preferred configuration.

Figure 14B:
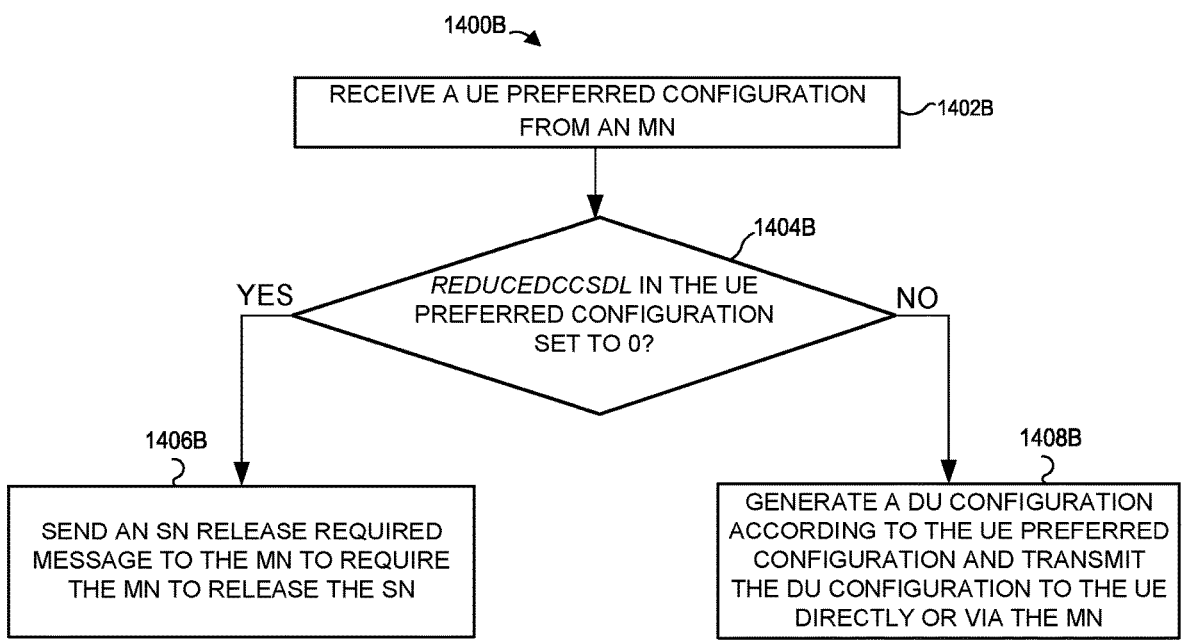
FIG. 14B is a flow diagram of an example method for analyzing a UE preferred configuration, which can be implemented in an SN of FIGS. 1A and 1B.

FIG. 14B is a flow diagram depicting an example method 1400B, implemented in an SN (e.g., SN 106A), for analyzing a UE preferred configuration.

At block 1402B, the SN receives a UE preferred configuration from an MN (e.g., MN 104A) (e.g., in any one of events 530A, 530C, 530D, 530E, 535F, 630A, 630B, 730).

At block 1404B, the SN determines whether a reducedCCsDL IE in the UE preferred configuration is set to 0.

If at block 1404B the SN determines that the reducedCCsDL IE is set to 0, the SN at block 1406B sends an SN Release Required message to the MN to require the MN to release the SN (e.g., in event 546C, 546E). If at block 1404B the SN determines that the reducedCCsDL IE is not set to 0, the SN at block 1408B generates a DU configuration according to the preferred configuration (e.g., in any one of events 536A, 536D, 536F, 636A, 636B, 736) and transmits the DU configuration to the UE directly or via the MN (e.g., in any one of events 570A, 570D, 538F, 670A, 670B, 770).

Figure 15:
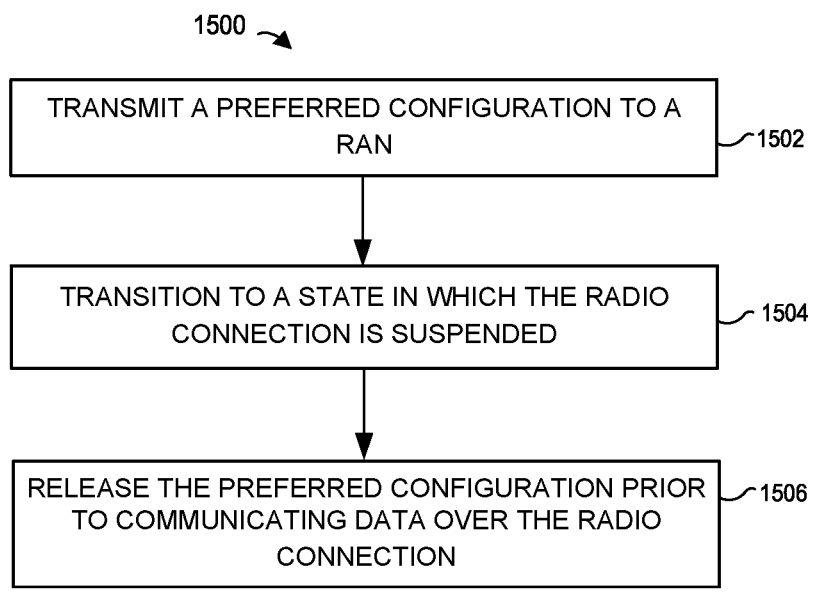
FIG. 15 is a flow diagram of an example method for managing a preferred configuration, which can be implemented in a suitable UE.

Next, FIG. 15 illustrates an example method 1500 for managing a preferred configuration, which can be implemented in a suitable UE such as the UE 102. At block 1502, the UE transmits a preferred configuration to a base station in the RAN, as discussed with reference to blocks 802A, 802B, or 902, for example. At block 1504, the UE transitions to a state in which a radio connection between the UE and the RAN is suspended, e.g., RRC_INACTIVE (e.g., blocks 806A, 806B, or 906). At block 1506, the UE releases the preferred configuration, prior to communicating data over the radio connection (e.g., blocks 806A, 810B, 910).

Figure 16:
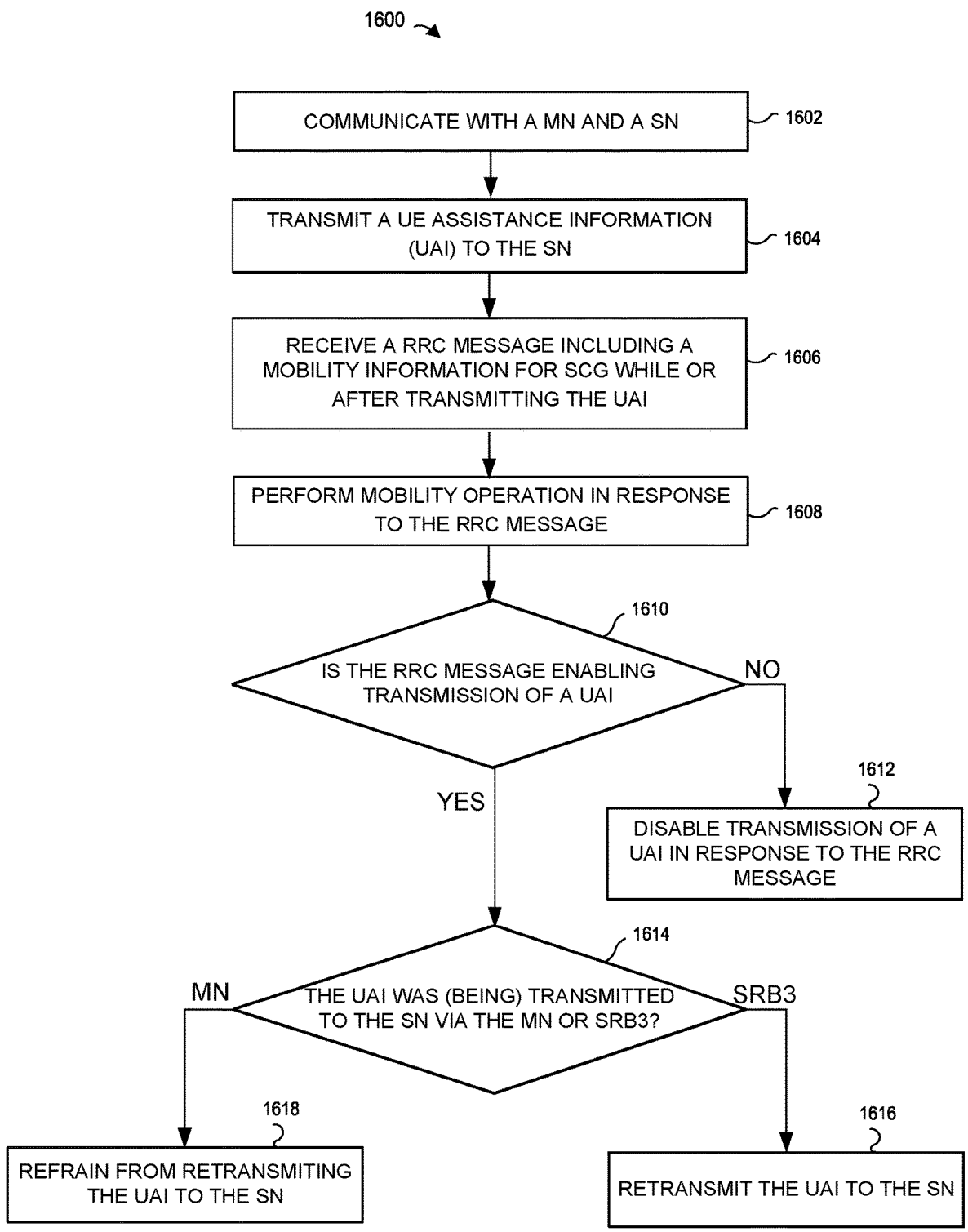
FIG. 16 is a flow diagram of an example method for managing a preferred configuration, which can be implemented in a suitable UE.

Next, FIG. 16 illustrates an example method 1600 for managing a preferred configuration, which can be implemented in a suitable UE such as the UE 102.

At block 1602, the UE in DC communicates with a MN and a SN (e.g., in events 560A).

Then the UE at block 1604 in DC transmits a UE assistance information message to the SN in the RAN (e.g., in any of events 530A, 531B).

At block 1606, the UE receives an RRC message including mobility information for SCG while or after transmitting the UE assistance information message (e.g., in event 744).

At block 1608, the UE performs a mobility operation in response to the RRC message (i.e., according to the mobility information) (e.g., in event 750).

The UE at block 1610 determines whether the RRC message enables transmission of a UE assistance information message. If the UE at block 1610 determines the RRC message disables transmission of a UE assistance information message, the UE at block 1612 disables transmission of a UE assistance information message in response to the RRC message. If the UE at block 1610 determines the RRC message enables transmission of a UE assistance information message, the UE at block 1614 determines the UE assistance information message was (being) transmitted to the SN via the MN (i.e., via SRB1) or SRB3. If the UE assistance information message was (being) transmitted to the SN via the SRB3, the UE at block 1616 retransmits the UE assistance information message to the SN. If the UE assistance information message was (being) transmitted to the SN via the MN (i.e., via SRB1), the UE at block 1618 refrains from retransmitting the UE assistance information message to the SN.

In some implementation, the mobility information for SCG can be a secondary cell group configuration (e.g., secondaryCellGroup) in the RRC message or a ReconfiguraitonWithSync IE included in the secondary cell group configuration in the RRC message. The mobility operation can be a PSCell change or an SN change.

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Example 1. A method in a user equipment (UE) for managing a preferred configuration indicative of a maximum allocation preferred by the UE for at least one resource, the method comprising: transmitting, by processing hardware, the preferred configuration to a radio access network (RAN); transitioning, by the processing hardware, to a state in which a radio connection between the UE and the RAN is suspended; and releasing, by the processing hardware, the preferred configuration, prior to communicating data over the radio connection.

Example 2. The method of example 1, wherein the releasing is in response to receiving an indication from the RAN that the radio connection is suspended.

Example 3. The method of example 1, further comprising retaining the preferred configuration in response to the indication from the RAN that the radio connection is suspended; and wherein the releasing is in response to receiving an indication from the RAN that the radio connection is resumed.

Example 4. The method of example 3, wherein: the indication that the radio connection is suspended is received from a source base station; and the indication that the radio connection is resumed is received from a target base station.

Example 5. The method of example 1, further comprising: transmitting, by the processing hardware, a new preferred configuration to the RAN, wherein the releasing is in response to generating the new preferred configuration.

Example 6. The method of example 5, wherein: the preferred configuration is transmitted to a source base station; and the new preferred configuration is transmitted to a target base station.

Example 7. The method of example 1, wherein the releasing is in response to a command from the RAN to release the preferred configuration.

Example 8. The method of example 7, wherein: the UE operates in dual connectivity (DC) with a master node (MN) and a secondary node (SN), and the command to release the preferred configuration is received from the MN.

Example 9. The method of any of the preceding examples, wherein the preferred configuration indicates at least one of: (i) a maximum number of secondary cells (SCells), (ii) a maximum number of Multiple Input Multiple Output (MIMO) layers, or (iii) a maximum aggregated bandwidth.

Example 10. The method of any of the preceding examples, further comprising: generating, by the processing hardware, the preferred configuration in response to detecting overheating.

Example 11. A method in a distributed unit (DU) of a disaggregated base station that includes the DU and a central unit (CU), the method comprising: receiving, by processing hardware from the CU, a preferred configuration indicative of a maximum allocation preferred by a UE for at least one resource; generating, by the processing hardware and using the preferred configuration, a DU configuration for the UE; and transmitting, by the processing hardware to the CU, the DU configuration.

Example 12. The method of example 11, wherein: the disaggregated base station is a master node (MN), and the UE operates in dual connectivity (DC) with the MN and a secondary node (SN).

Example 13. The method of example 11, wherein the UE performs a handover procedure in which the disaggregated base station is a source base station.

Example 14. The method of example 11, wherein the UE performs a handover procedure in which the disaggregated base station is a target base station.

Example 15. The method of example 14, wherein: receiving the preferred configuration includes receiving a request to set up a context for the UE.

Example 16. The method of example 15, wherein: the preferred configuration is a first preferred configuration; the method further comprising: receiving, from the UE, a second preferred configuration.

Example 17. The method of example 16, wherein the second preferred configuration is received in a message that specifies UE assistance information.

Example 18. The method of example 16, further comprising: transmitting, by the processing hardware to the UE, a request to resume a previously suspended radio connection; wherein the second preferred configuration is received in response to transmitting the request.

Example 19. A method in a central unit (CU) of a disaggregated base station that includes the CU and a distributed unit (DU), the method comprising: receiving, by processing hardware, a preferred configuration indicative of a maximum allocation preferred by a UE for at least one resource; and transmitting, by the processing hardware to the DU, an indication of the maximum allocation preferred by the UE.

Example 20. The method of example 19, including receiving the preferred configuration from the UE via a radio interface.

Example 21. The method of example 20, wherein the preferred configuration is received in a message specifying UE assistance information.

Example 22. The method of example 19, including receiving the preferred configuration from a source base station, wherein the disaggregated base station operates as a target base station during a handover procedure.

Example 23. The method of example 22, further comprising: transmitting, to the source base station, a request to retrieve a context for the UE; and wherein the preferred configuration is received in a response to the request.

Example 24. The method of example 19, further comprising: receiving, from the DU, a conditional DU configuration that satisfies the maximum allocation preferred by the UE; and transmitting the conditional DU configuration to the UE, wherein the UE connects to the DU in accordance with the conditional DU configuration when one or more conditions for connecting to the DU are satisfied.

Example 25. The method of example 19, further comprising: transmitting, to the UE prior to receiving the preferred configuration, a conditional configuration, wherein the UE connects to the disaggregated base station in accordance with the conditional configuration when one or more conditions for connecting to the disaggregated base station are satisfied; and in response to determining that the conditional configuration does not satisfy the preferred configuration, releasing the preferred configuration.

Example 26. The method of example 19, further comprising: transmitting, to the UE prior to receiving the preferred configuration, a conditional DU configuration, wherein the UE connects to the DU in accordance with the conditional DU configuration when one or more conditions for connecting to the DU are satisfied; in response to determining that the conditional configuration does not satisfy the preferred configuration, generating a new conditional DU configuration that satisfies the preferred configuration; and transmitting the new conditional DU configuration to the UE.

Example 27. The method of example 19, further comprising: transmitting, to the UE prior to receiving the preferred configuration, a conditional DU configuration, wherein the UE connects to the DU in accordance with the conditional DU configuration when one or more conditions for connecting to the DU are satisfied; in response to determining that the conditional configuration does not satisfy the preferred configuration, retaining the preferred configuration; and applying the preferred configuration in response to the UE connecting to the DU.

Example 28. A method in master node (MN) for managing configuration of a secondary node (SN) when the UE operates in dual connectivity (DC) with the MN and the SN, the method comprising: determining, by processing hardware and using a capability of at least one of the UE or the SN, whether the SN is to receive an indication of a maximum allocation preferred by the UE for at least one resource; and in response to determining that the SN is to receive the indication, causing the indication to be provided to the SN.

Example 29. The method of example 28, wherein the causing includes: receiving, by the processing hardware, a preferred configuration information element (IE) from the UE, the preferred configuration IE including the indication; and transmitting, by the processing hardware, the indication to the SN.

Example 30. The method of example 29, wherein transmitting the indication includes forwarding the preferred configuration IE to the SN.

Example 31. The method of example 30, wherein the determining includes: determining that the SN supports the preferred configuration IE.

Example 32. The method of example 29, wherein transmitting the indication includes: generating a second IE of a type other than the preferred configuration IE; including the indication in the second IE; and transmitting, by the processing hardware, the second IE to the SN.

Example 33. The method of example 29, further comprising: determining, by the processing hardware, that the SN is a legacy base station that does not support the preferred configuration IE.

Example 34. The method of example 29, wherein the causing includes: transmitting, by the processing hardware to the UE, an indication that the UE is to transmit the indication to the SN via a radio interface between the UE and the SN.

Example 35. The method of example 34, wherein the determining includes: using the capability of the UE to determine that the UE is capable of transmitting a preferred UE to the SN, the preferred configuration IE including the indication.

Example 36. The method of example 34, wherein the determining includes: using the capability of the SN to determine that the SN supports the preferred configuration IE.

Example 37. The method of example 28, further comprising: in a second instance, in response to determining that the SN is to not receive the indication: transmitting, by the processing hardware to the SN, a request to release the SN from the DC.

Example 38. A method in a user equipment (UE) for managing a preferred configuration indicative of a maximum allocation preferred by the UE for at least one resource, the UE operating in dual connectivity (DC) with a master node (MN) and a secondary node (SN), the method comprising: transmitting, by processing hardware, the preferred configuration to the MN or the SN; receiving, by the processing hardware, an indication that the SN is released; disconnecting from the SN in response to the indication; and releasing, by the processing hardware, the preferred configuration.

Example 39. The method of example 38, wherein the releasing is in response to a command to reconfigure a radio connection, the command including the indication that the SN is released.

Example 40. The method of example 38, wherein the preferred configuration is transmitted to the MN.

Example 41. The method of example 38, wherein the preferred configuration is transmitted to the SN.

Example 42. The method of example 38, further comprising: retaining, by the processing hardware, the preferred configuration in response to the indication that the SN is released; and releasing the preferred configuration in response to generating a new preferred configuration.

Example 43. The method of example 42, further comprising: transmitting, by the processing hardware, the new preferred configuration to the MN.

Example 44. The method of example 43, wherein the new preferred configuration is transmitted in a UE assistance information message.

Example 45. The method of example 38, wherein: the SN is a first SN, and the preferred configuration is a first preferred configuration; the method further comprising: receiving, by the processing hardware and from the MN, mobility information for a secondary cell group (SCG) of a second SN during or after transmitting the first preferred configuration; and determining whether to transmit a second preferred configuration to the first SN or the second SN based on the mobility information.

Example 46. The method of example 45, further comprising: enabling direct transmission of the second preferred configuration to the first SN or the second SN, in accordance with the mobility information.

Example 47. The method of example 45, further comprising: disabling direct transmission of the second preferred configuration to the first SN or the second SN, in accordance with the mobility information.

Example 48. The method of any one of examples 45 to 47, wherein the second preferred configuration is identical to the first preferred configuration.

Example 49. A user equipment (UE) comprising processing hardware and configured to implement the method of any of examples 1-10 or 38-48.

Example 50. A base station comprising processing hardware and configured to implement the method of any of examples 11-37.

What is claimed is:

1. A method performed by a master node (MN) for managing a configuration of a UE when the UE operates in dual connectivity (DC) with the MN and a source secondary node (SN), the method comprising:
   receiving, by the MN and from the source SN, a UE assistance information message that includes a preferred configuration for power saving, which indicates a maximum allocation preferred by the UE for at least one resource;
   determining, by the MN, to initiate a procedure that causes the UE to change from the source SN to a target SN; and
   in response to the determining, sending, by the MN and to the target SN, the preferred power saving configuration.

2. The method of claim 1, wherein the UE assistance information message includes an information element (IE) that includes the preferred power saving configuration.

3. The method of claim 2, wherein the IE is a CG-Config IE.

4. The method of claim 1, wherein the receiving of the UE assistance information message includes receiving one of an SN Change Required message, an SN Modification Required message, or an SN Modification Request Acknowledge message that includes the UE assistance information message.

5. The method of claim 1, wherein the sending of the preferred power saving configuration includes sending an SN addition request that includes the preferred power saving configuration.

6. The method of claim 5, wherein the SN addition request includes a capability of the UE.

7. The method of claim 5, further comprising:
   determining, by the MN, that the target SN is a legacy base station that does not support the preferred power saving configuration.

8. The method of claim 7, wherein the SN addition request includes an IE that corresponds to a translation of the preferred power saving configuration into a format readable by the target SN.

9. The method of claim 1, wherein:
   the preferred power saving configuration is one of a plurality of preferred configurations indicative of respective maximum allocations preferred by the UE for the at least one resource;
   the UE assistance information message includes the plurality of preferred configurations; and
   the method further comprises sending, by the MN, the plurality of preferred configurations to the target SN in response to the determining.

10. The method of claim 9, wherein the plurality of preferred configurations includes a respective preferred configuration for each of at least one of: uplink and downlink, discontinuous reception (DRX), fifth generation (5G), dual connectivity (DC), or sidelink communications.

11. A method performed by a source secondary node (SN) for managing a configuration of a UE when the UE operates in dual connectivity (DC) with a master node (MN) and the source SN, the method comprising:
receiving, by the source SN and from the UE, a preferred configuration for power saving, the preferred power saving configuration indicative of a maximum allocation preferred by the UE for at least one resource; and
transmitting, by the source SN and to a target SN via the MN, a UE assistance information message including the preferred power saving configuration after the MN initiates a procedure that causes the UE to change from the source SN to the target SN.

12. The method of claim 11, wherein the UE assistance information message includes an information element (IE) that includes the preferred power saving configuration.

13. The method of claim 12, wherein the IE is a CG-Config IE.

14. The method of claim 11, wherein the transmitting of the UE assistance information message includes transmitting one of an SN Change Required message, an SN Modification Required message, or an SN Modification Request Acknowledge message that includes the UE assistance information message.

15. The method of claim 11, wherein the receiving of the preferred power saving configuration indicates that the UE has determined a change to power conservation.

16. The method of claim 11, wherein the preferred power saving configuration indicates at least one of:
(i) a maximum number of secondary cells (SCells),
(ii) a maximum number of Multiple Input Multiple Output (MIMO) layers, or
(iii) a maximum aggregated bandwidth.

17. The method of claim 14, wherein the UE assistance information message includes a plurality of preferred configurations indicative of respective maximum allocations preferred by the UE for the at least one resource, the plurality of preferred configurations received by the source SN from the UE and including the preferred power saving configuration.

18. The method of claim 17, wherein the plurality of preferred configurations include a respective preferred configuration for each of at least one of: uplink and downlink, discontinuous reception (DRX), fifth generation (5G), dual connectivity (DC), or sidelink communications.

19. A base station comprising processing hardware including at least one of: a radio resource control (RRC) controller or a radio link control (RLC) controller and configured to implement the method of claim 11.

20. A base station comprising processing hardware including at least one of: a radio resource control (RRC) controller or a radio link control (RLC) controller and configured to implement the method of claim 1.

* * * * *